US012580424B2

(12) United States Patent
Kim et al.

(10) Patent No.: US 12,580,424 B2
(45) Date of Patent: Mar. 17, 2026

(54) WIRELESS POWER TRANSMISSION DEVICE FOR DETECTING EXTERNAL OBJECT AND METHOD THEREOF

(71) Applicant: Samsung Electronics Co., Ltd., Suwon-si (KR)

(72) Inventors: Joonhong Kim, Suwon-si (KR); Jaehyun Park, Suwon-si (KR); Jaeseok Park, Suwon-si (KR); Sungku Yeo, Suwon-si (KR); Youngho Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 680 days.

(21) Appl. No.: 17/898,866

(22) Filed: Aug. 30, 2022

(65) Prior Publication Data

US 2023/0065772 A1      Mar. 2, 2023

Related U.S. Application Data

(63) Continuation of application No. PCT/KR2022/012899, filed on Aug. 29, 2022.

(30) Foreign Application Priority Data

| Aug. 30, 2021 | (KR) | ........................ | 10-2021-0114724 |
| Nov. 5, 2021 | (KR) | ........................ | 10-2021-0151730 |
| Nov. 24, 2021 | (KR) | ........................ | 10-2021-0163723 |

(51) Int. Cl.
*H02J 50/60* (2016.01)
*H02J 50/00* (2016.01)
(Continued)

(52) U.S. Cl.
CPC ............ *H02J 50/60* (2016.02); *H02J 50/005* (2020.01); *H02J 50/12* (2016.02); *H02J 50/402* (2020.01); *H02J 50/90* (2016.02)

(58) Field of Classification Search
CPC ...................................................... H02J 50/60
(Continued)

(56) References Cited

U.S. PATENT DOCUMENTS

| 9,404,954 B2 | 8/2016 | Roy et al. |
| 10,326,309 B2 | 6/2019 | Lee et al. |

(Continued)

FOREIGN PATENT DOCUMENTS

| JP | 2017-139724 A | 8/2017 |
| JP | 2017-195576 A | 10/2017 |

(Continued)

OTHER PUBLICATIONS

International Search Report with Written Opinion and English translation dated Nov. 22, 2022; International Appln. No. PCT/KR2022/012899.

(Continued)

*Primary Examiner* — Ahmed H Omar
(74) *Attorney, Agent, or Firm* — Jefferson IP Law, LLP

(57) ABSTRACT

An electronic device is provided. The electronic device includes a resonator in which a first slot is formed, a first inverter connected to a first point and a second point on the first slot of the resonator and configured to provide power to the first slot for detecting a foreign material, the first point and the second point on the first slot being located opposite to each other with the first slot therebetween, a second inverter connected to a third point and a fourth point of the resonator different from the first point and the second point and configured to transfer power to the resonator, and a controller configured to control the first inverter to apply the first power having the first frequency to the first slot, identify at least one first impedance of the first point and the second point while the first power is applied to the first slot, identify, based on the at least one first impedance, an external object (Continued)

101

420 Second inverter

440 Resonator

430 Controller

450 Sensor

410 First inverter

441 Slot

Start

Control first inverter to apply first power having first frequency to resonator — 2801

Identify at least one first impedance of first point and second point while first power is applied to resonator — 2803

Control second inverter to apply second power having second frequency to resonator — 2805

Identify at least one second impedance of third point and fourth point while second power is applied to resonator — 2807

Identify external object adjacent to electronic device, based on at least one first impedance and at least one second impedance — 2809

End adjacent to the electronic device, and control the second inverter to apply a second power having a second frequency different from the first frequency to the third point and the fourth point so as to wirelessly provide power to an external wireless power reception device for a period at least partially overlapping with a period for which the first power is applied to the resonator.

21 Claims, 28 Drawing Sheets

(51) Int. Cl.
     *H02J 50/12*     (2016.01)
     *H02J 50/40*     (2016.01)
     *H02J 50/90*     (2016.01)
(58) Field of Classification Search
     USPC ......................................................... 320/108
     See application file for complete search history.

(56)               References Cited

U.S. PATENT DOCUMENTS

| 2011/0250928 A1 | 10/2011 | Schlub et al. |
| 2012/0202435 A1 | 8/2012 | Kim et al. |
| 2013/0069441 A1 | 3/2013 | Verghese et al. |
| 2015/0270619 A1 | 9/2015 | Zhu et al. |
| 2015/0380946 A1 | 12/2015 | Polu et al. |
| 2016/0072303 A1 | 3/2016 | Jeong |
| 2016/0187520 A1 | 6/2016 | Widmer et al. |
| 2016/0261142 A1 | 9/2016 | Park et al. |
| 2019/0067994 A1 | 2/2019 | Song et al. |
| 2019/0165610 A1 | 5/2019 | Hong et al. |
| 2019/0379424 A1 | 12/2019 | Kozakai et al. |
| 2020/0373789 A1 | 11/2020 | Park et al. |

FOREIGN PATENT DOCUMENTS

| KR | 10-2012-0090220 A | 8/2012 |
| KR | 10-2014-0041939 A | 4/2014 |
| KR | 10-2014-0060178 A | 5/2014 |
| KR | 10-2016-0104670 A | 9/2016 |
| KR | 10-2016-0108031 A | 9/2016 |
| KR | 10-2017-0013550 A | 2/2017 |
| KR | 10-2017-0041706 A | 4/2017 |
| KR | 10-2017-0054391 A | 5/2017 |
| KR | 10-2017-0140734 A | 12/2017 |
| KR | 10-2018-0038205 A | 4/2018 |
| KR | 10-2018-0062653 A | 6/2018 |
| KR | 10-2019-0064016 A | 6/2019 |
| KR | 10-2020-0071514 A | 6/2020 |

OTHER PUBLICATIONS

Extended European Search Report dated Oct. 14, 2024; European Appln. No. 22864987.7-1002 / 4366087 PCT/KR2022012899.
Korean Notice of Allowance dated Oct. 30, 2025, issued in Korean Application No. 10-2021-0163723.
Indian Examination Report dated Jan. 12, 2026, issued in Indian Application No. 202447021075.

(a)

(b)

(a)

(b)

(a)

(b)

(a)

(b)

(a)

(b)

(a)

(b)

2032
2010
2020
2033    2031
(a)

2010
2043
2020
2044    2042
2045    2041
(b)

WIRELESS POWER TRANSMISSION DEVICE FOR DETECTING EXTERNAL OBJECT AND METHOD THEREOF

CROSS-REFERENCE TO RELATED APPLICATION(S)

This application is a continuation application, claiming priority under § 365(c), of an International application No. PCT/KR2022/012899, filed on Aug. 29, 2022, which is based on and claims the benefit of a Korean patent application number 10-2021-0114724, filed on Aug. 30, 2021, in the Korean Intellectual Property Office, of a Korean patent application number 10-2021-0151730, filed on Nov. 5, 2021, in the Korean Intellectual Property Office, and of a Korean patent application number 10-2021-0163723, filed on Nov. 24, 2021, in the Korean Intellectual Property Office, the disclosure of each of which is incorporated by reference herein in its entirety.

TECHNICAL FIELD

The disclosure relates to a wireless power transmission device for detecting an external object and a method thereof.

BACKGROUND ART

A wireless power transmission technology corresponds to a scheme of transmitting power by using an electromagnetic field induced on a coil. Through this technology, a current is applied to a transmission coil to generate an electromagnetic field, and an induced current is generated on a reception coil by the generated electromagnetic field, whereby electric energy can be supplied.

A wireless power transmission device may receive direct current (DC) power and convert the received DC power to alternating current (AC) power, and generate an electromagnetic field via a resonator so as to transfer power to a wireless power reception device.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

When a foreign material exists at the time of wireless power transmission device, wireless power transmission efficiency by the wireless power transmission device may be reduced due to the foreign material, or the wireless power transmission device may be damaged.

Therefore, a technology of detecting an object existing on a wireless power transmission device, and determining whether the corresponding object is a power transmission target is desired.

Additional aspects will be set forth in part in the description which follows and, in part, will be apparent from the description, or may be learned by practice of the presented embodiments.

Technical Solution

Aspects of the disclosure are to address at least the above-mentioned problems and/or disadvantages and to provide at least the advantages described below. Accordingly, an aspect of the disclosure is to provide a wireless power transmission device for detecting an external object and a method thereof. According to various embodiments, an external object (e.g., a foreign material) existing on the wireless power transmission device may be detected, and a type of the detected external object may be determined.

In accordance with an aspect of the disclosure, an electronic device is provided. The electronic device includes a resonator in which a first slot is formed, a first inverter connected to a first point and a second point on the first slot of the resonator and configured to provide power to the first slot for detecting a foreign material, the first point and the second point on the first slot being located opposite to each other with the first slot therebetween, a second inverter connected to a third point and a fourth point of the resonator different from the first point and the second point and configured to transfer power to the resonator, and a controller configured to control the first inverter to apply a first power having a first frequency to the first slot, identify at least one first impedance of the first point and the second point while the first power is applied to the first slot, identify, based on the at least one first impedance, an external object adjacent to the electronic device, and control the second inverter to apply a second power having a second frequency different from the first frequency to the third point and the fourth point so as to wirelessly provide power to an external wireless power reception device for a period at least partially overlapping with a period for which the first power is applied to the resonator.

In accordance with another aspect of the disclosure, a resonator included in an electronic device is provided. The resonator includes a first slot, wherein the resonator is formed in a shape of a loop, wherein the first slot is formed in a shape with a first length in a loop direction of the resonator, and wherein the electronic device is configured to control a first inverter connected to a first point and a second point of the resonator to provide a first power having a first frequency to the resonator for detecting a foreign material, the first point and the second point being located opposite to each other with the first slot therebetween, identify an external object adjacent to the electronic device, based on at least one first impedance of the first point and the second point identified while the first power is applied to the resonator, and control a second inverter, which is connected to a third point and a fourth point of the resonator different from the first point and the second point, to apply a second power having a second frequency different from the first frequency so as to provide power to an external wireless power reception device for a period at least partially overlapping with a period for which the first power is applied to the resonator.

Advantageous Effects

Various embodiments may provide a wireless power transmission device for detecting an external object and a method thereof. Accordingly, a foreign object existing on the wireless power transmission device may be detected so as to prevent reduction of wireless power transmission efficiency, and damage to the wireless power transmission device.

According to various embodiments, a foreign object existing on the wireless power transmission device may be detected, and when the detected external object is not a wireless power transmission target, transmission of wireless power may be stopped.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
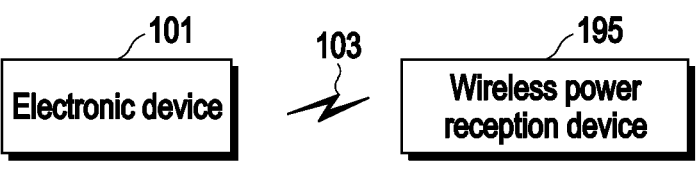
FIG. 1 is a block diagram of an electronic device and a wireless power reception device according to an embodiment of the disclosure.

FIG. 1 is a block diagram of an electronic device and a wireless power reception device according to an embodiment of the disclosure.

Referring to FIG. 1, an electronic device 101 according to various embodiments may wirelessly transmit power 103 to a wireless power reception device 195. In an example, the electronic device 101 may transmit the power 103 according to an induction scheme. When the electronic device 101 employs an induction scheme, the electronic device 101 may include, for example, a power source, a DC-AC conversion circuit, an amplification circuit, an impedance matching circuit, at least one capacitor, at least one coil, and a communication modulation/demodulation circuit. The at least one capacitor may configure a resonant circuit together with the at least one coil. The electronic device 101 may be implemented in a scheme defined in wireless power consortium (WPC) standard (or Qi standard). In another example, the electronic device 101 may transmit the power 103 according to a resonance scheme. In a case of using a resonance scheme, the electronic device 101 may include, for example, a power source, a DC-AC conversion circuit, an amplification circuit, an impedance matching circuit, at least one capacitor, at least one coil, and an out-of-band communication circuit (e.g., Bluetooth low energy (BLE) communication circuit). The at least one capacitor and the at least one coil may configure a resonant circuit. The electronic device 101 may be implemented in a scheme defined in an alliance for wireless power (A4WP) standard (or airfuel alliance (AFA) standard). The electronic device 101 may include a coil which is able to generate an induced magnetic field when a current flows according to a resonance scheme or an induction scheme. A process in which the electronic device generates an induced magnetic field may be expressed by wireless transmission of, by the electronic device 101, the power 103. The wireless power reception device 195 may include a coil on which an induced electromotive force is generated by a magnetic field, the magnitude of which changes according to the time at which the magnetic field is generated around the wireless power reception device. A process of generating an induced electromotive force through the coil may be expressed by wireless reception of, by the wireless power reception device 195, the power 103. For example, the electronic device 101 may also be implemented in a scheme defined in a Qi standard or a scheme defined in an airfuel inductive (e.g., power matters alliance (PMA)) or airfuel resonant (e.g., rezence) standard as a standard related to wireless power transmission.

The electronic device 101 according to an embodiment may communicate with the wireless power reception device 195. For example, the electronic device 101 may communicate with the wireless power reception device 195 according to an in-band scheme. The electronic device 101 may perform modulation of data that the electronic device is to transmit, according to, for example, a frequency shift keying (FSK) modulation scheme, and the wireless power reception device 195 may perform modulation according to an amplitude shift keying (ASK) modulation scheme. The electronic device 101 and/or the wireless power reception device 195 may determine data transmitted from an opposite device, based on the frequency and/or amplitude of the current, voltage, or power of the coil. An operation of performing modulation based on an ASK modulation scheme and/or FSK modulation scheme may be understood as an operation of transmitting data according to an in-band communication scheme. An operation of performing demodulation based on the magnitude of the frequency and/or amplitude of the current, voltage, or power of a coil so as to determine data transmitted from an opposite device may be understood as an operation of receiving data according to an in-band communication scheme. For example, the electronic device 101 may communicate with the wireless power reception device 195 according to an out-of-band scheme. The electronic device 101 or the wireless power reception device 195 may transmit or receive data by using a communication circuit (e.g., BLE communication module) provided separately from a patch antenna or a coil.

In this document, the electronic device 101 or the wireless power reception device 195 performing a particular operation may imply that various hardware components, for example, a coil and a control circuit such as a processor (e.g., transmission integrated circuit (IC) and/or micro controlling unit (MCU)), included in the electronic device 101 or the wireless power reception device 195 perform a particular operation. Alternatively, the electronic device 101 or the wireless power reception device 195 performing a particular operation may also imply that a processor controls another hardware component to perform a particular operation. Alternatively, the electronic device 101 or the wireless power reception device 195 performing a particular operation may also imply that, according to execution of at least one instruction for performing a particular operation stored in a storage circuit (e.g., memory) of the electronic device 101 or the wireless power reception device 195, a processor or another hardware component is caused to perform the particular operation.

Figure 2:
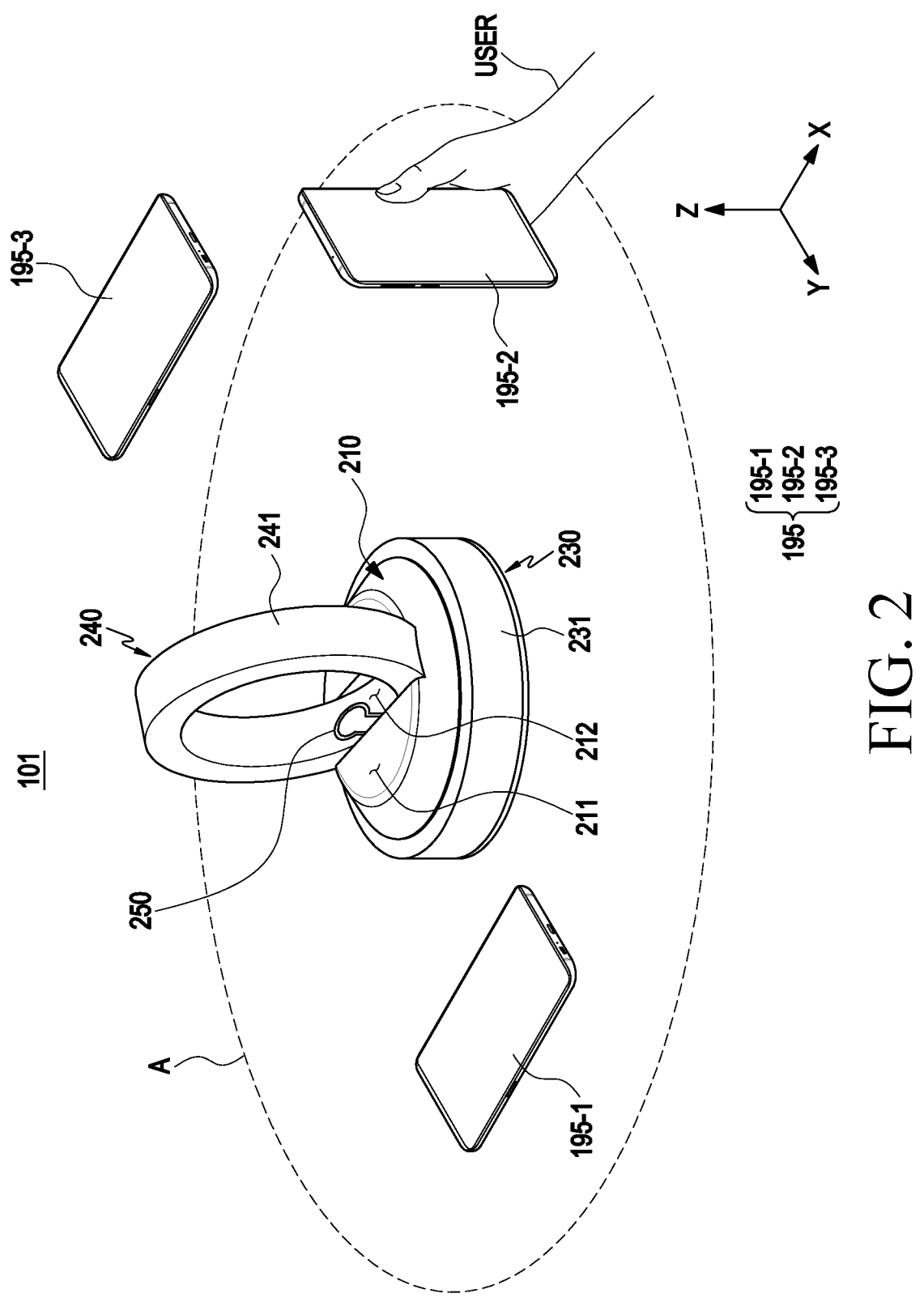
FIG. 2 illustrates a configuration diagram of a wireless charging system according to an embodiment of the disclosure.

FIG. 2 illustrates a configuration diagram of a wireless charging system according to an embodiment of the disclosure.

Referring to FIG. 2, a wireless charging system according to various embodiments may include the electronic device 101 and at least one wireless power reception device 195-1, 195-2, and 195-3. Each of the at least one wireless power reception device 195-1, 195-2, and 195-3 may be an electronic device having the same type as that of the wireless power reception device 195.

According to various embodiments, the electronic device 101 may be a device transmitting wireless power, based on power supplied from a charger (e.g., travel adapter (TA)). According to another embodiment, the electronic device 101 is a device including a wireless power transmission function, and may be implemented as, for example, a smartphone, but there is no limit to the implemented type. The wireless power reception device 195 may be an electronic device, such as a smartphone or a wearable device, and there is no limit to the implemented type.

Referring to FIG. 2, the electronic device 101 may include a base housing 210 and at least one resonator 230 and 240. The at least one wireless power reception device 195-1, 195-2, and 195-3 may be freely held around the electronic device 101.

According to various embodiments, axes illustrated in a drawing of this document may indicate directions which an element faces. The axes may be axes (x-axis, y-axis, and z-axis) in a three-dimensional space. Referring to FIG. 2, the x-axis may be parallel to the transverse direction (or lengthwise direction) of the electronic device 101, and the y-axis may be parallel to the longitudinal direction (or widthwise direction) of the electronic device 101. The z-axis may be parallel to the height direction of the electronic device 101. A combinational relation between each element may be described with reference to various drawings included in this document and axes included therein. The type of the electronic device 101 illustrated in FIG. 2 is an example, and there is no limit to the type of electronic device 101.

The base housing 210 is a part configuring the outer appearance of the electronic device 101 together with at least one resonator housing 231 and 241, and various electronic components included in the electronic device 101 may be accommodated in an inner space of the base housing 210. According to an embodiment, the various electronic components may also be integrated to be accommodated in a system module of the electronic device 101. The shape of the base housing 210 of the electronic device 101 according to various embodiments of the disclosure is not limited to a particular embodiment. For example, in the embodiment illustrated in FIG. 2, the base housing 210 may have generally a cylindrical shape, but the disclosure is not necessarily limited thereto. Various other embodiments like a polyhedron including a hexahedron may be applied.

The electronic device 101 may include the resonators 230 and 240. The resonators 230 and 240 may include the first resonator 230 which includes at least one coil and at least one capacitor and is surrounded by a first resonator housing 231, and the second resonator 240 which includes at least one coil and at least one capacitor and is surrounded by a second resonator housing 241.

According to various embodiments, each of the resonators 230 and 240 may have an annular shape having a hollow provided therein. The first resonator 230 and the second resonator 240 may have a size, a shape, or an internal configuration (e.g., an internal configuration including at least one capacitor and at least one coil) which is identical to or different from that of the housings 231 and 241.

The base housing 210 may have a structure on which the first resonator housing 231 and the second resonator housing 241 can be held. The first resonator housing 231 may be placed to be horizontal to the base housing 210, and the second resonator housing 241 may be placed to be vertical to the base housing 210. For example, the first resonator housing 231 may be coupled to an outer cylindrical circumference of the base housing 210 while being laid down, and the second resonator housing 241 may be stood up by being coupled to a groove 212 disposed in a center part of an upper surface 211 of the base housing 210.

According to an embodiment, the first resonator 230 and the second resonator 240 may be compatible with each other, and thus are interchangeable. For example, the second resonator housing 241 may be held on a position on which the first resonator housing 231 is held on the base housing 210, and the first resonator housing 231 may be held on a position on which the second resonator housing 241 is held. Hereinafter, for convenience of explanation, an embodiment in which the first resonator housing 231 is held to be horizontal to the base housing 210 (or the ground), and the second resonator housing 241 is held to be vertical to the base housing 210 (or the ground) is mainly described, but it should be noted that the disclosure is not limited thereto.

According to various embodiments, the first resonator 230 held to be horizontal to the base housing 210 may be coupled mainly to wireless power reception devices placed on a floor near the electronic device 101, and transmit wireless power thereto. In addition, the second resonator 240 held to be vertical to the base housing 210 may be coupled mainly to wireless power reception devices stood up near the electronic device 101, or spaced a predetermined distance apart from the floor in the height direction of the electronic device 101, and transmit wireless power thereto. The disclosure is not necessarily limited thereto, and according to an embodiment, power may be wirelessly transmitted, by using the first resonator 230, to wireless power reception devices stood up near the electronic device 101 or spaced a predetermined distance apart from the floor, and it is also possible to transmit wireless power to wireless power reception devices placed on the floor by using the second resonator 240. However, charging wireless power reception devices placed on the floor by using the first resonator 230, and charging wireless power reception devices, which are stood up or are spaced a predetermined distance apart from the floor, by using the second resonator 240 may be more favorable in view of transmission efficiency.

According to an embodiment illustrated in FIG. 2, the first resonator housing 231 may be configured to have an entire part (e.g., a circumferential part) exposed out of the base housing 210. However, the second resonator housing 241 may be configured to have at least a part inserted in the base housing 210 and a remaining part exposed to the outside. The at least a part of the second resonator housing 241 is inserted in the base housing 210, whereby the second resonator housing 241 can be stably held. A shape related to the base housing 210, the first resonator housing 231, and the second resonator housing 241 is not limited thereto, and may be various.

The first resonator housing 231 and the second resonator housing 241 may be detachably coupled to the base housing 210. One of the first resonator housing 231 or the second resonator housing 241 may be spaced a predetermined distance apart from the base housing 210 of the electronic device 101, and the spaced resonators may be used as relays so as to expand a wireless power charging range of the electronic device 101.

Referring to FIG. 2, the electronic device 101 may include a feeder 250 in the base housing 210.

The feeder 250 may be electromagnetically coupled to the resonators 230 and 240, and the resonators 230 and 240 having received power through coupling with the feeder 250 may output or transmit power having an electromagnetic field type to wireless power reception devices. For example, the feeder 250 may be disposed at one side of the base housing 210 so as to generate an electromagnetic field, and may couple the generated electromagnetic field to the first resonator 230 and the second resonator 240 both or selectively. The feeder 250 may be configured to have a capacitor and a coil having a loop having at least one turn which are connected in series/parallel. According to various embodiments, the feeder 250 may be disposed in the base housing 210, and at least a part of the feeder 250 may be exposed out of the base housing 210.

According to various embodiments, it is possible to dispose the feeder 250 to have various angles so as to be coupled with the resonators 230 and 240, and according to an embodiment, multiple feeders may be arranged.

According to various embodiments of the disclosure, a power output or transmission function may be performed for the at least one wireless power reception device 195-1, 195-2, and 195-3 by using the electronic device 101 according to various embodiments described above.

According to various embodiments of the disclosure, as well as the power output or transmission function, various display methods (e.g., light-emitting diode (LED) light, sound, text messages, voice, etc.) may be provided by using the electronic device 101 so that a user can intuitionally recognize charging state monitoring information of the at least one wireless power reception device 195-1, 195-2, and 195-3.

The charging state monitoring information may include at least one of voltage information, current information, stateof-charge (SOC) information, and information on a state (state of health (SOH)) indicating whether charging is possible or impossible. A power state of the wireless power reception device may be identified through the voltage information or the current information. The power state may indicate the amount of electrical energy remaining until the battery of the wireless power reception device 195-1, 195-2, and 195-3 is discharged. For example, the power state may be represented by a percentage such as 0%, 10%, 50%, or 100%. The SOC may indicate whether the wireless power reception device 195-1, 195-2, and 195-3 is being charged or not being charged. The information (SOH) on a state indicating whether or not it is possible to charge the wireless power reception device 195-1, 195-2, and 195-3 may be displayed together by using the electronic device 101 of the disclosure. The charging state monitoring information is not limited thereto.

The electronic device 101 may obtain position information of the at least one wireless power reception device 195-1, 195-2, and 195-3 positioned 360 degrees around the electronic device. In order to obtain the position information, the electronic device may use an ultra-wideband (UWB) radar sensor or a phased-array coil described above. Alternatively, the electronic device may also use a phased-array coil and a UWB radar sensor together so as to further improve accuracy of the position information. The charging state monitoring information may be obtained via a short-range communication module of the electronic device 101.

A flow regarding a power transmission method, a position-related information display method, and a charging state-related information display method for the at least one wireless power reception device 195-1, 195-2, and 195-3 disposed around the electronic device 101 according to an embodiment may be described as follows. First, the electronic device 101 may transmit a load detection beacon and/or a power beacon, and various information including voltage/power amount information may be fed back from a wireless power reception device responding to the beacon. The information fed back from the wireless power reception device and the information on the wireless power reception device obtained via the short-range communication module may be mapped. A unique identifier (ID) of the at least one wireless power reception device 195-1, 195-2, and 195-3 may be identified using the short-range communication module included in the electronic device 101. Furthermore, the electronic device may perform a pairing operation for a wireless power reception device having an authenticated ID. The electronic device 101 and the wireless power reception device which are paired may transmit or receive various data relating to, for example, a power state and a charging state. The electronic device 101 and the wireless power reception device may obtain brief position information of the at least one wireless power reception device 195-1, 195-2, and 195-3 disposed around the electronic device.

The electronic device 101 according to an embodiment may adopt (e.g., apply the first resonator 230 and the second resonator 240 in FIG. 2) a resonance scheme as a power transmission method for the at least one wireless power reception device 195-1, 195-2, and 195-3 positioned 360 degrees around the electronic device 101. Under the assumption that the electronic device 101 is fixed at a position, the wireless power reception device 195-1, 195-2, and 195-3 is required to be disposed within a designated distance from the electronic device 101 so that power can be transmitted. For example, an effective distance for wireless power transmission between a wireless power transmission device 100 and the wireless power reception device 195-1, 195-2, and

195-3 may be 50 cm or shorter, preferably, may be 30 cm or shorter. A first effective distance A is illustrated in FIG. 2 as an example of an effective distance for wireless power transmission. According to an embodiment illustrated in FIG. 2, the first wireless power reception device 195-1 and the second wireless power reception device 195-2 are arranged within an effective distance (e.g., the first effective distance A) for wireless power transmission, and thus a charging operation can be normally performed. However, the third wireless power reception device 195-3 is disposed out of the effective distance, and thus may not be charged or have very low charging efficiency.

Figure 3:
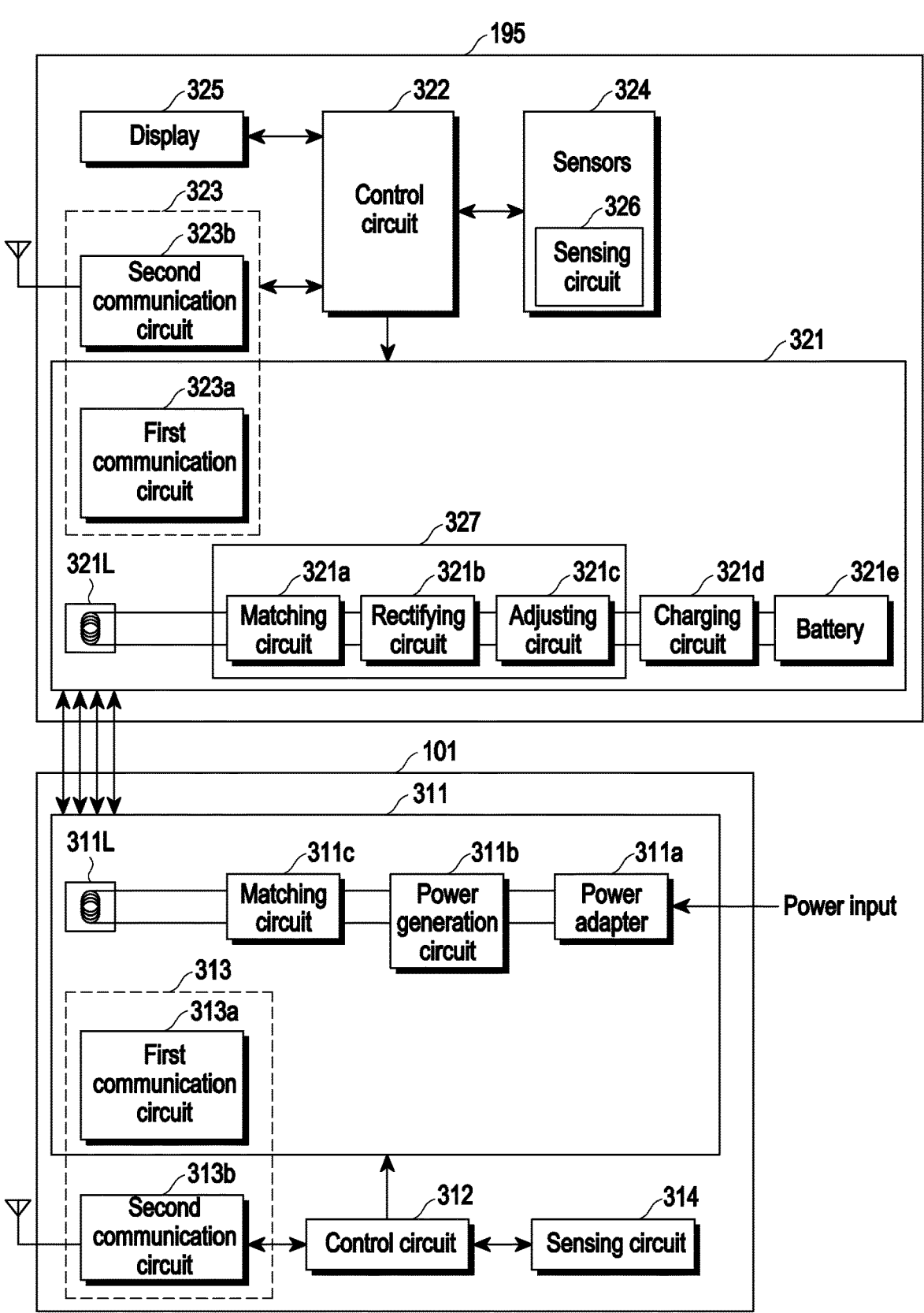
FIG. 3 is a block diagram illustrating a wireless charging system according to an embodiment of the disclosure.

FIG. 3 is a block diagram illustrating a wireless charging system according to an embodiment of the disclosure.

Referring to FIG. 3, a wireless charging system according to various embodiments may include the electronic device 101 and a wireless power reception device 195. When the wireless power reception device 195 is held on the electronic device 101, the electronic device 101 may wirelessly supply power to the wireless power reception device 195.

According to various embodiments, the electronic device 101 may include a power transmission circuit 311, a control circuit 312, a communication circuit 313, or a sensing circuit 314.

According to various embodiments, the power transmission circuit 311 may include a power adapter 311a which receives power from the outside and properly converts the voltage of the input power, a power generation circuit 311b which generates power, or a matching circuit 311c which improves an efficiency between a transmission coil 311L and a reception coil 321L.

According to various embodiments, the power transmission circuit 311 may include at least one of the power adapter 311a, the power generation circuit 311b, the transmission coil 311L, or the matching circuit 311c so as to enable power transmission to at least one wireless power reception device (e.g., the first wireless power reception device and the second wireless power reception device).

According to various embodiments, the control circuit 312 may perform overall control of the electronic device 101, and may generate various messages (e.g., instruction) required for wireless power transmission, and transfer the generated messages to the communication circuit 313. In an embodiment, the control circuit 312 may calculate power (or power amount) to be transmitted to the wireless power reception device 195, based on information received from the communication circuit 313. In an embodiment, the control circuit 312 may control the power transmission circuit 311 to transmit power generated by the transmission coil 311L to the wireless power reception device 195.

According to various embodiments, the communication circuit 313 may include at least one of a first communication circuit 313a or a second communication circuit 313b. The first communication circuit 313a may, for example, communicate with a first communication circuit 323a of the wireless power reception device 195, based on an in-band (IB) communication scheme, by using a frequency identical or adjacent to a frequency used by the transmission coil 311L to transfer power.

The first communication circuit 313a may communicate with the first communication circuit 323a of the wireless power reception device 195 by using the transmission coil 311L. Data (or communication signal) generated by the first communication circuit 313a may be transmitted using the transmission coil 311L. The first communication circuit 313a may transfer data to the wireless power reception device 195 by using a frequency shift keying (FSK) modulation scheme. According to various embodiments, the first communication circuit 313a may change the frequency of a power signal transferred via the transmission coil 311L so as to communicate with the first communication circuit 323a of the wireless power reception device 195. Alternatively, the first communication circuit 313a may include data in a power signal generated by the power generation circuit 311b so as to communicate with the first communication circuit 323a of the wireless power reception device 195. For example, the first communication circuit 313a may increase or decrease the frequency of a power transmission signal to perform modulation. The wireless power reception device 195 may perform demodulation based on the frequency of a signal measured in the reception coil 321L so as to identify data from the electronic device 101.

The second communication circuit 313b may, for example, communicate with a second communication circuit 323b of the wireless power reception device 195, based on an out-of-band (00B) communication scheme, by using a frequency different from a frequency used by the transmission coil 311L to transfer power. For example, the second communication circuit 313b may obtain, from the second communication circuit 323b, information related to a charging state (e.g., a voltage value after a rectifier, rectified voltage value (e.g., Vrect) information, information (e.g., Tout) on a current flowing in the coil 321L or a rectifying circuit 321b, various packets, and authentication information and/or message) by using one of various short-range communication schemes such as Bluetooth, Bluetooth low energy (BLE), Wi-Fi, or near field communication (NFC).

According to various embodiments, the sensing circuit 314 may include at least one sensor, and use the at least one sensor to detect at least one state of a power transmission device 301.

According to various embodiments, the sensing circuit 314 may include at least one of a temperature sensor, a motion sensor, a magnetic field sensor (Hall sensor), or a current (or voltage) sensor, may sense a temperature state of the electronic device 101 by using the temperature sensor, may sense a motion state of the electronic device 101 by using the motion sensor, may sense whether the wireless power reception device 195 is coupled thereto, by using the Hall sensor, and may sense a state of an output signal of the electronic device 101, for example, a current level, a voltage level, and/or a power level, by using the current (or voltage) sensor.

According to an embodiment, the current (or voltage) sensor may measure a signal in the power transmission circuit 311. The current (or voltage) sensor may measure a signal in at least partial area of the matching circuit 311c or the power generation circuit 311b. For example, the current (or voltage) sensor may include a circuit which measures a signal at a front end of the coil 311L.

According to various embodiments, the sensing circuit 314 may be provided for foreign material detection (e.g., external object detection (foreign object detection (FOD))).

According to various embodiments, the wireless power reception device 195 may include a power reception circuit 321, a control circuit 322, a communication circuit 323, sensors 324, a display 325, or a sensing circuit 326. The sensors may include a sensing circuit 326.

According to various embodiments, the power reception circuit 321 may include the reception coil 321L wirelessly receiving power from the electronic device 101, an Rx IC 327, a charging circuit 321d (e.g., a power management IC (PMIC), a DCDC converter, a switched capacitor, or a voltage divider), or a battery 321e (e.g., the battery 189). In an embodiment, the Rx IC 327 may include a matching circuit 321a connected to the reception coil 321L, the rectifying circuit 321b rectifying received AC power into DC, or an adjusting circuit (e.g., low dropout (LDO)) 321c adjusting charging voltage.

According to various embodiments, the control circuit 322 may perform overall control of the wireless power reception device 195, and may generate various messages required for wireless power reception, and transfer the generated messages to the communication circuit 323.

According to various embodiments, the communication circuit 323 may include at least one of the first communication circuit 323a or the second communication circuit 313b. The first communication circuit 323a may communicate with the electronic device 101 via the reception coil 321L.

The first communication circuit 323a may communicate with the first communication circuit 313a of the electronic device 101 by using the reception coil 321L. Data (or communication signal) generated by the first communication circuit 323a may be transmitted using the reception coil 321L. The first communication circuit 323a may transfer data to the electronic device 101 by using an amplitude shift keying (ASK) modulation scheme. For example, the first communication circuit 323a may cause change in a load of the electronic device 101 according to a modulation scheme. Accordingly, the magnitude of at least one of voltage, current, or power measured in the transmission coil 311L may be changed. The first communication circuit 313a of the electronic device 101 may demodulate the magnitude change to identify data by the wireless power reception device 195. The second communication circuit 323b may communicate with the electronic device 101 by using one of various short-range communication schemes such as Bluetooth, BLE, Wi-Fi, or NFC.

Packets, information, or data transmitted or received between the electronic device 101 and the wireless power reception device 195 in this document may use at least one of the first communication circuit 323a or the second communication circuit 323b.

According to various embodiments, the sensors 324 may include at least some of a current/voltage sensor, a temperature sensor, an illuminance sensor, or an acceleration sensor. In an embodiment, the sensors 324 may be an element identical to or different from a sensor module 1376 in FIG. 13.

According to various embodiments, the display 325 may display various display information required for transmission or reception of wireless power.

According to various embodiments, the sensing circuit 326 may sense the electronic device 101 by sensing a search signal from the electronic device 101 or power received therefrom. The sensing circuit 326 may sense a change in a signal of an input/output node of the rectifying circuit 321b, or the coil 321L or the matching circuit 321a, the change being caused by a signal of the coil 321L generated by a signal output from the electronic device 101. According to various embodiments, the sensing circuit 326 may be included in the reception circuit 321.

Figure 4A:
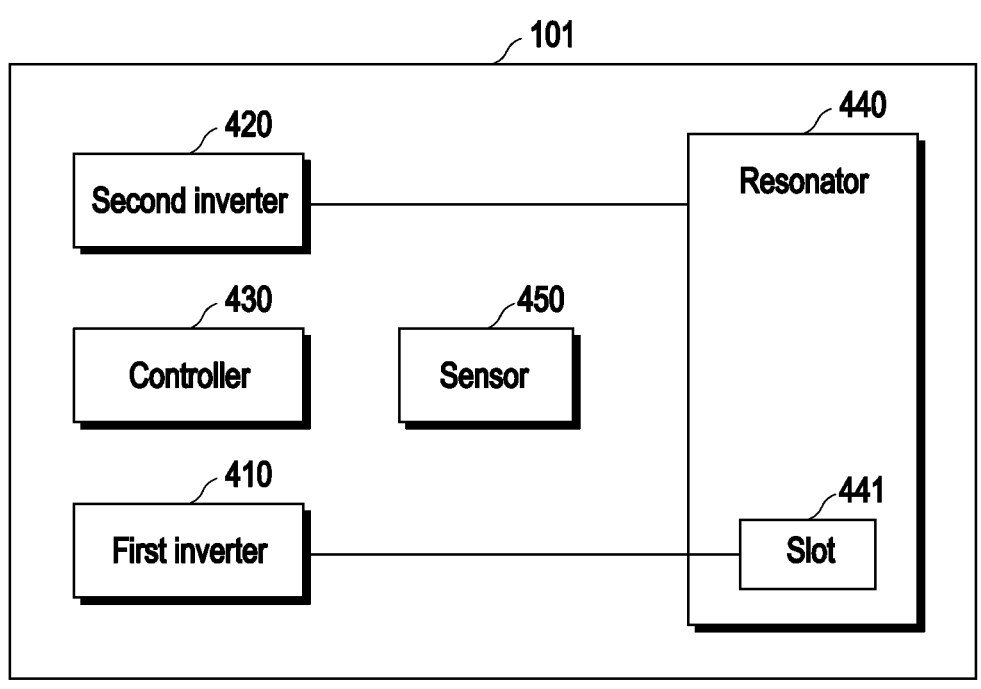
FIG. 4A is a block diagram of an electronic device according to an embodiment of the disclosure.
Figure 4B:
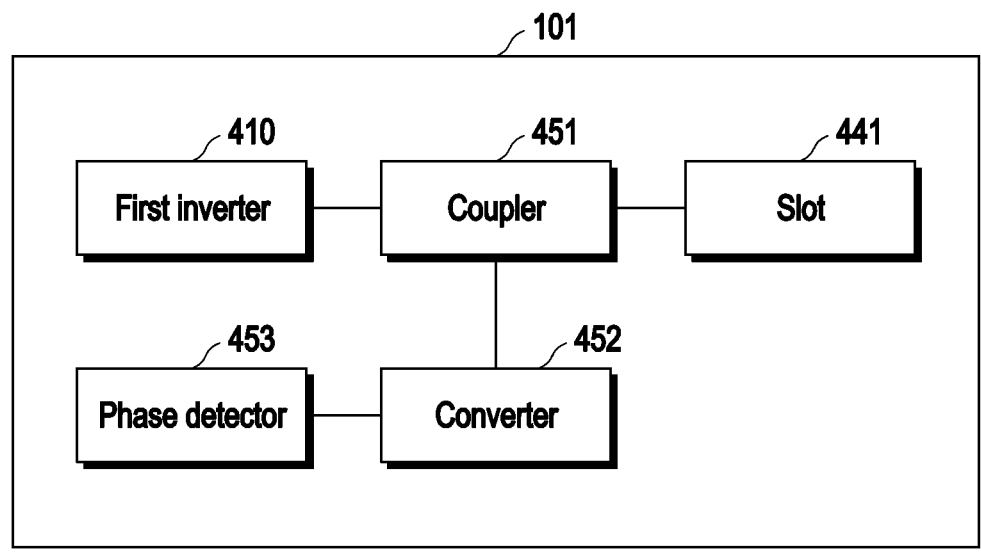
FIG. 4B is a block diagram of an electronic device according to an embodiment of the disclosure.

FIG. 4A is a block diagram of an electronic device according to an embodiment of the disclosure. FIG. 4B is a block diagram of an electronic device according to an embodiment of the disclosure.

Referring to FIG. 4A, the electronic device 101 according to various embodiments may include a controller 430, a first inverter 410, a second inverter 420, a resonator 440, and a sensor 450.

According to various embodiments, an inverter (e.g., the first inverter 410 or the second inverter 420) may receive direct current (DC) power from a power source (not illustrated). For example, a power source (not illustrated) providing DC power to the first inverter 410 and a power source (not illustrated) providing DC power to the second inverter 420 may be identical to each other, or different from each other. The providing of DC power may be understood as at least one of an application of a DC voltage or an application of a DC current. The power source (not illustrated) may receive power from at least one of a DC power source or an alternating current (AC) power source, and output DC power. The power source (not illustrated) may be controlled by the controller 430, and the controller 430 may control the power source (not illustrated) to provide power to the inverter (e.g., the first inverter 410 or the second inverter 420), based on a configured output level.

According to various embodiments, the inverter (e.g., the first inverter 410 or the second inverter 420) may output AC power by using DC power received from the power source (not illustrated). The output of AC power may be understood as at least one of application of an AC voltage or application of an AC current. The inverter (e.g., the first inverter 410 or the second inverter 420) may provide AC power to the resonator 440. The inverter (e.g., the first inverter 410 or the second inverter 420) may be controlled by the controller 430, and the controller 430 may control the inverter (e.g., the first inverter 410 or the second inverter 420) to provide power to the resonator 440, based on a configured output level. The inverter (e.g., the first inverter 410 or the second inverter 420) may control at least one of the width, the duty cycle, or the power level of a pulse output by the inverter. Alternatively, the controller 430 may control an output level (e.g., the driving voltage (VDD) of the inverter) output from the power source (not illustrated).

According to various embodiments, the resonator 440 may transmit wireless power to the outside, based on alternating current power received from the inverter (e.g., the second inverter 420). For example, the resonator 440 may be the first resonator 230 or the second resonator 240 in FIG. 2. Alternatively, for example, the resonator 440 may transmit wireless power as the transmission coil 311L in FIG. 3. Alternatively, for example, the resonator 440 may include or may be the transmission coil 311L in FIG. 3. According to various embodiments, the resonator 440 may include at least one slot (e.g., a slot 441). An expression of including a slot may imply, for example, that a slot is provided on a material configuring the resonator 440, and the type of the at least one slot (e.g., the slot 441) included in the resonator 440 will be described with reference to FIGS. 6, 7, 16, 17, and 25. For example, the resonator 440 may identify an external object adjacent to the electronic device 101, based on an electric field (or a magnetic field) generated by the at least one slot (e.g., the slot 441) according to reception of alternating current power from the inverter (e.g., the first inverter 410). For example, the controller 430 may identify an external object adjacent to the electronic device 101 by using the resonator 440. For example, the slot 441 may indicate an empty space provided in the resonator 440. For example, an area of the resonator 440 in which the slot 441 is disposed may indicate a boundary area between the resonator 440 and an empty space (e.g., the slot 441) provided in the resonator 440. For example, at least one point included in an area of the resonator 440 in which the slot 441 is disposed may indicate at least one point included in a boundary area between the resonator 440 and an empty space (e.g., the slot 441) provided in the resonator 440. For example, a configuration connected to the slot 441 may imply that the configuration is connected to at least one point among the at least one point included in an area of the resonator 440 in which the slot 441 is disposed. For example, power applied to the slot 441 may imply that the power is applied to at least one point included in an area of the resonator 440 in which the slot 441 is disposed. For example, identifying the impedance of the slot 441 may imply identifying the impedance of at least one point included in an area of the resonator 440 in which the slot 441 is disposed.

According to various embodiments, the sensor 450 may sense at least one of voltage, current, power, or impedance applied to the resonator 440. For example, the sensor 450 may sense the impedance of at least one point of the resonator 440. FIG. 4A illustrates that one sensor (e.g., the sensor 450) is included, but the sensor 450 may include at least one sensor (e.g., a first sensor and/or a second sensor). For example, as illustrated in FIG. 4A, one sensor (e.g., the sensor 450) may sense at least one point of the resonator 440, or the first sensor included in the sensor 450 may sense at least one point (e.g., at least one first point) of the resonator 440, and the second sensor included in the sensor 450 may sense at least one different point (e.g., at least one second point) of the resonator 440. For example, the controller 430 may sense at least one of voltage, current, power, or impedance applied to at least one point of the resonator 440 by using the sensor 450.

According to various embodiments, the controller 430 may be the control circuit 312 in FIG. 3. For example, the controller 430 may control the first inverter 410 and/or the second inverter 420 to apply power to at least one point of the resonator 440. For example, the controller 430 may control the first inverter 410 to apply first power to the resonator 440. For example, the controller 430 may control the second inverter 420 to apply second power to the resonator 440. For example, the controller 430 may control the first inverter 410 connected to a first point and a second point of the resonator 440 to apply first power having a first frequency to the resonator 440. For example, the first inverter may be connected to the first point and the second point of the resonator 440, and the first point and the second point may be opposite while the slot 441 is disposed therebetween. For example, the controller 430 may identify, using the sensor 450 (e.g., the first sensor included in the sensor 450) the impedance of the first point and the second point of the resonator 440, to which the first inverter 410 is connected. For example, the controller 430 identifying the impedance of the slot 441 may be understood as the controller 430 identifying the impedance of the first point and the second point of the resonator 440, which are opposite while the slot 441 is disposed therebetween. According to various embodiments, the controller 430 may control the second inverter 420 connected to at least one point (e.g., a third point and a fourth point) different from the first point and the second point of the resonator 440, to apply second power having a second frequency different from the first frequency to the resonator 440. For example, the controller 430 may identify, using the sensor 450 (e.g., the second sensor included in the sensor 450) the impedance of the at least one point (e.g., the third point and the fourth point) of the resonator 440, to which the second inverter 420 is connected.

Referring to FIG. 4B, the electronic device 101 according to various embodiments may include the first inverter 410, a coupler 451, a converter 452, a phase detector 453, and the slot 441 (e.g., the slot 441 included in the resonator 440 in FIG. 4A). For example, the sensor 450 in FIG. 4A may include the coupler 451, the converter 452, and the phase detector 453 in FIG. 4B.

According to various embodiments, the coupler 451 may connect the first inverter 410 to the resonator 440. For example, the coupler 451 may be connected to the first inverter 410. For example, the coupler 451 may be connected to the resonator 440. For example, the coupler 451 may be connected to the slot 441 of the resonator 440. For example, the coupler 451 connected to the slot 441 may be understood as the coupler 451 connected to a first point and a second point of the resonator 440, which are opposite while the slot 441 is disposed therebetween. For example, the coupler 451 may be connected to the converter 452. For example, the coupler 451 may transfer at least a part of power provided from the first inverter 410, to the resonator 440 (e.g., the slot 441 of the resonator 440). For example, the coupler 451 may transfer at least a part of power provided from the first inverter 410, to the converter 452. For example, the coupler 451 may transfer, to the converter 452, at least a part of power transferred from the resonator 440 (e.g., the slot 441 of the resonator 440). For example, the coupler 451 may serve as a passage for transferring power between the first inverter 410, the resonator 440 (e.g., the slot 441 of the resonator 440), and the converter 452.

According to various embodiments, the converter 452 may receive power transferred from the coupler 451. For example, the converter 452 may receive first power (e.g., a first voltage or a first current) (e.g., at least a part of power provided from the first inverter 410 to the coupler 451) transferred from the coupler 451. For example, the converter 452 may receive second power (e.g., a second voltage or a second current) (e.g., at least a part of power provided from the resonator 440 (e.g., the slot 441 of the resonator 440) to the coupler 451) transferred from the coupler 451. For example, the converter 452 may provide, to the phase detector 453, a signal obtained by converting power (e.g., voltage and/or current) received from the coupler 451. For example, the converter 452 may provide, to the phase detector 453, a first signal obtained by converting first power (e.g., at least a part of power provided from the first inverter 410 to the coupler 451), and may provide, to the phase detector 453, a second signal obtained by converting second power (e.g., at least a part of power provided from the resonator 440 (e.g., the slot 441 of the resonator 440) to the coupler 451).

According to various embodiments, the phase detector 453 may receive a converted signal transferred from the converter 452. For example, the phase detector 453 may compare multiple converted signals transferred from the converter 452 so as to detect a phase difference. For example, the controller 430 may identify first impedance of the slot 441 (e.g., a first point and a second point of the resonator 440, which are opposite while the slot 441 is disposed therebetween) of the resonator 440, and may detect the phase of the first impedance by using the phase detector 453. For example, the controller 430 may compare, using the phase detector 453, a first signal (e.g., a signal obtained by converting, by the converter 452, at least a part of power provided from the first inverter 410 to the coupler 451) with a second signal (e.g., a signal obtained by converting, by the converter 452, at least a part of power provided from the resonator 440 (e.g., the slot 441 of the resonator 440) to the coupler 451) so as to detect the phase of impedance of the slot 441 (e.g., a first point and a second point of the resonator 440, which are opposite while the slot 441 is disposed therebetween) of the resonator 440. A scheme by which the controller 430 detects the impedance (or the phase of the impedance) of at least one point of the resonator 440 by using the sensor 450 (e.g., the coupler 451, the converter 452, and the phase detector 453 included in the sensor 450) merely corresponds to an example, and there is no limit to the scheme. For example, the controller 430 identifying the phase of impedance by using the sensor 450 (or the phase detector 453) may imply that the controller 430 identifies the inclination of impedance by using the sensor 450 (or the phase detector 453). For example, when impedance Z is equal to R+jX (Z=R+jX), the phase of the impedance may be defined as $\arctan(X/R)$. For example, when impedance Z is equal to R+jX (Z=R+jX), the inclination of the impedance may be defined as X/R. For example, when impedance Z is equal to R+jX at a resonant frequency (Z=R+jX), a Q factor may be defined as X/R.

Figure 5:
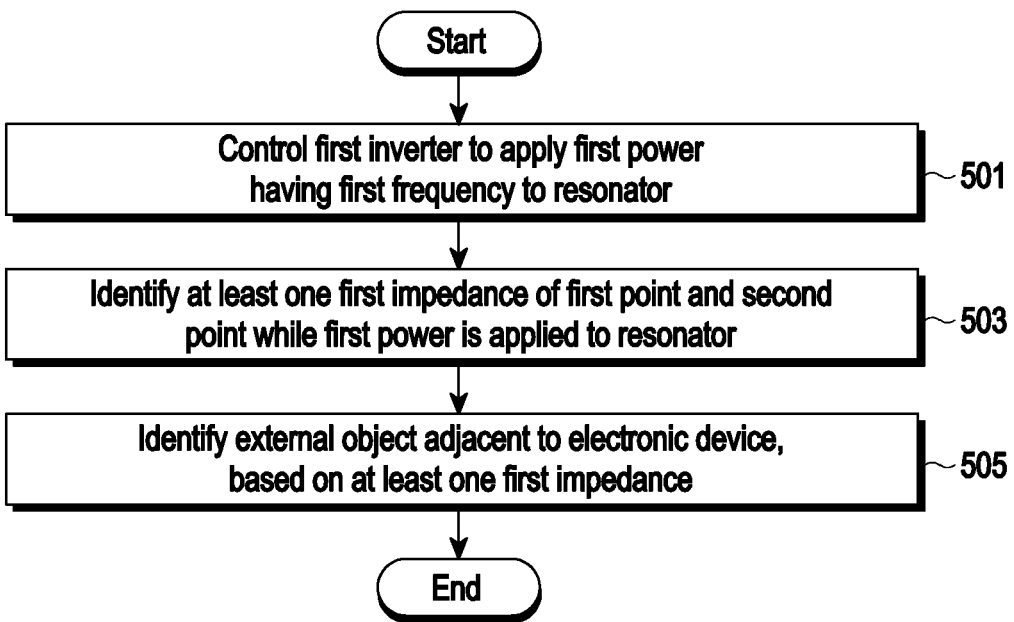
FIG. 5 is a flowchart illustrating an operation of an electronic device according to an embodiment of the disclosure.

FIG. 5 is a flowchart illustrating an operation of an electronic device according to an embodiment of the disclosure. FIG. 5 will be described with reference to FIGS. 4A, 4B, 6, and 7.

Figure 6:
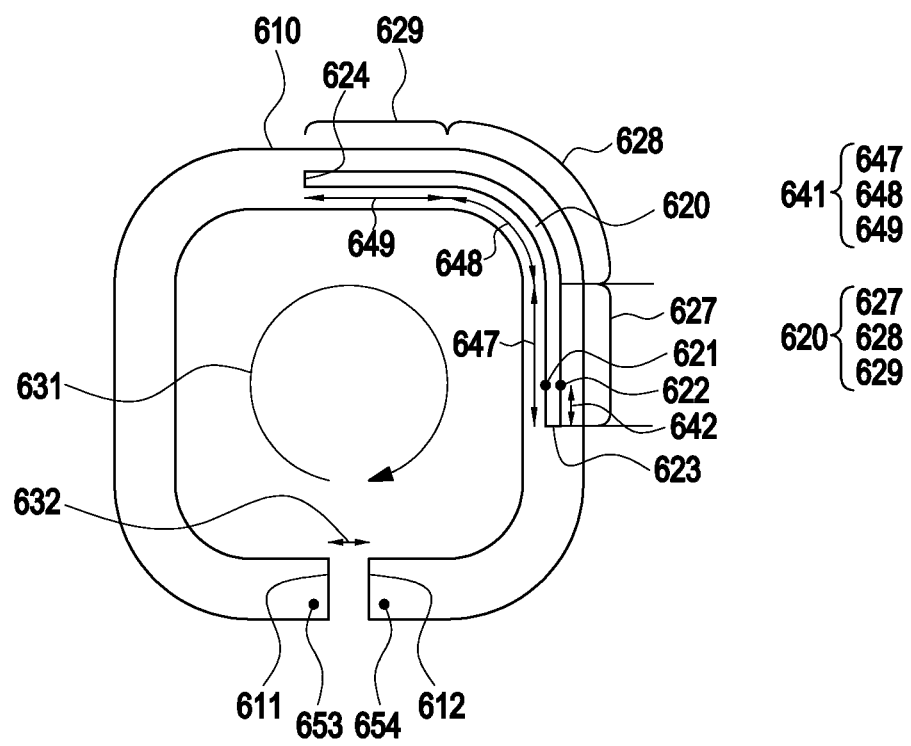
FIG. 6 is a diagram illustrating a resonator included in an electronic device according to an embodiment of the disclosure.

FIG. 6 is a diagram illustrating a resonator included in an electronic device according to an embodiment of the disclosure.

Figure 7:
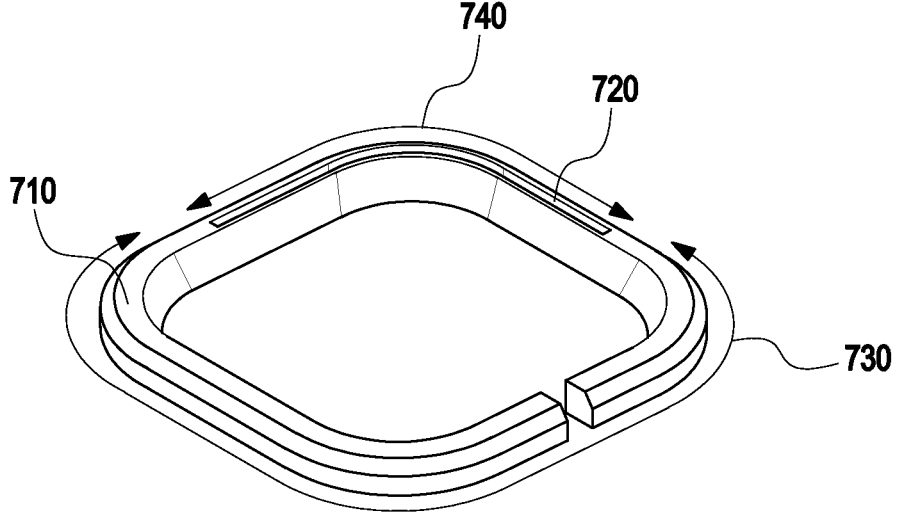
FIG. 7 is a diagram illustrating a resonator included in an electronic device according to an embodiment of the disclosure.

FIG. 7 is a diagram illustrating a resonator included in an electronic device according to an embodiment of the disclosure.

FIG. 6 is a plan view of a resonator 610 included in the electronic device 101 according to an embodiment of the disclosure. For example, a resonator (e.g., the resonator 610 in FIG. 6, a resonator 1610 in FIG. 16, or a resonator 2510 in FIG. 25) included in the electronic device 101 may be configured to be flat. For example, a resonator (e.g., the resonator 610 in FIG. 6, the resonator 1610 in FIG. 16, or the resonator 2510 in FIG. 25) may be disposed on a printed circuit board (PCB). As another example, a resonator (e.g., a resonator 710 in FIG. 7 or a resonator 1710 in FIG. 17) included in the electronic device 101 may be configured to be stereoscopic in a space. For example, a resonator (e.g., the resonator 710 in FIG. 7 or the resonator 1710 in FIG. 17) may have a shape of a donut. For example, FIG. 6 (e.g., the resonator 610), FIG. 16 (e.g., the resonator 1610), or FIG. 25 (e.g., the resonator 2510) may be a diagram showing a shape of the resonator 710 in FIG. 7, the resonator 1710 in FIG. 17, or the resonator 2510 in FIG. 25, which is configured to be stereoscopic in a space, when viewed from the upper side thereof. For example, the resonator 610 in FIG. 6 may be the resonator 710 in FIG. 7, and the resonator 1610 in FIG. 16 may be the resonator 1710 in FIG. 17. For example, a resonator (e.g., the resonator 710 in FIG. 7 or the resonator 1710 in FIG. 17) may have a shape of a donut, the inside of which is filled. As another example, in a resonator (e.g., the resonator 710 in FIG. 7 or the resonator 1710 in FIG. 17), a part (e.g., reference numeral 740 in FIG. 7 or a most area illustrated in FIG. 17) on which a slot (e.g., a slot 720 in FIG. 7 or a slot 1720 in FIG. 17) is configured to have a shape of a donut in which the inside of the resonator is filled. However, a part (e.g., reference numeral 730 in FIG. 7) on which a slot is not configured may have a shape of a tube in which the inside of the resonator is not filled. For example, a slot (e.g., a slot 620 in FIG. 6, the slot 720 in FIG. 7, a slot 1620 in FIG. 16, the slot 1720 in FIG. 17, and a first slot 2520 and a second slot 2530 in FIG. 25) of a resonator (e.g., the resonator 610 in FIG. 6, the resonator 710 in FIG. 7, the resonator 1610 in FIG. 16, the resonator 1710 in FIG. 17, and the resonator 2510 in FIG. 25) may be configured in a center part of the resonator. As another example, a slot (e.g., the slot 620 in FIG. 6, the slot 720 in FIG. 7, the slot 1620 in FIG. 16, the slot 1720 in FIG. 17, and a first slot 2520 and a second slot 2530 in FIG. 25) of a resonator (e.g., the resonator 610 in FIG. 6, the resonator 710 in FIG. 7, the resonator 1610 in FIG. 16, the resonator 1710 in FIG. 17, and the resonator 2510 in FIG. 25) may be configured in a peripheral area of the resonator. For example, configuring a slot (e.g., the slot 620 in FIG. 6, the slot 720 in FIG. 7, the slot 1620 in FIG. 16, the slot 1720 in FIG. 17, and a first slot 2520 and a second slot 2530 in FIG. 25) of a resonator (e.g., the resonator 610 in FIG. 6, the resonator 710 in FIG. 7, the resonator 1610 in FIG. 16, the resonator 1710 in FIG. 17, and the resonator 2510 in FIG. 25) in a peripheral area of the resonator may imply that the distance between the slot of the resonator and an inner surface of the resonator is greater than the distance between the slot of the resonator and an outer surface of the resonator. The shape of a resonator (e.g., the resonator 610 in FIG. 6, the resonator 710 in FIG. 7, the resonator 1610 in FIG. 16, the resonator 1710 in FIG. 17, and the resonator 2510 in FIG. 25) corresponds to an example, there is no limit to the shape of a resonator, and a person skilled in the art will understand that embodiments disclosed in this specification may be applied regardless of the shape of a resonator. For example, the resonator 710 in FIG. 7 and the resonator 1710 in FIG. 17 are illustrated to have at least an angled part. However, this corresponds to an example, and the resonator may have a shape of a loop having continuous smooth circular surfaces.

Referring to FIG. 6, according to various embodiments, the electronic device 101 may include the resonator 610 in FIG. 6. For example, the resonator 610 may have a shape of a loop. For example, the resonator 610 may have a shape of a loop extending from one end 612 of the resonator 610 to the other end 611. For example, the resonator 610 may have an empty space having a first length 632 between the one end 612 and the other end 611 of the resonator 610. For example, the resonator 610 may include a capacitor in an area (e.g., an area corresponding to the empty space having the first length 632 illustrated in FIG. 6) between the one end 612 and the other end 611. There is no limit to the position of the capacitor included in the resonator 610. For example, the resonator 610 may be connected to a capacitor disposed in a different area than an area (e.g., an area corresponding to the empty space having the first length 632 illustrated in FIG. 6) between the one end 612 and the other end 611. For example, the capacitor disposed in the different area may be understood to be included in the resonator 610. For example, a part having a shape of a loop and the capacitor may be connected to each other so that the resonator 610 resonates. A person skilled in the art will understand that the description given above related to the shape, the empty space, and the capacitor of the resonator 610 may be applied to a resonator (e.g., the resonator 710 in FIG. 7, the resonator 1610 in FIG. 16, the resonator 1710 in FIG. 17, and the resonator 2510 in FIG. 25) described later.

According to various embodiments, the resonator 610 may include the slot 620. For example, the slot 620 may be configured in a loop direction 631 of the resonator 610. For example, the slot 620 may have a designated shape having a designated length 641 in the loop direction 631 of the resonator 610. For example, the slot 620 may include a first sub slot 627 extending in a first direction (e.g., the longitudinal direction in FIG. 6), a second sub slot 629 extending in a second direction (e.g., the transverse direction in FIG. 6) different from the first direction, and a third sub slot 628 between the first sub slot 627 and the second sub slot 629. For example, the third sub slot 628 may have a shape curved according to the shape of the resonator 610. For example, the slot 620 may have the designated length 641 by including the first sub slot 627 having a first length 647, the second sub slot 629 having a second length 649, and the third sub slot 628 having a third length 648. A person skilled in the art will understand that the description related to the length (e.g., the designated length 641) of a slot (e.g., the slot 620) and a sub slot (e.g., the first sub slot 627, the second sub slot 629, and the third sub slot 628) included in the slot (e.g., the slot 620) may also be applied to the resonators in FIGS. 7, 16, 17, and 25.

A person skilled in the art will understand that an embodiment of FIG. 5 described hereinafter can also be applied to the resonators illustrated in FIGS. 16 and 25 as well as that of FIG. 6, and moreover, the embodiment of FIG. 5 can be applied to a resonator including a slot (e.g., a slot extending in the first direction (e.g., the longitudinal direction in FIG. 6)) having various shapes not illustrated in the drawings.

Referring to FIG. 5, in operation 501, according to various embodiments, the electronic device 101 (e.g., the controller 430 of the electronic device 101) may control the first inverter 410 to apply first power having a first frequency to a resonator (e.g., the resonator 610 in FIG. 6). For example, referring to FIG. 6, the first inverter 410 may be connected to a first point 621 and a second point 622 of the resonator 610. For example, the first point 621 and the second point 622 of the resonator 610 may be opposite while the slot 620 of the resonator 610 is disposed therebetween. For example, the first point 621 and the second point 622 of the resonator 610 may be spaced a designated distance (e.g., a first distance 642) apart from the closer end 623 of the slot 620 among one end 623 of the slot 620 and another end 624 of the slot 620. The designated distance (e.g., the first distance 642) will be described with reference to FIGS. 9A and 9B. The positions of the first point 621 and the second point 622 correspond to examples, and there is no limit to the positions of the first point 621 and the second point 622. For example, the electronic device 101 may determine the first frequency of the first power applied by the first inverter 410. A scheme by which the electronic device 101 determines the frequency will be described later. For example, the frequency may be a designated value, and in this case, an operation of determining the frequency by the electronic device 101 may be omitted.

In operation 503, according to various embodiments, the electronic device 101 may identify at least one impedance of the first point (e.g., reference numeral 621 in FIG. 6) and the second point (e.g., reference numeral 622 in FIG. 6) while the first power is applied to the resonator (e.g., the resonator 610 in FIG. 6). For example, referring to FIG. 6, the electronic device 101 may periodically or continuously identify at least one impedance of the first point 621 and the second point 622 while the first power is applied to the resonator 610. For example, the at least one impedance may indicate an impedance identified at one time point or multiple impedances measured time-sequentially.

In operation 505, according to various embodiments, the electronic device 101 may identify an external object (e.g., reference numeral 1130 or 1140 in FIG. 11) adjacent to the electronic device 101, based on the at least one impedance of the first point (e.g., reference numeral 621 in FIG. 6) and the second point (e.g., reference numeral 622 in FIG. 6). For example, the electronic device 101 may identify an external object (e.g., reference numeral 1130 or 1140 in FIG. 11) adjacent to the electronic device 101, based on the inclination (or phase) of the at least one impedance of the first point (e.g., reference numeral 621 in FIG. 6) and the second point (e.g., reference numeral 622 in FIG. 6). For example, the electronic device 101 may identify an external object (e.g., reference numeral 1130 or 1140 in FIG. 11) adjacent to the electronic device 101, based on a change in the inclination (or phase) of the at least one impedance of the first point (e.g., reference numeral 621 in FIG. 6) and the second point (e.g., reference numeral 622 in FIG. 6). For example, the electronic device 101 may identify whether there is an external object (e.g., reference numeral 1130 or 1140 in FIG. 11) adjacent to the electronic device 101, and/or identification information of the external object, based on the impedance of, at one time point, the first point (e.g., reference numeral 621 in FIG. 6) and the second point (e.g., reference numeral 622 in FIG. 6). A scheme of identifying the external object (e.g., reference numeral 1130 or 1140 in FIG. 11) adjacent to the electronic device 101 will be described later with reference to FIGS. 11, 12A, 12B, 13, and 14.

Figure 8:
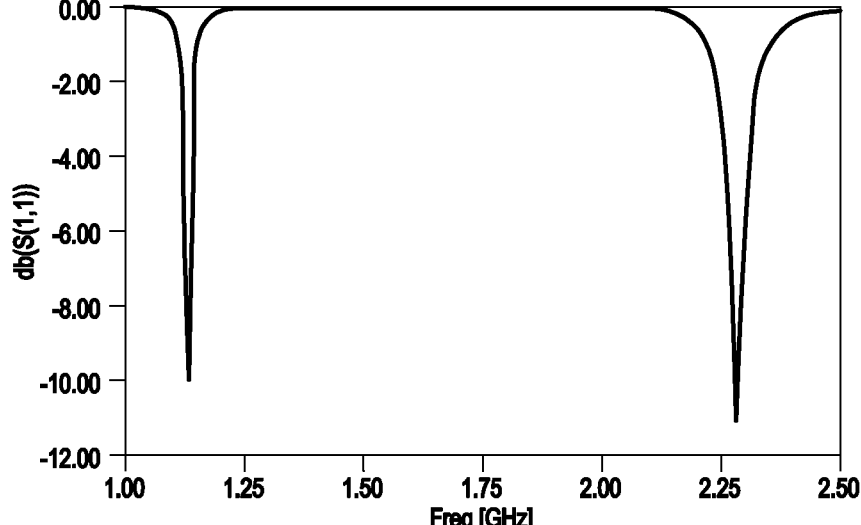
FIG. 8 is a diagram illustrating an operation of an electronic device according to an embodiment of the disclosure.

FIG. 8 is a diagram illustrating an operation of an electronic device according to an embodiment of the disclosure.

FIG. 8 illustrates a graph of a reflection coefficient according to the frequency of power applied to a slot (e.g., the slot 620 in FIG. 6) included in a resonator (e.g., the resonator 610 in FIG. 6) of the electronic device 101.

Referring to FIG. 8, according to various embodiments, it may be noted that a resonance occurs when first power having a first frequency (e.g., 1.13 GHz in FIG. 8) is applied to a slot (e.g., the slot 620 in FIG. 6) included in a resonator (e.g., the resonator 610 in FIG. 6) of the electronic device 101, or when second power having a second frequency (e.g., 2.3 GHz in FIG. 8) is applied thereto. For example, the first frequency (e.g., 1.13 GHz in FIG. 8) and the second frequency (e.g., 2.3 GHz in FIG. 8) may be determined according to the length and/or shape of the slot (e.g., the slot 620 in FIG. 6) included in the resonator (e.g., reference numeral 610 in FIG. 6) of the electronic device 101. For example, the electronic device 101 (e.g., the controller 430 of the electronic device 101) may determine the frequency of power applied to the slot (e.g., the slot 620 in FIG. 6), based on the length and/or shape of the slot (e.g., the slot 620 in FIG. 6) included in the resonator (e.g., reference numeral 610 in FIG. 6) of the electronic device 101. For example, the electronic device 101 may control the first inverter 410 to apply, to the slot (e.g., the slot 620 in FIG. 6), power having a frequency designated based on the length and/or shape of the slot (e.g., the slot 620 in FIG. 6).

Figure 9A:
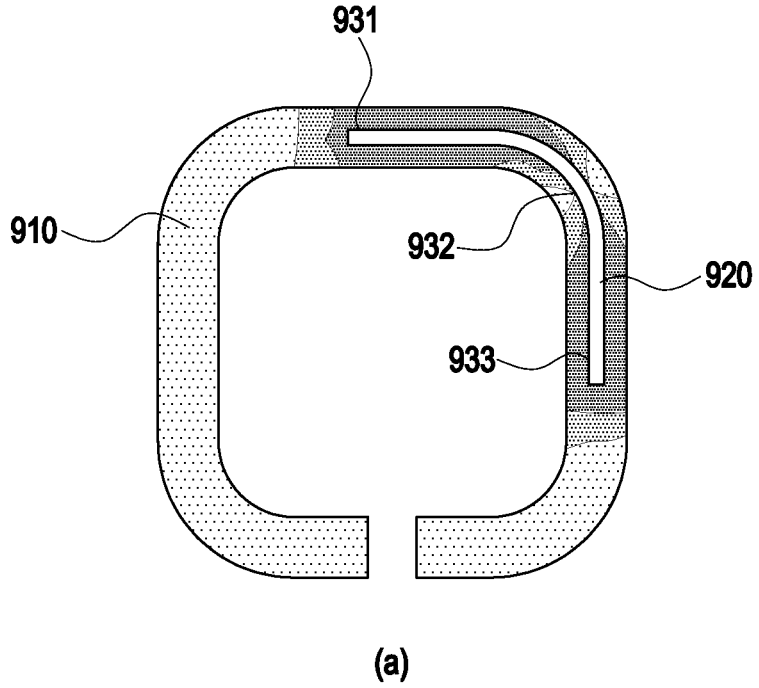
FIG. 9A is a diagram illustrating an operation of an electronic device according to an embodiment of the disclosure.
Figure 9A:
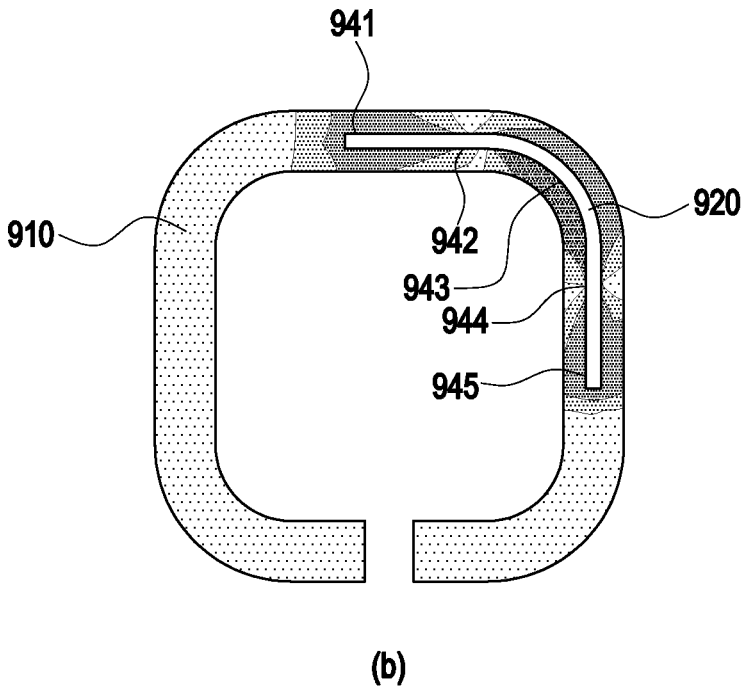

FIG. 9A is a diagram illustrating an operation of an electronic device according to an embodiment of the disclosure.

Figure 9B:
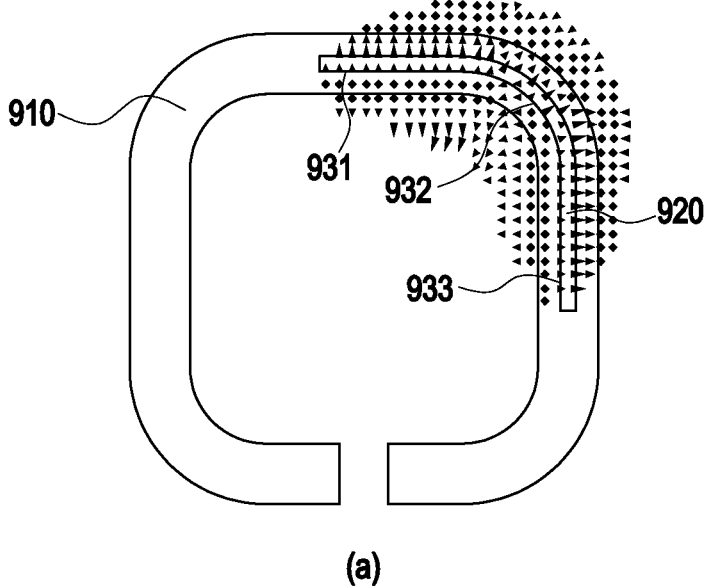
FIG. 9B is a diagram illustrating an operation of an electronic device according to an embodiment of the disclosure.
Figure 9B:
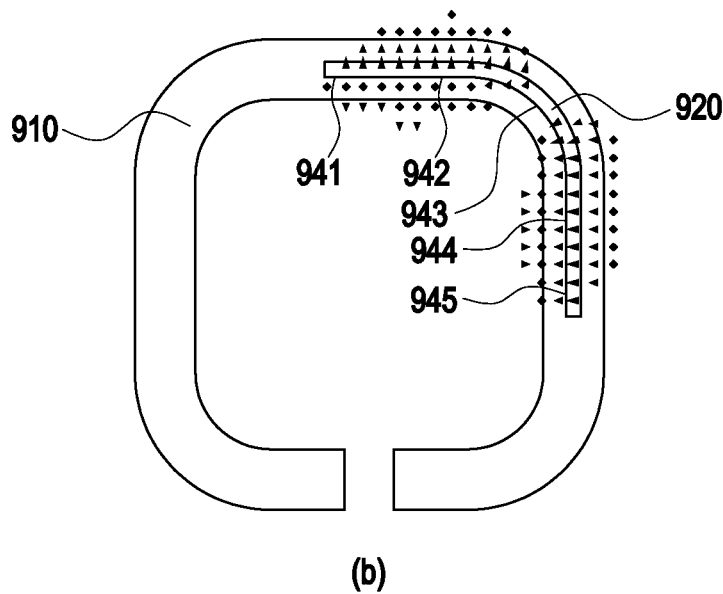

FIG. 9B is a diagram illustrating an operation of an electronic device according to an embodiment of the disclosure.

Figure 10:
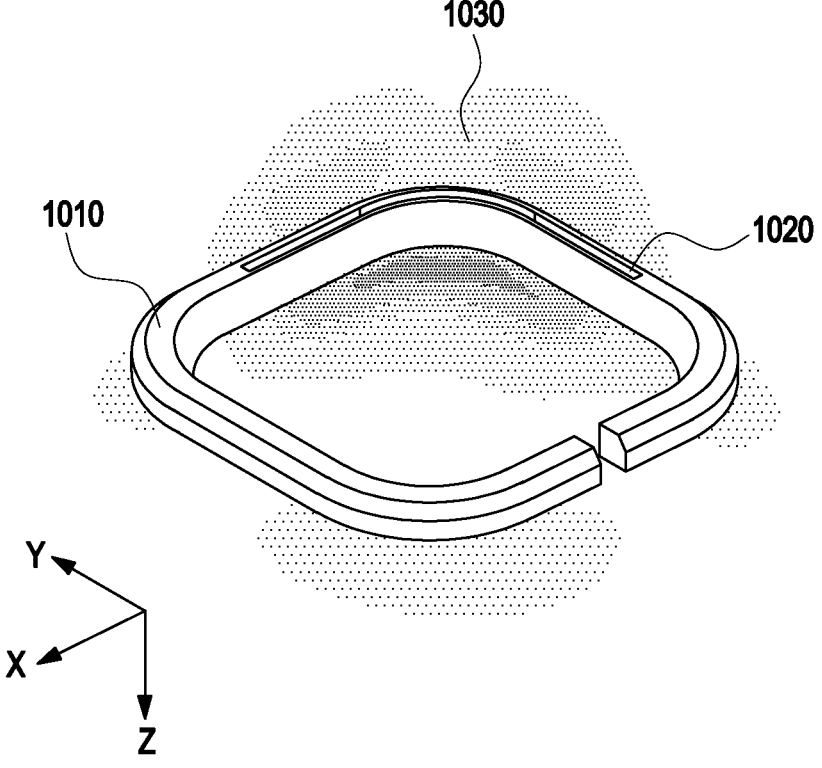
FIG. 10 is a diagram illustrating an operation of an electronic device according to an embodiment of the disclosure.

FIG. 10 is a diagram illustrating an operation of an electronic device according to an embodiment of the disclosure.

FIG. 9A is a diagram showing the current distribution of a resonator 910 (e.g., the resonator 610 in FIG. 6) of the electronic device 101 when power having a designated frequency is applied to a slot 920 (e.g., the slot 620 in FIG. 6) included in the resonator 910. For example, diagram (a) of FIG. 9A is a diagram showing the current distribution of the resonator 910 when first power having a first frequency (e.g., 1.13 GHz in FIG. 8) is applied to the slot 920 included in the resonator 910 of the electronic device 101. For example, in diagram (a) of FIG. 9A, it may be noted that the current has a maximum value at a first point 931 positioned at a designated distance from one end of the slot 920 and a third point 933 positioned at a designated distance from the other end of the slot 920, and it may be noted that the current has a minimum value at a second point 932 positioned at the center of the slot 920. For example, diagram (b) of FIG. 9A is a diagram showing the current distribution of the resonator 910 when second power having a second frequency (e.g., 2.3 GHz in FIG. 8) is applied to the slot 920 included in the resonator 910 of the electronic device 101. For example, in diagram (b) of FIG. 9A, it may be noted that the current has a maximum value at a first point 941 positioned at a designated distance from one end of the slot 920, a third point 943 positioned at the center of the slot 920, and a fifth point 945 positioned at a designated distance from the other end of the slot 920, and it may be noted that the current has a minimum value at a second point 942 and a fourth point 944 of the slot 920.

Although not illustrated, in a scheme similar to the scheme described with reference to diagram (a) and diagram (b) of FIG. 9A, when power having a designated frequency is applied to the slot 920 included in the resonator 910 of the electronic device 101, the voltage distribution of the resonator 910 may be obtained.

According to various embodiments, the first point 621 and the second point 622 of the slot 620 included in the resonator 610 in FIG. 6 may be determined based on the current distribution of the resonator 910 illustrated in FIG. 9A and a voltage distribution obtained by a scheme similar thereto. For example, a current distribution and a voltage distribution of the resonator 910 may be determined according to the length and shape of a slot (e.g., the slot 620 in FIG. 6), and accordingly, a first point (e.g., reference numeral 621 in FIG. 6) and a second point (e.g., reference numeral 622 in FIG. 6) of a resonator (e.g., reference numeral 610 in FIG. 6), which are to be connected to the first inverter 410 of the electronic device 101, may be determined.

FIG. 9B is a diagram illustrating the distribution of an electric field generated around the resonator 910 of the electronic device 101 when power having a designated frequency is applied to the slot 920 included in the resonator 910. For example, diagram (a) of FIG. 9B is a diagram showing the distribution of an electric field generated around the resonator 910 when first power having a first frequency (e.g., 1.13 GHz in FIG. 8) is applied to the slot 920 included in the resonator 910 of the electronic device 101. For example, in diagram (a) of FIG. 9B, it may be noted that the electric field has a minimum value near the first point 931 positioned at a designated distance from one end of the slot 920 and the third point 933 positioned at a designated distance from the other end of the slot 920, and it may be noted that the electric field has a maximum value near the second point 932 positioned at the center of the slot 920. For example, diagram (b) of FIG. 9B is a diagram showing the distribution of an electric field generated around the resonator 910 when second power having a second frequency (e.g., 2.3 GHz in FIG. 8) is applied to the slot 920 included in the resonator 910 of the electronic device 101. For example, in diagram (b) of FIG. 9B, it may be noted that the electric field has a minimum value around the first point 941 positioned at a designated distance from one end of the slot 920, the third point 943 positioned at the center of the slot 920, and the fifth point 945 positioned at a designated distance from the other end of the slot 920, and it may be noted that the electric field has a maximum value around the second point 942 and the fourth point 944 of the slot 920.

FIG. 10 is a diagram showing a distribution 1030 of an electric field generated around a resonator 1010 of the electronic device 101 when power having a designated frequency is applied to a slot 1020 included in the resonator 1010. For example, the distribution 1030 of an electric field generated around the resonator 1010 may be changed according to the length and/or shape of the slot 1020 included in the resonator 1010.

Figure 11:
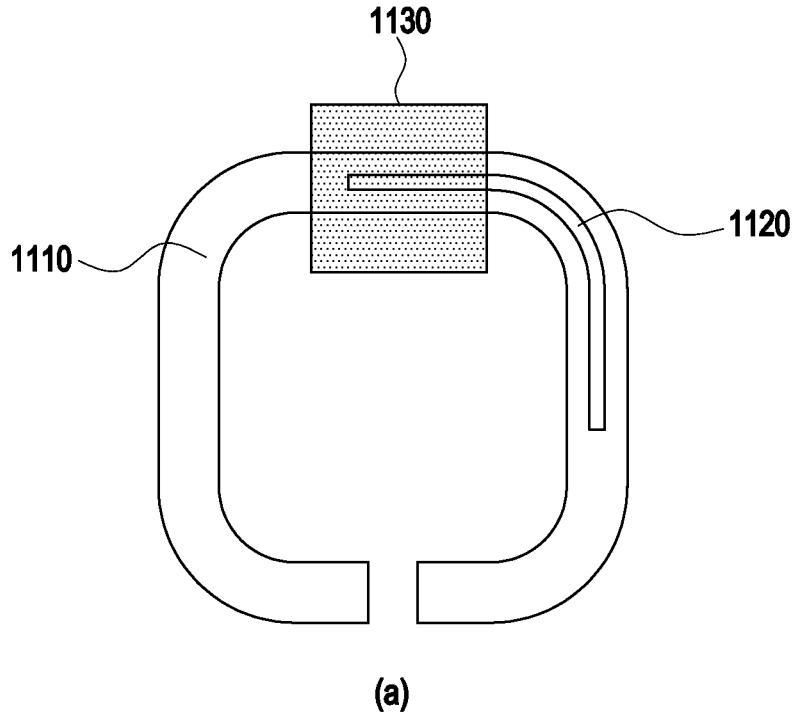
FIG. 11 is a diagram illustrating an operation of an electronic device according to an embodiment of the disclosure.
Figure 11:
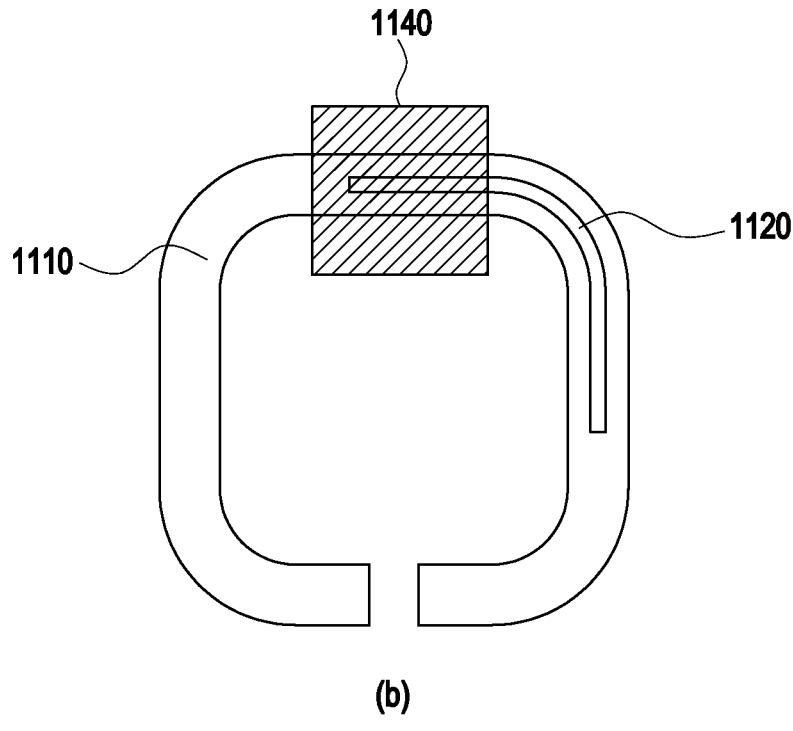

FIG. 11 is a diagram illustrating an operation of an electronic device according to an embodiment of the disclosure.

Figure 12A:
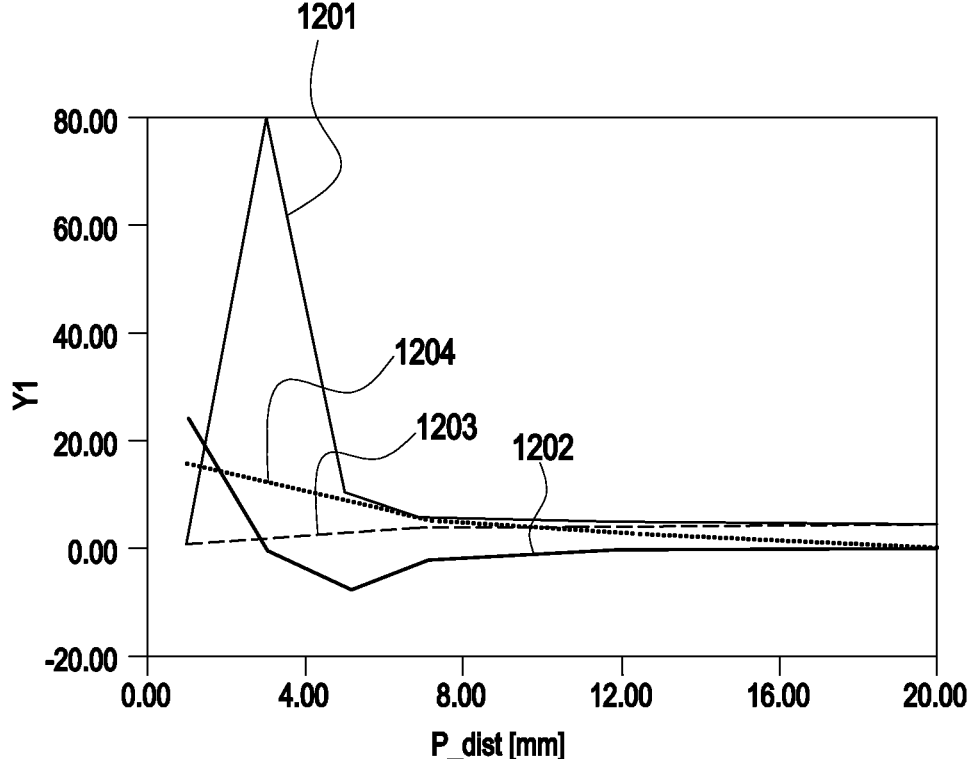
FIG. 12A is a diagram illustrating an operation of an electronic device according to an embodiment of the disclosure.

FIG. 12A is a diagram illustrating an operation of an electronic device according to an embodiment of the disclosure.

Figure 12B:
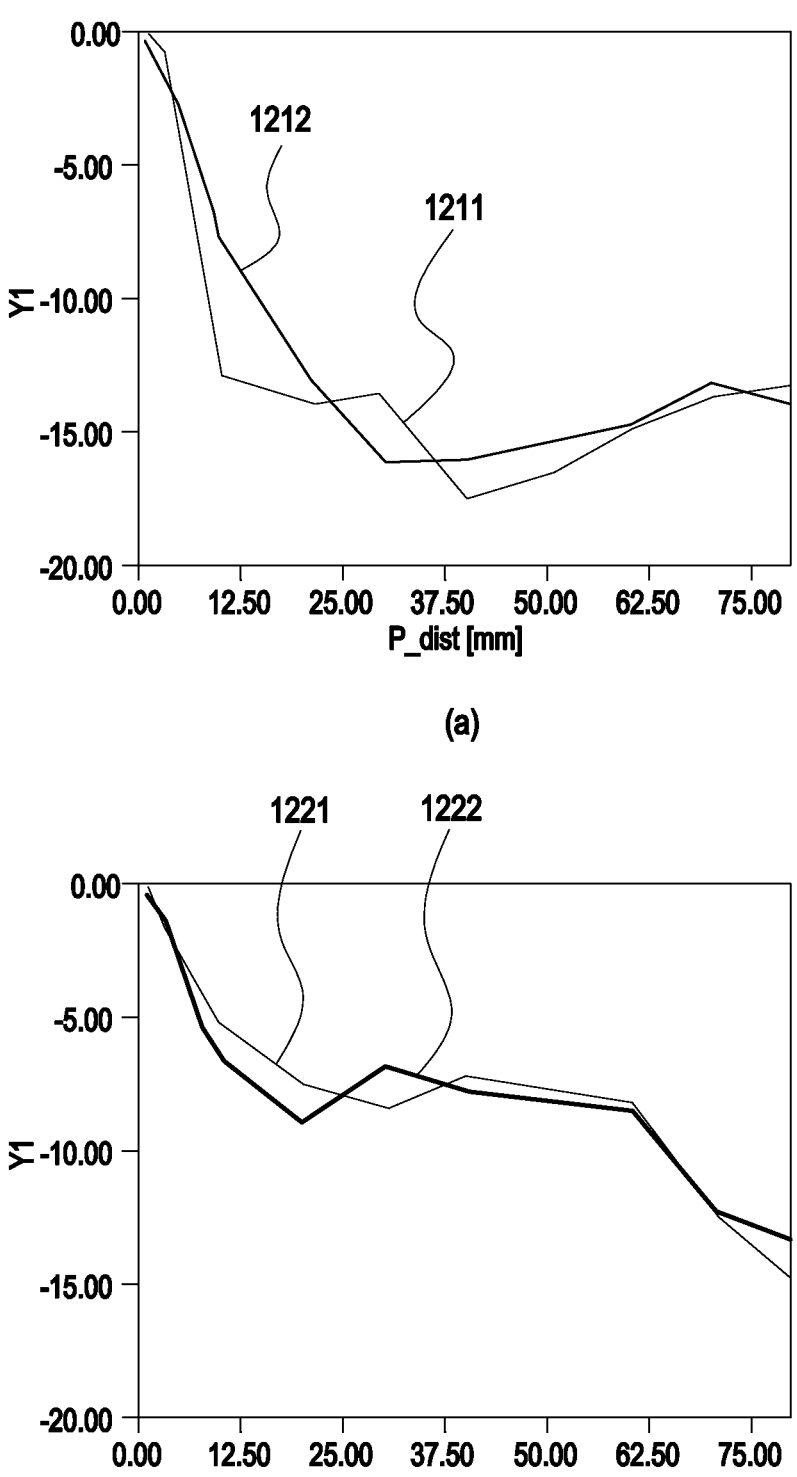
FIG. 12B is a diagram illustrating an operation of an electronic device according to an embodiment of the disclosure.

FIG. 12B is a diagram illustrating an operation of an electronic device according to an embodiment of the disclosure.

FIG. 11 illustrates a case where an external object (e.g., reference numeral 1130 or 1140) exists around a resonator 1110 included in the electronic device 101. For example, the first external object 1130 in diagram (a) of FIG. 11 may be a conductor. For example, the second external object 1140 in diagram (b) of FIG. 11 may be a human body. The electronic device 101 (e.g., the controller 430 of the electronic device 101) according to various embodiments may identify an external object (e.g., reference numeral 1130 or 1140) by applying power to a slot 1120 disposed in the resonator 1110. For example, the electronic device 101 may determine the type of an external object (e.g., reference numeral 1130 or 1140) and/or whether the external object (e.g., reference numeral 1130 or 1140) is getting close to the electronic device 101 or is going away therefrom.

FIG. 12A is a diagram showing a change of an impedance value measured in the slot 1120 disposed in the resonator 1110 according to a change in the distance between the external object (e.g., reference numeral 1130 or 1140) of FIG. 11 and the electronic device 101. For example, the electronic device 101 may identify at least one impedance of two points (e.g., reference numerals 621 and 622 in FIG. 6) of the resonator 1110 which are opposite while the slot 1120 is disposed therebetween, and this identified impedance may be plotted to obtain a graph in FIG. 12A. For example, in FIG. 12A, lines 1201 and 1202 may indicate a real number value (R) and an imaginary number value (X) of impedance $(Z=R+jX)$ when the first external object 1130 (e.g., a conductor) moves near the electronic device 101, respectively. For example, in FIG. 12A, lines 1203 and 1204 may indicate a real number value (R) and an imaginary number value (X) of impedance $(Z=R+jX)$ when the second external object 1140 (e.g., a human body) moves near the electronic device 101, respectively. For example, referring to FIG. 12A, the electronic device 101 may identify an external object (e.g., reference numeral 1130 or 1140) within a designated distance (e.g., 10 mm in FIG. 12A).

FIG. 12B is a diagram showing a change of a reflection coefficient value measured in the slot 1120 disposed in the resonator 1110 according to a change in the distance between the external object (e.g., reference numeral 1130 or 1140) of FIG. 11 and the electronic device 101. For example, the electronic device 101 may identify at least reflection coefficient of two points (e.g., reference numerals 621 and 622 in FIG. 6) of the resonator 1110 which are opposite while the slot 1120 is disposed therebetween, and this identified reflection coefficient may be plotted to obtain a graph in FIG. 12B. For example, diagram (a) of FIG. 12B shows a case where first power having a first frequency (e.g., 1.13 GHz in FIG. 8) is applied to the slot 1120 disposed in the resonator 1110. For example, in diagram (a) of FIG. 12B, line 1211 may indicate a reflection coefficient value when the first external object 1130 (e.g., a conductor) moves near the electronic device 101. For example, in diagram (a) of FIG. 12B, line 1212 may indicate a reflection coefficient value when the second external object 1140 (e.g., a human body) moves near the electronic device 101. For example, diagram (b) of FIG. 12B shows a case where second power having a second frequency (e.g., 2.3 GHz in FIG. 8) is applied to the slot 1120 disposed in the resonator 1110. For example, in diagram (b) of FIG. 12B, line 1221 may indicate a reflection coefficient value when the first external object 1130 (e.g., a conductor) moves near the electronic device 101. For example, in diagram (b) of FIG. 12B, line 1222 may indicate a reflection coefficient value when the second external object 1140 (e.g., a human body) moves near the electronic device 101. For example, referring to FIG. 12B, the electronic device 101 may identify whether an external object (e.g., reference numeral 1130 or 1140) is getting close thereto or is going away therefrom within a designated distance (e.g., 10 mm in FIG. 12A).

Figure 13:
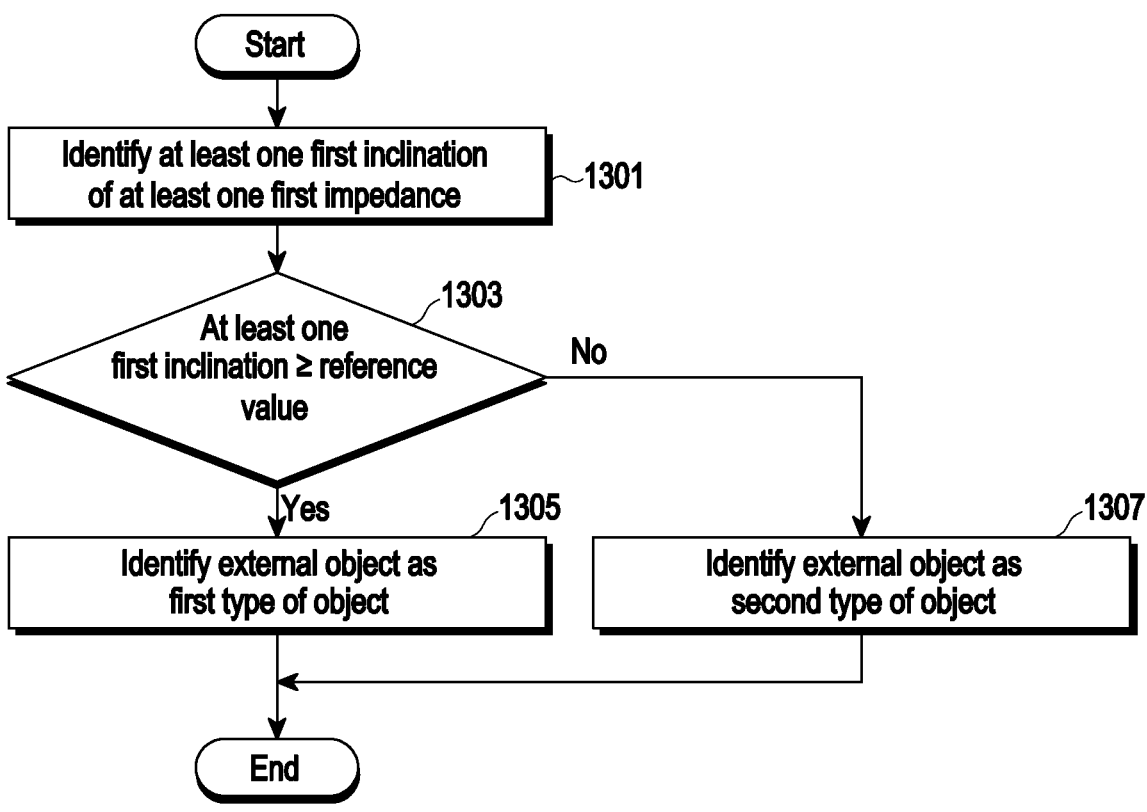
FIG. 13 is a flowchart illustrating an operation of an electronic device according to an embodiment of the disclosure.

FIG. 13 is a flowchart illustrating an operation of an electronic device according to an embodiment of the disclosure. FIG. 13 will be described with reference to FIG. 14.

Figure 14:
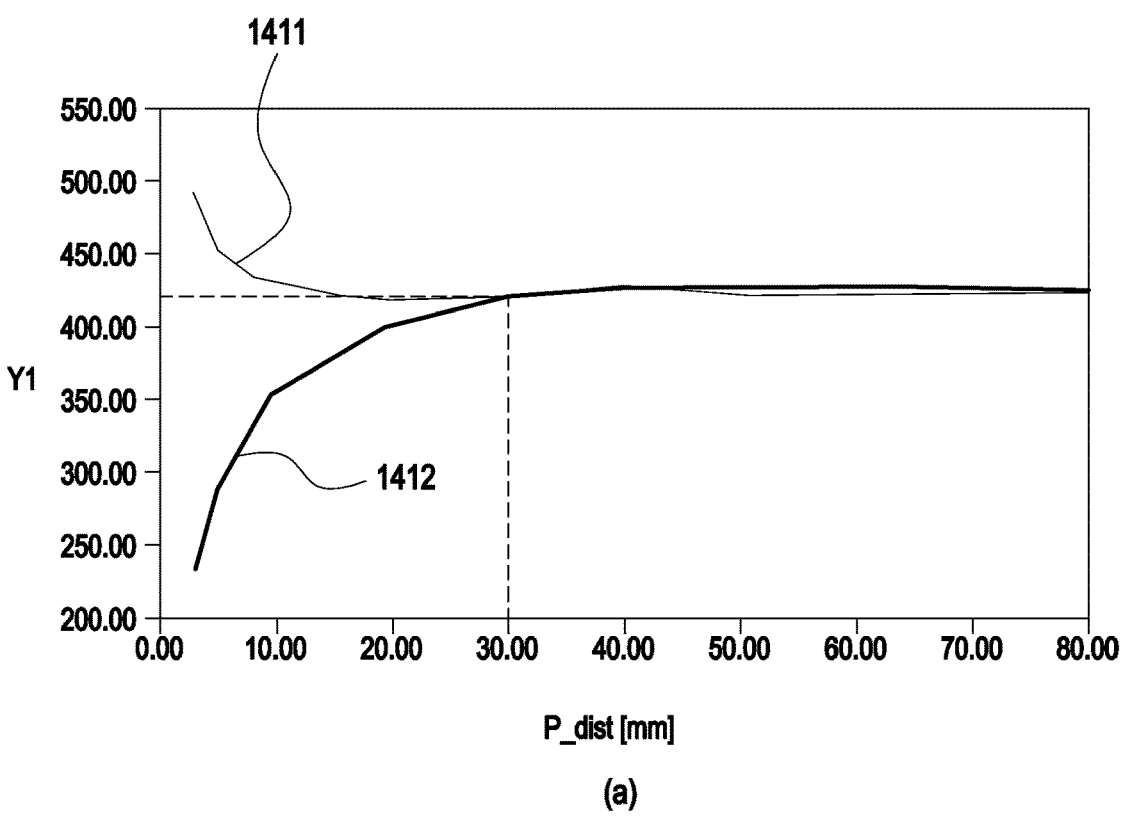
FIG. 14 is a diagram illustrating an operation of an electronic device according to an embodiment of the disclosure.
Figure 14:
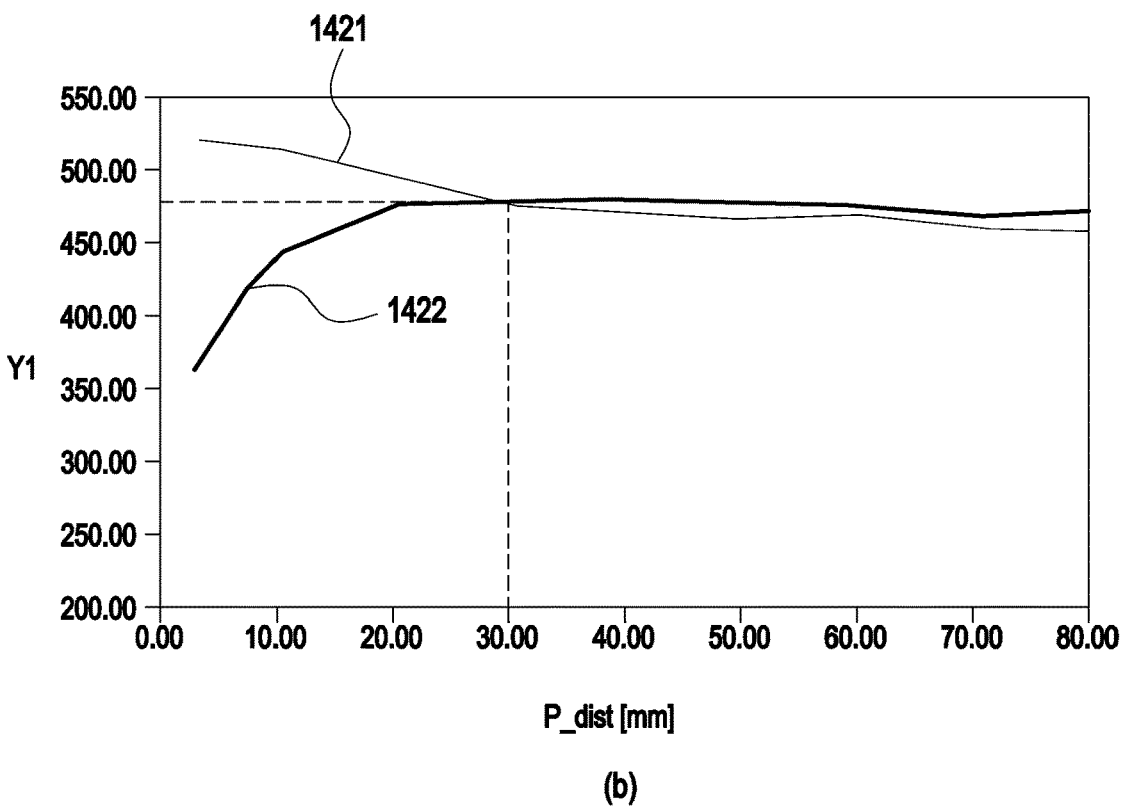

FIG. 14 is a diagram illustrating an operation of an electronic device according to an embodiment of the disclosure.

Referring to FIG. 13, in operation 1301, according to various embodiments, the electronic device 101 (e.g., the controller 430 of the electronic device 101) may identify at least one first inclination (e.g., X/R) of at least one first impedance (e.g., $Z=R+jX$) of a first point (e.g., reference numeral 621 in FIG. 6) and a second point (e.g., reference numeral 622 in FIG. 6) of a resonator (e.g., reference numeral 610 in FIG. 6) having a slot (e.g., reference numeral 620 in FIG. 6). The electronic device 101 may identify the at least one first inclination (e.g., X/R) of the at least one first impedance (e.g., $Z=R+jX$) of the first point (e.g., reference numeral 621 in FIG. 6) and the second point (e.g., reference numeral 622 in FIG. 6) by using a sensor (e.g., reference numeral 450 in FIG. 4A) (or a phase detector (e.g., reference numeral 453 in FIG. 4B).

For example, diagram (a) of FIG. 14 illustrates at least one inclination (e.g., X/R) of at least one impedance (e.g., $Z=R+jX$) according to the distance between the electronic device 101 and an external object (e.g., the external object (e.g., reference numeral 1130 or 1140) in FIG. 11) positioned around the electronic device 101 when first power having a first frequency (e.g., 1.13 GHz in FIG. 8) is applied to the first point (e.g., reference numeral 621 in FIG. 6) and the second point (e.g., reference numeral 622 in FIG. 6) of the resonator (e.g., reference numeral 610 in FIG. 6) having the slot (e.g., reference numeral 620 in FIG. 6). For example, in diagram (a) of FIG. 14, line 1411 may be a result related to the first external object 1130 (e.g., a conductor) in FIG. 11, and line 1412 may be a result related to the second external object 1140 (e.g., a human body) in FIG. 11. For example, in diagram (a) of FIG. 14, referring to line 1411, based on the first external object 1130 (e.g., a conductor) moving close to the electronic device 101 within a reference distance (e.g., 30 mm in FIG. 14), at least one inclination (e.g., X/R) of at least one impedance (e.g., $Z=R+jX$) may increase. For example, in diagram (a) of FIG. 14, referring to line 1412, based on the second external object 1140 (e.g., a human body) moving close to the electronic device 101 within a reference distance (e.g., 30 mm in FIG. 14), at least one inclination (e.g., X/R) of at least one impedance (e.g., $Z=R+jX$) may decrease.

For example, diagram (b) of FIG. 14 illustrates at least one inclination (e.g., X/R) of at least one impedance (e.g., $Z=R+jX$) according to the distance between the electronic device 101 and an external object (e.g., the external object (e.g., reference numeral 1130 or 1140) in FIG. 11) positioned around the electronic device 101 when second power having a second frequency (e.g., 2.3 GHz in FIG. 8) is applied to the first point (e.g., reference numeral 621 in FIG. 6) and the second point (e.g., reference numeral 622 in FIG. 6) of the resonator (e.g., reference numeral 610 in FIG. 6) having the slot (e.g., reference numeral 620 in FIG. 6). For example, in diagram (b) of FIG. 14, line 1421 may be a result related to the first external object 1130 (e.g., a conductor) in FIG. 11, and line 1422 may be a result related to the second external object 1140 (e.g., a human body) in FIG. 11. For example, in diagram (b) of FIG. 14, referring to line 1421, based on the first external object 1130 (e.g., a conductor) moving close to the electronic device 101 within a reference distance (e.g., 30 mm), at least one inclination (e.g., X/R) of at least one impedance (e.g., Z=R+jX) may increase. For example, in diagram (b) of FIG. 14, referring to line 1422, based on the second external object 1140 (e.g., a human body) moving close to the electronic device 101 within a reference distance (e.g., 30 mm), at least one inclination (e.g., X/R) of at least one impedance (e.g., Z=R+jX) may decrease.

In operation 1303, according to various embodiments, the electronic device 101 may compare a reference value (e.g., a first reference value or a second reference value) with the at least one first inclination (e.g., X/R) of the at least one impedance, which is identified in operation 1301. For example, the reference value illustrated in diagram (a) in FIG. 14 may be a first reference value (e.g., 420) which is a branch point between lines 1411 and 1412 at or below the reference distance (e.g., 30 mm). For example, the reference value illustrated in diagram (b) in FIG. 14 may be a second reference value (e.g., 480) which is a branch point between lines 1421 and 1422 at or below the reference distance (e.g., 30 mm).

In operation 1305, according to various embodiments, the electronic device 101 may identify, as a first type of object (e.g., a conductor), an external object (e.g., reference numeral 1130 in FIG. 11) adjacent to the electronic device 101, based on the at least one first inclination (e.g., X/R) of the at least one impedance, which is identified in operation 1301, being equal to or greater than the reference value (e.g., the first reference value or the second reference value). For example, based on the at least one first inclination (e.g., X/R) of the at least one impedance, which is identified in operation 1301, being equal to or greater than the reference value (e.g., the first reference value or the second reference value), and the at least one first inclination (e.g., X/R) of the at least one impedance, which is identified in operation 1301, increasing, the electronic device 101 may determine that the distance between the electronic device 101 and the external object that is the first type of object (e.g., a conductor) decreases.

In operation 1307, according to various embodiments, the electronic device 101 may identify, as a second type of object (e.g., a human body), an external object (e.g., reference numeral 1140 in FIG. 11) adjacent to the electronic device 101, based on the at least one first inclination (e.g., X/R) of the at least one impedance, which is identified in operation 1301, being smaller than the reference value (e.g., the first reference value or the second reference value). For example, based on the at least one first inclination (e.g., X/R) of the at least one impedance, which is identified in operation 1301, being smaller than the reference value (e.g., the first reference value or the second reference value), and the at least one first inclination (e.g., X/R) of the at least one impedance, which is identified in operation 1301, increasing, the electronic device 101 may determine that the distance between the electronic device 101 and the external object that is the second type of object (e.g., a human body) increases.

Figure 15:
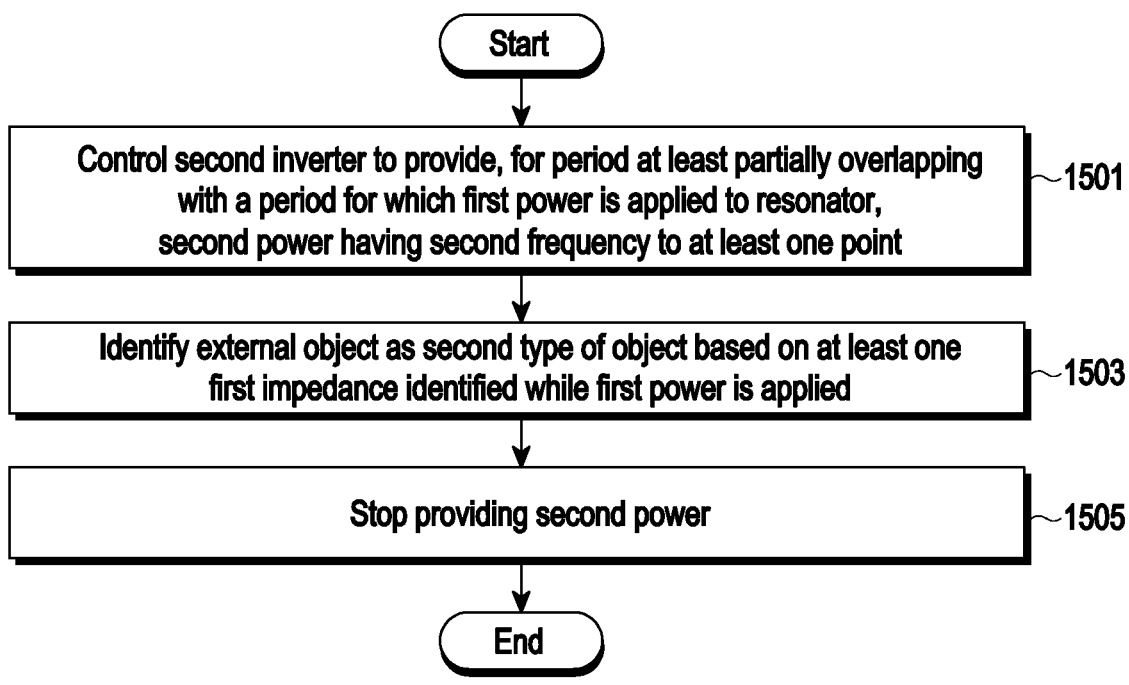
FIG. 15 is a flowchart illustrating an operation of an electronic device according to an embodiment of the disclosure.

FIG. 15 is a flowchart illustrating an operation of an electronic device according to an embodiment of the disclosure. FIG. 15 will be described with reference to FIGS. 4A and 6.

Referring to FIG. 15, in operation 1501, according to various embodiments, the electronic device 101 (e.g., the controller 430 of the electronic device 101) may control the second inverter 420 to apply, for a period at least partially overlapping with a period for which first power (e.g., first power having a first frequency applied by the first inverter 410 to the first point 621 and the second point 622 of the resonator 610) is applied to a resonator (e.g., reference numeral 440 in FIG. 4A or reference numeral 610 in FIG. 6), second power having a second frequency different from the first frequency to at least one point (e.g., reference numeral 653 and 654 in FIG. 6) of the resonator (e.g., reference numeral 610 in FIG. 6). For example, the first inverter 410 may be connected to the first point 621 and the second point 622 of the resonator 610, and the second inverter 420 may be connected to the third point 653 and the fourth point 654 of the resonator 610. For example, the electronic device 101 may control the first inverter 410 to apply the first power (e.g., power for sensing) having the first frequency to the first point 621 and the second point 622 of the resonator 610 so as to identify an external object (e.g., reference numeral 1130 or 1140 in FIG. 11) adjacent to the electronic device 101, and at the same time or independently thereto, the electronic device may control the second inverter 420 to apply the second power (e.g., power for charging) having the second frequency different from the first frequency to the third point 653 and the fourth point 654 of the resonator 610 so as to transmit wireless power to a wireless power reception device (e.g., reference numeral 195 in FIG. 1) positioned around the electronic device 101. For example, while applying the second power having the second frequency to the third point 653 and the fourth point 654 of the resonator 610, the electronic device 101 may periodically control the first inverter 410 to apply the first power having the first frequency different from the second frequency to the first point 621 and the second point 622 of the resonator 610. For example, while applying the second power having the second frequency to the third point 653 and the fourth point 654 of the resonator 610, when an event (e.g., an event of requesting sensing of an external object) occurs, the electronic device 101 may control the first inverter 410 to apply the first power having the first frequency different from the second frequency to the first point 621 and the second point 622 of the resonator 610.

In operation 1503, according to various embodiments, while the first power is applied, the electronic device 101 may identify the external object (e.g., reference numeral 1140 in FIG. 11) as a second type of object (e.g., a human body), based on at least one impedance of the first point 621 and the second point 622 of the resonator 610.

In operation 1505, according to various embodiments, the electronic device 101 may stop providing the second power having the second frequency applied to the third point 653 and the fourth point 654 of the resonator 610, based on identification that the external object (e.g., reference numeral 1140 in FIG. 11) adjacent to the electronic device 101 is a second type of object (e.g., a human body).

According to various embodiments, the electronic device 101 may restart providing the second power (e.g., power for charging), which has been stopped, based on identification that the external object (e.g., reference numeral 1130 in FIG. 11) adjacent to the electronic device 101 is a first type of object (e.g., a conductor).

Figure 16:
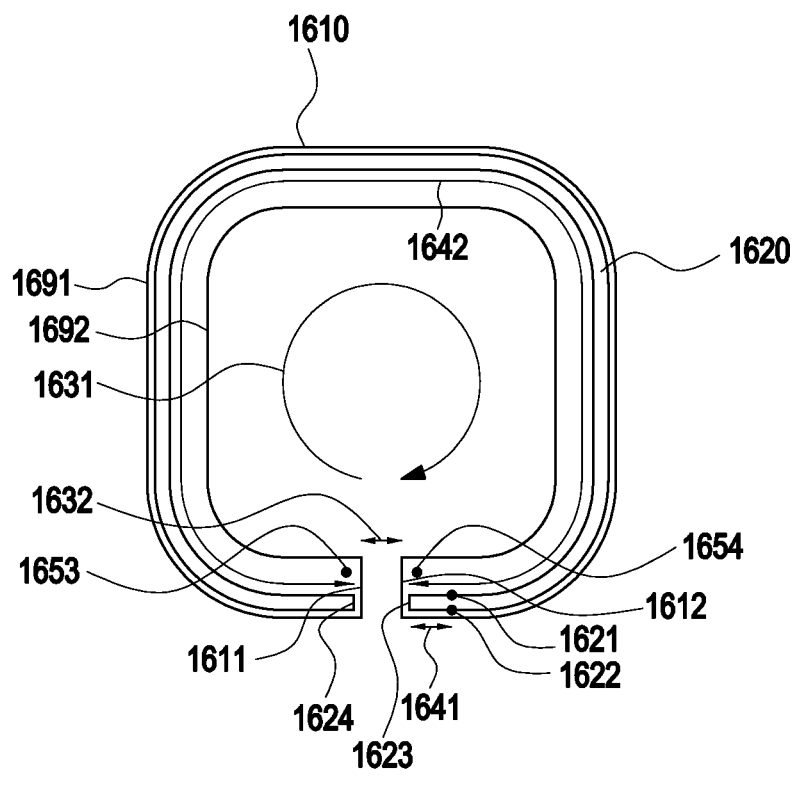
FIG. 16 is a diagram illustrating a resonator included in an electronic device according to an embodiment of the disclosure.
Figure 17:
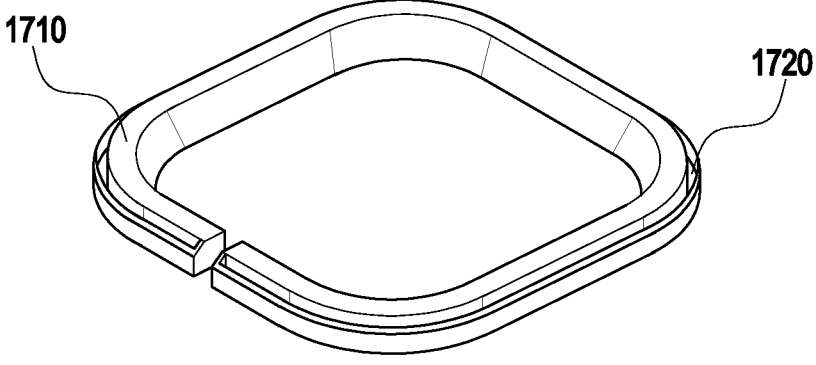
FIG. 17 is a diagram illustrating a resonator included in an electronic device according to an embodiment of the disclosure.

FIG. 16 is a diagram illustrating a resonator included in an electronic device according to an embodiment of the disclosure.

FIG. 17 is a diagram illustrating a resonator included in an electronic device according to an embodiment of the disclosure.

FIG. 16 is a plan view of the resonator 1610 included in the electronic device 101 according to various embodiments. For example, as described above, the resonator 1610 included in the electronic device 101 may be configured to be flat (e.g., disposed on a printed circuit board (PCB)). For example, FIG. 16 is a diagram of the flat resonator 1610 when viewed from the upper side thereof. As another example, as described above, the resonator 1610 (e.g., the resonator 1710 in FIG. 17) included in the electronic device 101 may be configured to be stereoscopic in a space. For example, FIG. 16 is a diagram of the resonator 1610 (e.g., the resonator 1710 in FIG. 17) configured to be stereoscopic in a space when viewed from the upper side thereof. The shape (e.g., a shape of a donut and/or a shape of a tube) of the resonator 1610 (e.g., the resonator 1710 in FIG. 17) and the position of the slot 1620 (e.g., the slot 1720 in FIG. 17) disposed in the resonator 1610 (e.g., the resonator 1710 in FIG. 17) have been described together with the description of FIGS. 6 and 7. For example, the slot 1620 (e.g., the slot 1720 in FIG. 17) disposed in the resonator 1610 (e.g., the resonator 1710 in FIG. 17) may be configured in a peripheral area of the resonator 1610 (e.g., the resonator 1710 in FIG. 17). For example, configuring the slot 1620 in a peripheral area of the resonator 1610 may imply that the distance between the slot 1620 of the resonator 1610 and an inner surface (e.g., reference numeral 1692) of the resonator 1610 is greater than the distance between the slot 1620 of the resonator 1610 and an outer surface (e.g., reference numeral 1691) of the resonator 1610.

Referring to FIG. 16, according to various embodiments, the electronic device 101 may include the resonator 1610 in FIG. 16. For example, the resonator 1610 may have a shape of a loop. For example, the resonator 1610 may have a shape of a loop extending from one end 1612 of the resonator 1610 to the other end 1611. For example, the resonator 1610 may have an empty space having a first length 1632 between the one end 1612 and the other end 1611 of the resonator 1610. For example, the resonator 1610 may include a capacitor in an area (e.g., an area corresponding to the empty space having the first length 1632 illustrated in FIG. 16) between the one end 1612 and the other end 1611. There is no limit to the position of the capacitor included in the resonator 1610. For example, the resonator 1610 may be connected to a capacitor disposed in a different area than an area (e.g., an area corresponding to the empty space having the first length 1632 illustrated in FIG. 16) between the one end 1612 and the other end 1611. For example, the capacitor disposed in the different area may be understood to be included in the resonator 1610. For example, a part having a shape of a loop and the capacitor may be connected to each other so that the resonator 1610 resonates.

According to various embodiments, the resonator 1610 may include the slot 1620. For example, the slot 1620 may be configured in a loop direction 1631 of the resonator 1610. For example, the slot 1620 may have a designated shape having a designated length 1642 in the loop direction 1631 of the resonator 1610. For example, the slot 1620 may include a first sub slot extending from one end 1623 of the slot 1620 in a first direction (e.g., the right transverse direction in FIG. 16), a second sub slot extending in a second direction (e.g., the upward longitudinal direction in FIG. 16) different from the first direction, a third sub slot between the first sub slot and the second sub slot, a fourth sub slot extending in a third direction (e.g., the left transverse direction in FIG. 16, eventually parallel to the first direction) different from the second direction, a fifth sub slot between the second sub slot and the fourth sub slot, a sixth sub slot extending in a fourth direction (e.g., the downward longitudinal direction in FIG. 16, eventually parallel to the second direction) different from the third direction, a seventh sub slot between the fourth sub slot and the sixth sub slot, an eighth sub slot extending in a fifth direction (e.g., the right transverse direction in FIG. 16, eventually parallel to the third direction and equal to the first direction) different from the fourth direction, and extending to the other end 1624 of the slot 1620, and a ninth sub slot between the sixth sub slot and the eight sub slot. For example, the third sub slot, the fifth sub slot, the seventh sub slot, and the ninth sub slot included in the slot 1620 may have shapes curved according to the shape of the resonator 1610. For example, the slot 1620 may have a designated length 1642 by including the first sub slot having a first length, the second sub slot having a second length, the third sub slot having a third length, the fourth sub slot having a fourth length, the fifth sub slot having a fifth length, the sixth sub slot having a sixth length, the seventh sub slot having a seventh length, the eighth sub slot having an eighth length, and the ninth sub slot having a ninth length.

Referring to FIG. 16, according to various embodiments, the embodiment of the FIG. 5 may be applied to the resonator 1610.

For example, in the embodiment of FIG. 4A, the resonator 440 may be the resonator 1610, and the slot 441 may be the slot 1620. For example, referring to FIGS. 4A and 16, the first inverter 410 may be connected to a first point 1621 and a second point 1622 of the resonator 1610. For example, the first point 1621 and the second point 1622 may be opposite while the slot 1620 of the resonator 1610 is disposed therebetween. For example, the first point 1621 and the second point 1622 of the resonator 1610 may be spaced a designated distance (e.g., a first distance 1641) apart from the one end 1623 of the slot 1620. The designated distance (e.g., the first distance 1641) will be described with reference to FIGS. 19 and 20. The positions of the first point 1621 and the second point 1622 correspond to examples, and there is no limit to the positions of the first point 1621 and the second point 1622. For example, the second inverter 420 may be connected to at least one point (e.g., a third point 1653 and a fourth point 1654) different from the first point 1621 and the second point 1622 of the resonator 1610. For example, the fourth point 1654 of the resonator 1610 may be positioned around the one end 1612 of the resonator 1610, and the third point 1653 of the resonator 1610 may be positioned around the other end 1611 of the resonator 1610.

For example, the electronic device 101 (e.g., the controller 430 of the electronic device 101) may control the first inverter 410 to apply first power having a first frequency to the resonator 1610. For example, the electronic device 101 may determine the magnitude of the first frequency of the first power applied by the first inverter 410. A scheme by which the electronic device 101 determines the magnitude of the frequency will be described later.

For example, while the first power is applied to the resonator 1610, the electronic device 101 may identify at least one impedance of the first point 1621 and the second point 1622. For example, while the first power is applied to the resonator 1610, the electronic device 101 may periodically or continuously identify at least one impedance of the first point 1621 and the second point 1622.

For example, the electronic device 101 may identify an external object (e.g., reference numeral 1130 or 1140 in FIG. 11) adjacent to the electronic device 101, based on the at least one impedance of the first point 1621 and the second point 1622. For example, the electronic device 101 may identify an external object (e.g., reference numeral 1130 or 1140 in FIG. 11) adjacent to the electronic device 101, based on the inclination (or phase) of the at least one impedance of the first point 1621 and the second point 1622. For example, the electronic device 101 may identify an external object (e.g., reference numeral 1130 or 1140 in FIG. 11) adjacent to the electronic device 101, based on a change in the inclination (or phase) of the at least one impedance of the first point 1621 and the second point 1622. A scheme of identifying the external object (e.g., reference numeral 1130 or 1140 in FIG. 11) adjacent to the electronic device 101 will be described later with reference to FIGS. 22, 23, and 24.

Figure 18:
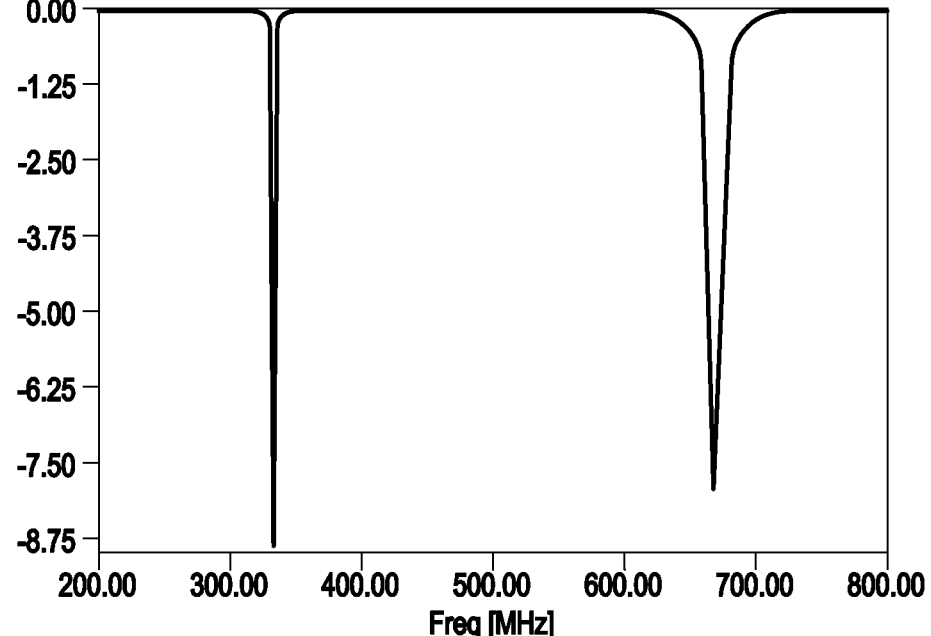
FIG. 18 is a diagram illustrating an operation of an electronic device according to an embodiment of the disclosure.

FIG. 18 is a diagram illustrating an operation of an electronic device according to an embodiment of the disclosure.

FIG. 18 illustrates a graph of a reflection coefficient according to the frequency of power applied to a slot (e.g., the slot 1620 in FIG. 16) included in a resonator (e.g., the resonator 1610 in FIG. 16) of the electronic device 101.

Referring to FIG. 18, according to various embodiments, it may be noted that a resonance occurs when first power having a first frequency (e.g., 333 MHz in FIG. 18) is applied to a slot (e.g., the slot 1620 in FIG. 16) included in a resonator (e.g., the resonator 1610 in FIG. 16) of the electronic device 101, or when second power having a second frequency (e.g., 668 MHz in FIG. 18) is applied thereto. For example, the first frequency (e.g., 333 MHz in FIG. 18) and the second frequency (e.g., 668 MHz in FIG. 18) may be determined according to the length and/or shape of the slot (e.g., the slot 1620 in FIG. 16) included in the resonator (e.g., reference numeral 1610 in FIG. 16) of the electronic device 101. For example, the electronic device 101 (e.g., the controller 430 of the electronic device 101) may determine the frequency of power applied to the slot (e.g., the slot 1620 in FIG. 16), based on the length and/or shape of the slot (e.g., the slot 1620 in FIG. 16) included in the resonator (e.g., reference numeral 1610 in FIG. 16) of the electronic device 101. For example, the electronic device 101 may control the first inverter 410 to apply, to the slot (e.g., the slot 1620 in FIG. 16), power having a frequency designated based on the length and/or shape of the slot (e.g., the slot 1620 in FIG. 16).

Figure 19:
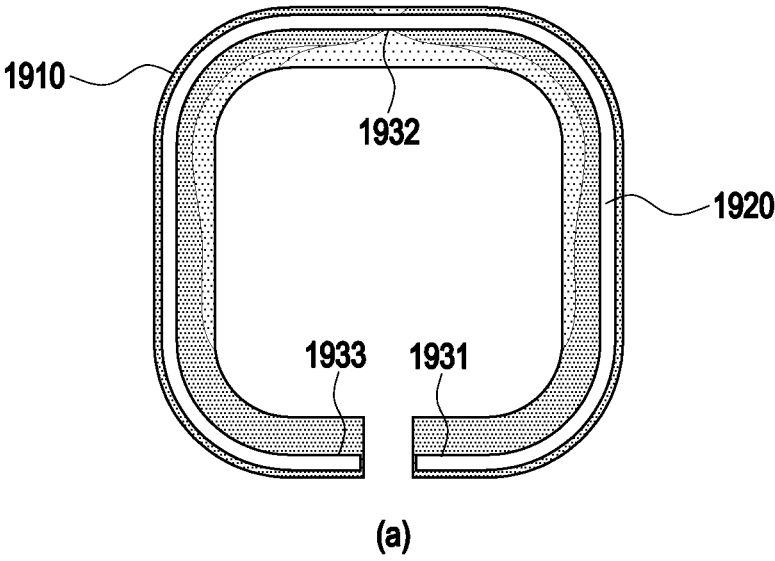
FIG. 19 is a diagram illustrating an operation of an electronic device according to an embodiment of the disclosure.
Figure 19:
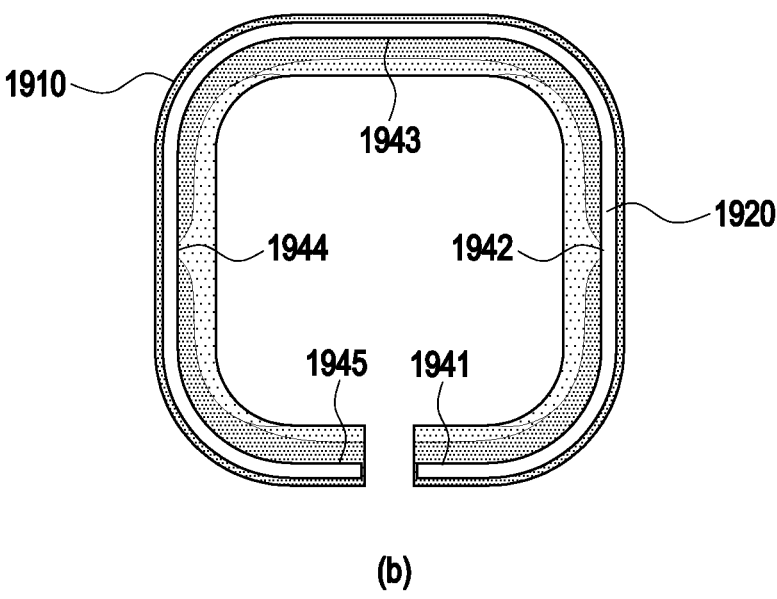

FIG. 19 is a diagram illustrating an operation of an electronic device according to an embodiment of the disclosure.

Figure 20:
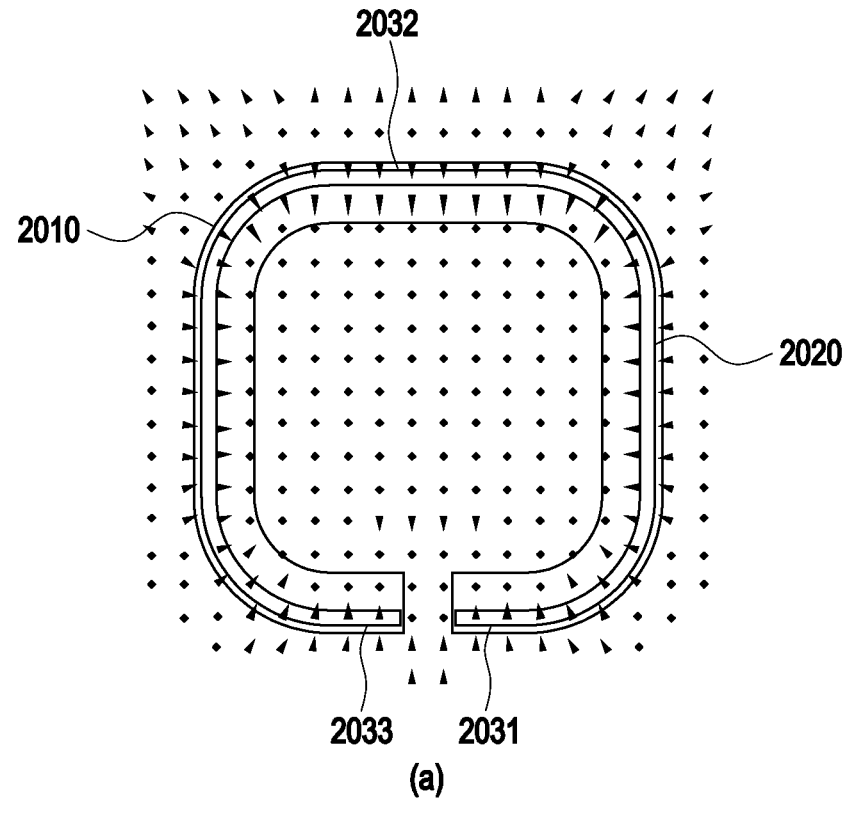
FIG. 20 is a diagram illustrating an operation of an electronic device according to an embodiment of the disclosure.
Figure 20:
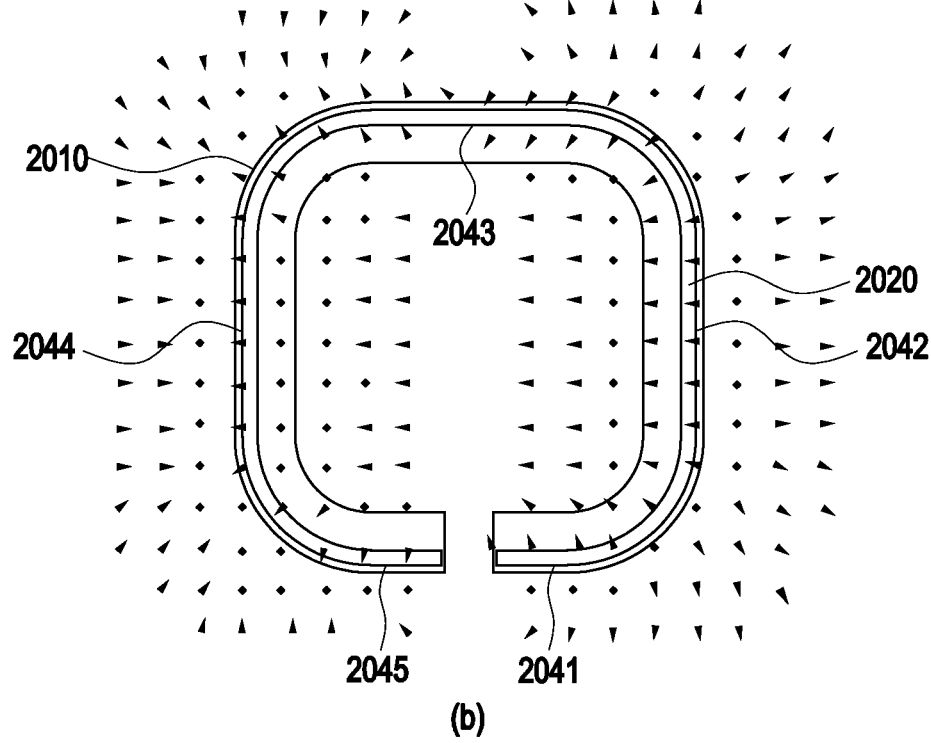

FIG. 20 is a diagram illustrating an operation of an electronic device according to an embodiment of the disclosure.

Figure 21:
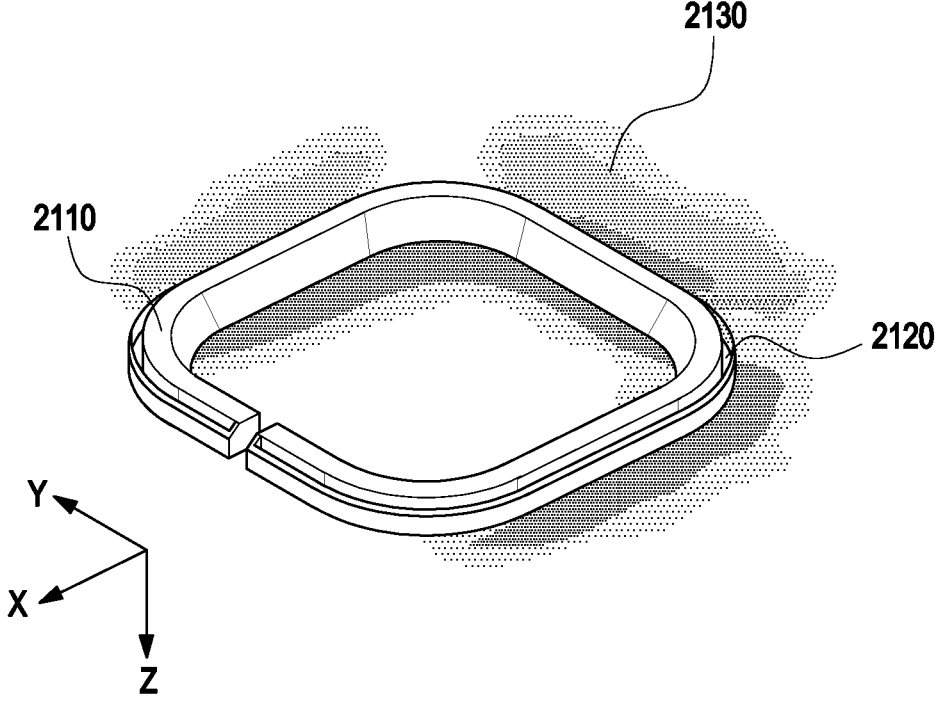
FIG. 21 is a diagram illustrating an operation of an electronic device according to an embodiment of the disclosure.

FIG. 21 is a diagram illustrating an operation of an electronic device according to an embodiment of the disclosure.

FIG. 19 is a diagram showing the current distribution of a resonator 1910 (e.g., the resonator 1610 in FIG. 16) of the electronic device 101 when power having a designated frequency is applied to a slot 1920 (e.g., the slot 1620 in FIG. 16) included in the resonator 1910. For example, diagram (a) of FIG. 19 is a diagram showing the current distribution of the resonator 1910 when first power having a first frequency (e.g., 333 MHz in FIG. 18) is applied to the slot 1920 included in the resonator 1910 of the electronic device 101. For example, in diagram (a) of FIG. 19, it may be noted that the current has a maximum value at a first point 1931 positioned at a designated distance from one end of the slot 1920 and a third point 1933 positioned at a designated distance from the other end of the slot 1920, and it may be noted that the current has a minimum value at a second point 1932 positioned at the center of the slot 1920. For example, diagram (b) of FIG. 19 is a diagram showing the current distribution of the resonator 1910 when second power having a second frequency (e.g., 668 MHz in FIG. 18) is applied to the slot 1920 included in the resonator 1910 of the electronic device 101. For example, in diagram (b) of FIG. 19, it may be noted that the current has a maximum value at a first point 1941 positioned at a designated distance from one end of the slot 1920, a third point 1943 positioned at the center of the slot 1920, and a fifth point 1945 positioned at a designated distance from the other end of the slot 1920, and it may be noted that the current has a minimum value at a second point 1942 and a fourth point 1944 of the slot 1920.

Although not illustrated, in a scheme similar to the scheme described with reference to diagram (a) and diagram (b) of FIG. 19, when power having a designated frequency is applied to the slot 1920 included in the resonator 1910 of the electronic device 101, the voltage distribution of the resonator 1910 may be obtained.

According to various embodiments, the first point 1621 and the second point 1622 of the slot 1620 included in the resonator 1610 in FIG. 16 may be determined based on the current distribution of the resonator 1910 illustrated in FIG. 19 and a voltage distribution obtained by a scheme similar thereto. For example, a current distribution and a voltage distribution of the resonator 1910 may be determined according to the length and shape of a slot (e.g., the slot 1620 in FIG. 16), and accordingly, a first point (e.g., reference numeral 1621 in FIG. 16) and a second point (e.g., reference numeral 1622 in FIG. 16) of a resonator (e.g., reference numeral 1610 in FIG. 16), which are to be connected to the first inverter 410 of the electronic device 101, may be determined.

FIG. 20 is a diagram showing the distribution of an electric field generated around a resonator 2010 (e.g., the resonator 1610 in FIG. 16) of the electronic device 101 when power having a designated frequency is applied to a slot 2020 (e.g., the slot 1620 in FIG. 16) included in the resonator 2010. For example, diagram (a) of FIG. 20 is a diagram showing the distribution of an electric field generated around the resonator 2010 when first power having a first frequency (e.g., 333 MHz in FIG. 18) is applied to the slot 2020 included in the resonator 2010 of the electronic device 101. For example, in diagram (a) of FIG. 20, it may be noted that the electric field has a minimum value near the first point 2031 positioned at a designated distance from one end of the slot 2020 and the third point 2033 positioned at a designated distance from the other end of the slot 2020, and it may be noted that the electric field has a maximum value near the second point 2032 positioned at the center of the slot 2020. For example, diagram (b) of FIG. 20 is a diagram showing the distribution of an electric field generated around the resonator 2010 when second power having a second frequency (e.g., 668 MHz in FIG. 18) is applied to the slot 2020 included in the resonator 2010 of the electronic device 101. For example, in diagram (b) of FIG. 20, it may be noted that the electric field has a minimum value around the first point 2041 positioned at a designated distance from one end of the slot 2020, the third point 2043 positioned at the center of the slot 2020, and the fifth point 2045 positioned at a designated distance from the other end of the slot 2020, and it may be noted that the electric field has a minimum value around the second point 2042 and the fourth point 2044 of the slot 2020.

FIG. 21 is a diagram showing a distribution 2130 of an electric field generated around a resonator 2110 of the electronic device 101 when power having a designated frequency is applied to a slot 2120 included in the resonator 2110. For example, the distribution 2130 of an electric field generated around the resonator 2110 may be changed according to the length and/or shape of the slot 2120 included in the resonator 2110.

Figure 22:
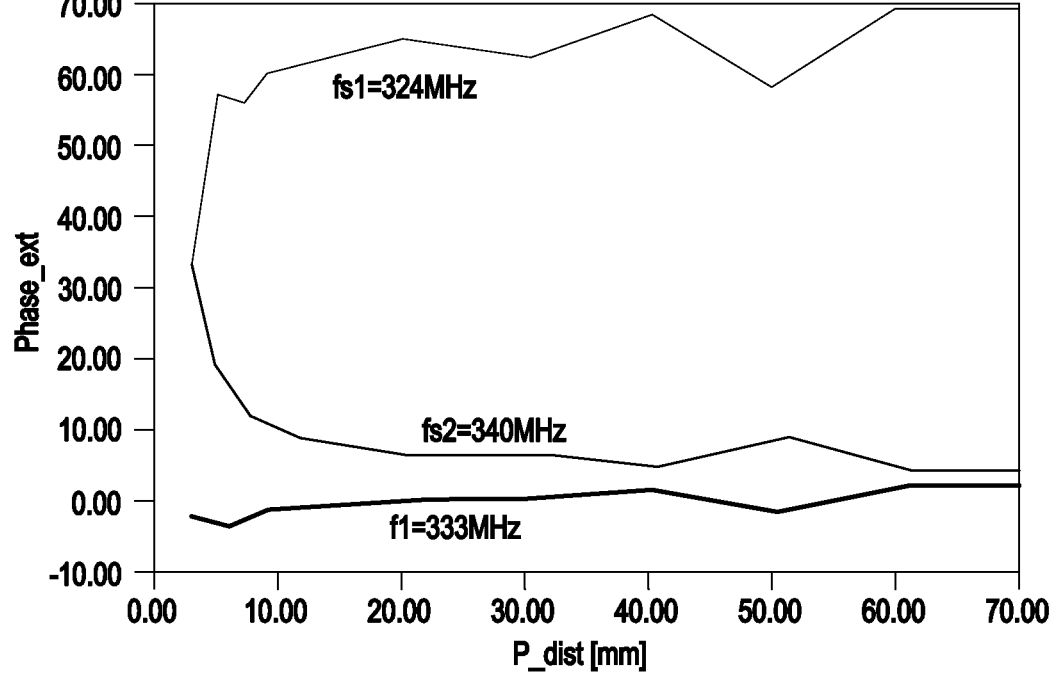
FIG. 22 is a diagram illustrating an operation of an electronic device according to an embodiment of the disclosure.

FIG. 22 is a diagram illustrating an operation of an electronic device according to an embodiment of the disclosure.

FIG. 22 is a diagram showing a change in the phase of impedance measured in a slot (e.g., reference numeral 1620 in FIG. 16) disposed in a resonator (e.g., reference numeral 1610 in FIG. 16) according to a change in the distance between an external object (e.g., the external object 1130 or 1140 in FIG. 11) and the electronic device 101. For example, in FIG. 22, it may be noted that the phase of impedance measured in the slot (e.g., reference numeral 1620 in FIG. 16) changes according to the frequency (e.g., 324 MHz, 333 MHz, or 340 MHz) of power applied to the slot (e.g., reference numeral 1620 in FIG. 16) disposed in the resonator (e.g., reference numeral 1610 in FIG. 16).

Figure 23:
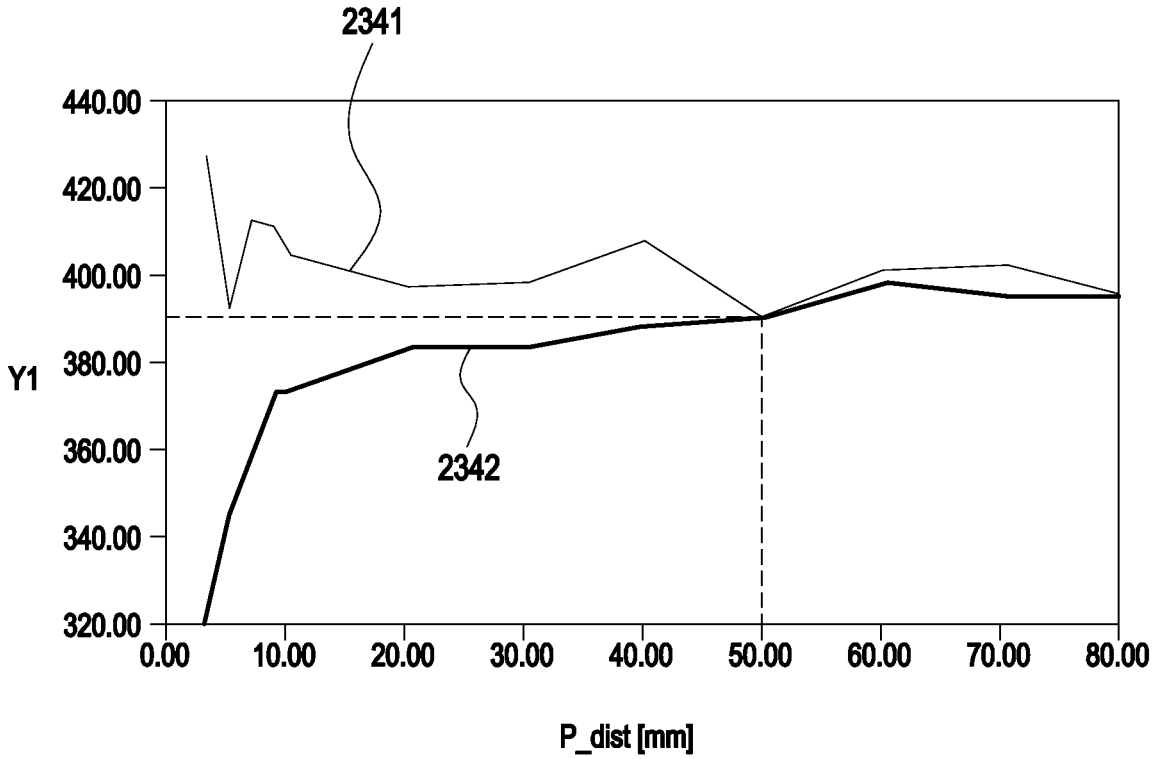
FIG. 23 is a diagram illustrating an operation of an electronic device according to an embodiment of the disclosure.

FIG. 23 is a diagram illustrating an operation of an electronic device according to an embodiment of the disclosure. FIG. 23 will be described with reference to FIGS. 13 and 16.

Referring to FIG. 16, according to various embodiments, the embodiment of the FIG. 13 may be applied to the resonator 1610.

According to various embodiments, the electronic device 101 (e.g., the controller 430 of the electronic device 101) may identify at least one first inclination (e.g., X/R) of at least one first impedance (e.g., Z=R+jX) of a first point (e.g., reference numeral 1621 in FIG. 16) and a second point (e.g., reference numeral 1622 in FIG. 16) of a resonator (e.g., reference numeral 1610 in FIG. 16) having a slot (e.g., reference numeral 1620 in FIG. 16). The electronic device 101 may identify the at least one first inclination (e.g., X/R) of the at least one first impedance (e.g., Z=R+jX) of the first point (e.g., reference numeral 1621 in FIG. 16) and the second point (e.g., reference numeral 1622 in FIG. 16) by using a sensor (e.g., reference numeral 450 in FIG. 4A) (or a phase detector (e.g., reference numeral 453 in FIG. 4B).

For example, FIG. 23 illustrates at least one inclination (e.g., X/R) of at least one impedance (e.g., Z=R+jX) according to the distance between the electronic device 101 and an external object (e.g., the external object (e.g., reference numeral 1130 or 1140) in FIG. 11) positioned around the electronic device 101 when first power having a first frequency (e.g., 333 MHz in FIG. 18) is applied to the first point (e.g., reference numeral 1621 in FIG. 16) and the second point (e.g., reference numeral 1622 in FIG. 16) of the resonator (e.g., reference numeral 1610 in FIG. 16) having the slot (e.g., reference numeral 1620 in FIG. 16). For example, in FIG. 23, line 2341 may be a result related to a first external object (e.g., the first external object 1130 (e.g., a conductor) in FIG. 11), and line 2342 may be a result related to a second external object (e.g., the second external object 1140 (e.g., a human body) in FIG. 11). For example, in diagram FIG. 23, referring to line 2342, based on the second external object (e.g., the second external object 1140

(e.g., a human body) in FIG. 11) moving close to the electronic device 101 within a reference distance (e.g., 50 mm in FIG. 23), at least one inclination (e.g., X/R) of at least one impedance (e.g., Z=R+jX) may decrease.

For example, the electronic device 101 may compare a reference value with the at least one inclination (e.g., X/R) of the at least one impedance of the first point (e.g., reference numeral 1621 in FIG. 16) and the second point (e.g., reference numeral 1622 in FIG. 16) of the resonator (e.g., reference numeral 1610 in FIG. 16) having the slot (e.g., reference numeral 1620 in FIG. 16). For example, the reference value illustrated in diagram FIG. 23 may be a first reference value (e.g., 390) which is a branch point between lines 2341 and 2342 at or below the reference distance (e.g., 50 mm).

For example, based on the at least one inclination (e.g., X/R) of the at least one impedance of the first point (e.g., reference numeral 1621 in FIG. 16) and the second point (e.g., reference numeral 1622 in FIG. 16) of the resonator (e.g., reference numeral 1610 in FIG. 16) having the slot (e.g., reference numeral 1620 in FIG. 16) being equal to or greater than the reference value (e.g., the first reference value (e.g., 390)), the electronic device 101 may identify that the external object (e.g., reference numeral 1130 in FIG. 11) adjacent to the electronic device 101 is a first type of object (e.g., a conductor).

For example, based on the at least one inclination (e.g., X/R) of the at least one impedance of the first point (e.g., reference numeral 1621 in FIG. 16) and the second point (e.g., reference numeral 1622 in FIG. 16) of the resonator (e.g., reference numeral 1610 in FIG. 16) having the slot (e.g., reference numeral 1620 in FIG. 16) being smaller than the reference value (e.g., the first reference value (e.g., 390)), the electronic device 101 may identify that the external object (e.g., reference numeral 1140 in FIG. 11) adjacent to the electronic device 101 is a second type of object (e.g., a human body). For example, based on the at least one inclination (e.g., X/R) of the at least one impedance of the first point (e.g., reference numeral 1621 in FIG. 16) and the second point (e.g., reference numeral 1622 in FIG. 16) of the resonator (e.g., reference numeral 1610 in FIG. 16) having the slot (e.g., reference numeral 1620 in FIG. 16) being smaller than the reference value (e.g., the first reference value or a second reference value), and the at least one first inclination (e.g., X/R) identified in operation 1301 increasing, the electronic device 101 may determine that the distance between the electronic device 101 and the external object that is the second type of object (e.g., a human body) increases.

Referring to FIG. 16, according to various embodiments, the embodiment of the FIG. 15 may be applied to the resonator 1610.

For example, the electronic device 101 (e.g., the controller 430 of the electronic device 101) may control the second inverter 420 to apply, for a period at least partially overlapping with a period for which first power (e.g., first power having a first frequency applied by the first inverter 410 to the first point 1621 and the second point 1622 of the resonator 1610) is applied to a resonator (e.g., reference numeral 440 in FIG. 4A or reference numeral 1610 in FIG. 16), second power having a second frequency different from the first frequency to at least one point (e.g., reference numeral 1653 and 1654 in FIG. 16) of the resonator (e.g., reference numeral 1610 in FIG. 16). For example, the first inverter 410 may be connected to the first point 1621 and the second point 1622 of the resonator 1610, and the second inverter 420 may be connected to the third point 1653 and the fourth point 1654 of the resonator 1610. For example, the electronic device 101 may control the first inverter 410 to apply the first power (e.g., power for sensing) having the first frequency to the first point 1621 and the second point 1622 of the resonator 1610 so as to identify an external object (e.g., reference numeral 1130 or 1140 in FIG. 11) adjacent to the electronic device 101, and at the same time or independently thereto, the electronic device may control the second inverter 420 to apply the second power (e.g., power for charging) having the second frequency different from the first frequency to the third point 1653 and the fourth point 1654 of the resonator 1610 so as to transmit wireless power to a wireless power reception device (e.g., reference numeral 195 in FIG. 1) positioned around the electronic device 101. For example, while applying the second power having the second frequency to the third point 1653 and the fourth point 1654 of the resonator 1610, the electronic device 101 may periodically control the first inverter 410 to apply the first power having the first frequency different from the second frequency to the first point 1621 and the second point 1622 of the resonator 1610. For example, while applying the second power having the second frequency to the third point 1653 and the fourth point 1654 of the resonator 1610, when an event (e.g., an event of requesting sensing of an external object) occurs, the electronic device 101 may control the first inverter 410 to apply the first power having the first frequency different from the second frequency to the first point 1621 and the second point 1622 of the resonator 1610.

For example, while the first power is applied, the electronic device 101 may identify the external object (e.g., reference numeral 1140 in FIG. 11) as a second type of object (e.g., a human body), based on at least one impedance of the first point 1621 and the second point 1622 of the resonator 1610.

For example, the electronic device 101 may stop providing the second power having the second frequency applied to the third point 1653 and the fourth point 1654 of the resonator 1610, based on identification that the external object (e.g., reference numeral 1140 in FIG. 11) adjacent to the electronic device 101 is a second type of object (e.g., a human body).

According to various embodiments, the electronic device 101 may restart providing the second power (e.g., power for charging), which has been stopped, based on identification that the external object (e.g., reference numeral 1130 in FIG. 11) adjacent to the electronic device 101 is a first type of object (e.g., a conductor).

Figure 24:
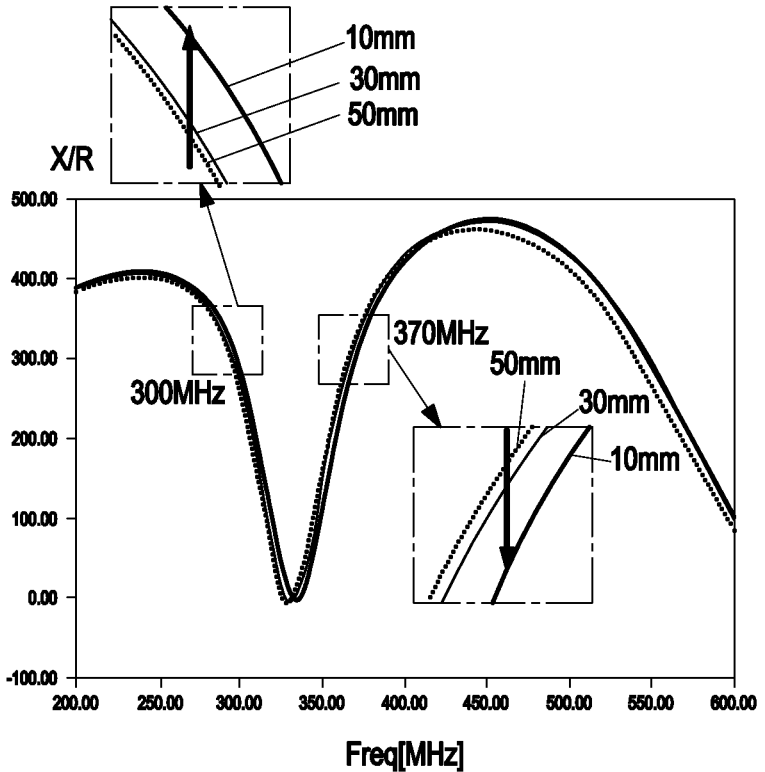
FIG. 24 is a diagram illustrating an operation of an electronic device according to an embodiment of the disclosure.

FIG. 24 is a diagram illustrating an operation of an electronic device according to an embodiment of the disclosure. FIG. 24 will be described with reference to FIG. 16.

FIG. 24 is a diagram showing a change of an inclination value of impedance measured in the slot (e.g., reference numeral 1620 in FIG. 16) disposed in the resonator (e.g., reference numeral 1610 in FIG. 16) according to a change in the frequency of power applied to the slot (e.g., reference numeral 1620 in FIG. 16) disposed in the resonator (e.g., reference numeral 1610 in FIG. 16) while the distance between an external object (e.g., reference numeral 1130 or 1140 in FIG. 11) and the electronic device 101 is fixed (e.g., the distance is 50 mm, 30 mm, or 10 mm). For example, the electronic device 101 may identify at least one impedance of two points (e.g., reference numerals 1621 and 1622 in FIG. 16) of the resonator (e.g., reference numeral 1610 in FIG. 16) which are opposite while the slot (e.g., reference numeral 1620 in FIG. 16) is disposed therebetween, and the inclination of this identified at least one impedance may be plotted to obtain a graph in FIG. 24.

According to various embodiments, in diagram (a) of FIG. 24, when the frequency changes based on 370 MHz, it may be noted that, based on the distance between an external object (e.g., reference numeral 1130 or 1140 in FIG. 11) and the electronic device 101 decreasing, an inclination value of impedance measured in the slot (e.g., reference numeral 1620 in FIG. 16) disposed in the resonator (e.g., reference numeral 1610 in FIG. 16) further changes. For example, referring to diagram (a) of FIG. 24, the electronic device 101 may sweep, based on 370 MHz, the frequency of power applied to the slot (e.g., reference numeral 1620 in FIG. 16) disposed in the resonator (e.g., reference numeral 1610 in FIG. 16) so as to determine whether the distance between the external object (e.g., reference numeral 1130 or 1140 in FIG. 11) and the electronic device 101 decreases or increases. For example, the electronic device 101 may compare a first change of at least one inclination value of at least one impedance measured in the slot (e.g., reference numeral 1620 in FIG. 16) for a first period of decreasing, in a range greater than 370 MHz, the frequency of power applied to the slot (e.g., reference numeral 1620 in FIG. 16) disposed in the resonator (e.g., reference numeral 1610 in FIG. 16), with a second change of at least one inclination value of at least one impedance measured in the slot (e.g., reference numeral 1620 in FIG. 16) for a second period of decreasing, in a range smaller than 370 MHz, the frequency of power applied to the slot (e.g., reference numeral 1620 in FIG. 16). When the second change is greater than the first change, the electronic device may determine that the distance between the external object (e.g., reference numeral 1130 or 1140 in FIG. 11) and the electronic device 101 decreases.

According to various embodiments, in diagram (a) of FIG. 24, when the frequency changes based on 300 MHz, it may be noted that, based on the distance between an external object (e.g., reference numeral 1130 or 1140 in FIG. 11) and the electronic device 101 increasing, an inclination value of impedance measured in the slot (e.g., reference numeral 1620 in FIG. 16) disposed in the resonator (e.g., reference numeral 1610 in FIG. 16) further changes. For example, referring to diagram (a) of FIG. 24, the electronic device 101 may sweep, based on 300 MHz, the frequency of power applied to the slot (e.g., reference numeral 1620 in FIG. 16) disposed in the resonator (e.g., reference numeral 1610 in FIG. 16) so as to determine whether the distance between the external object (e.g., reference numeral 1130 or 1140 in FIG. 11) and the electronic device 101 decreases or increases. For example, the electronic device 101 may compare a first change of at least one inclination value of at least one impedance measured in the slot (e.g., reference numeral 1620 in FIG. 16) for a first period of decreasing, in a range greater than 300 MHz, the frequency of power applied to the slot (e.g., reference numeral 1620 in FIG. 16) disposed in the resonator (e.g., reference numeral 1610 in FIG. 16), with a second change of at least one inclination value of at least one impedance measured in the slot (e.g., reference numeral 1620 in FIG. 16) for a second period of decreasing, in a range smaller than 300 MHz, the frequency of power applied to the slot (e.g., reference numeral 1620 in FIG. 16). When the second change is greater than the first change, the electronic device may determine that the distance between the external object (e.g., reference numeral 1130 or 1140 in FIG. 11) and the electronic device 101 increases.

Figure 25:
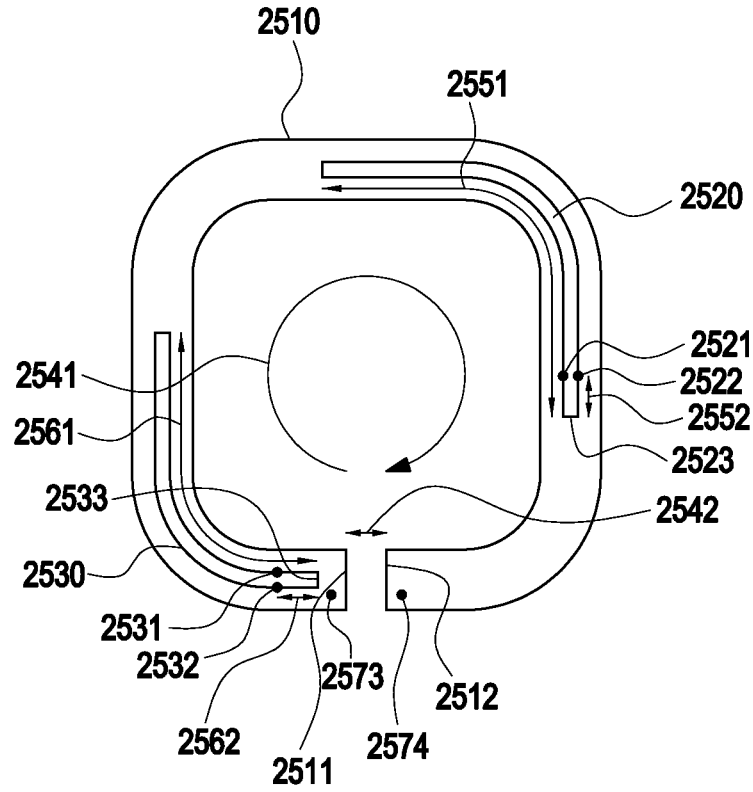
FIG. 25 is a diagram illustrating a resonator included in an electronic device according to an embodiment of the disclosure.

FIG. 25 is a diagram illustrating a resonator included in an electronic device according to an embodiment of the disclosure.

FIG. 25 is a plan view of the resonator 2510 included in the electronic device 101 according to various embodiments. For example, referring to FIG. 25, the electronic device 101 may include the resonator 2510 having multiple slots (e.g., reference numerals 2520 and 2530). For example, as described above, the resonator 2510 included in the electronic device 101 may be configured to be flat (e.g., disposed on a printed circuit board (PCB)). For example, FIG. 25 is a diagram of the flat resonator 2510 when viewed from the upper side thereof. As another example, as described above, the resonator 2510 included in the electronic device 101 may also be configured to be stereoscopic in a space. For example, FIG. 25 may be a diagram of the resonator 2510 configured to be stereoscopic in a space when viewed from the upper side thereof. The shape (e.g., a shape of a donut and/or a shape of a tube) of the resonator 2510 and the positions of the slots (e.g., reference numeral 2520 and 2530) disposed in the resonator 2510 have been described together with the description of FIGS. 6 and 7.

Referring to FIG. 25, according to various embodiments, the electronic device 101 may include the resonator 2510. For example, the resonator 2510 may have a shape of a loop. For example, the resonator 2510 may have a shape of a loop extending from one end 2512 of the resonator 2510 to the other end 2511. For example, the resonator 2510 may have an empty space having a first length 2542 between the one end 2512 and the other end 2511 of the resonator 2510. For example, the resonator 2510 may include a capacitor in an area (e.g., an area corresponding to the empty space having the first length 2542 illustrated in FIG. 25) between the one end 2512 and the other end 2511. There is no limit to the position of the capacitor included in the resonator 2510. For example, the resonator 2510 may be connected to a capacitor disposed in a different area than an area (e.g., an area corresponding to the empty space having the first length 2542 illustrated in FIG. 25) between the one end 2512 and the other end 2511. For example, the capacitor disposed in the different area may be understood to be included in the resonator 2510. For example, a part having a shape of a loop and the capacitor may be connected to each other so that the resonator 2510 resonates.

According to various embodiments, the resonator 2510 may include the first slot 2520 and the second slot 2530. For example, the first slot 2520 may be configured in a loop direction 2541 of the resonator 2510. For example, the first slot 2520 may have a designated shape having a designated length 2551 in the loop direction 2541 of the resonator 2510. For example, the first slot 2520 may include a first sub slot extending from one end 2523 of the first slot 2520 in a first direction (e.g., the upward longitudinal direction in FIG. 25), a second sub slot extending in a second direction (e.g., the left transverse direction in FIG. 25) different from the first direction, and a third sub slot between the first sub slot and the second sub slot. For example, the second sub slot included in the first slot 2520 may have a shape curved according to the shape of the resonator 2510. For example, the first slot 2520 may have the designated length 2551 by including the first sub slot having a first length 647, the second sub slot having a second length, and the third sub slot having a third length. For example, the second slot 2530 may be configured in the loop direction 2541 of the resonator 2510. For example, the second slot 2530 may have a designated shape having a designated length 2561 in the loop direction 2541 of the resonator 2510. For example, the second slot 2530 may include a fourth sub slot extending from one end 2533 of the second slot 2530 in a fourth direction (e.g., the left transverse direction in FIG. 25), a fifth sub slot extending in a fifth direction (e.g., the upward longitudinal direction in FIG. 25) different from the fourth direction, and a sixth sub slot between the fourth sub slot and the fifth sub slot. For example, the sixth sub slot included in the second slot 2530 may have a shape curved according to the shape of the resonator 2510. For example, the second slot 2530 may have the designated length 2561 by including the fourth sub slot having a fourth length, the fifth sub slot having a fifth length, and the sixth sub slot having a sixth length.

Figure 26:
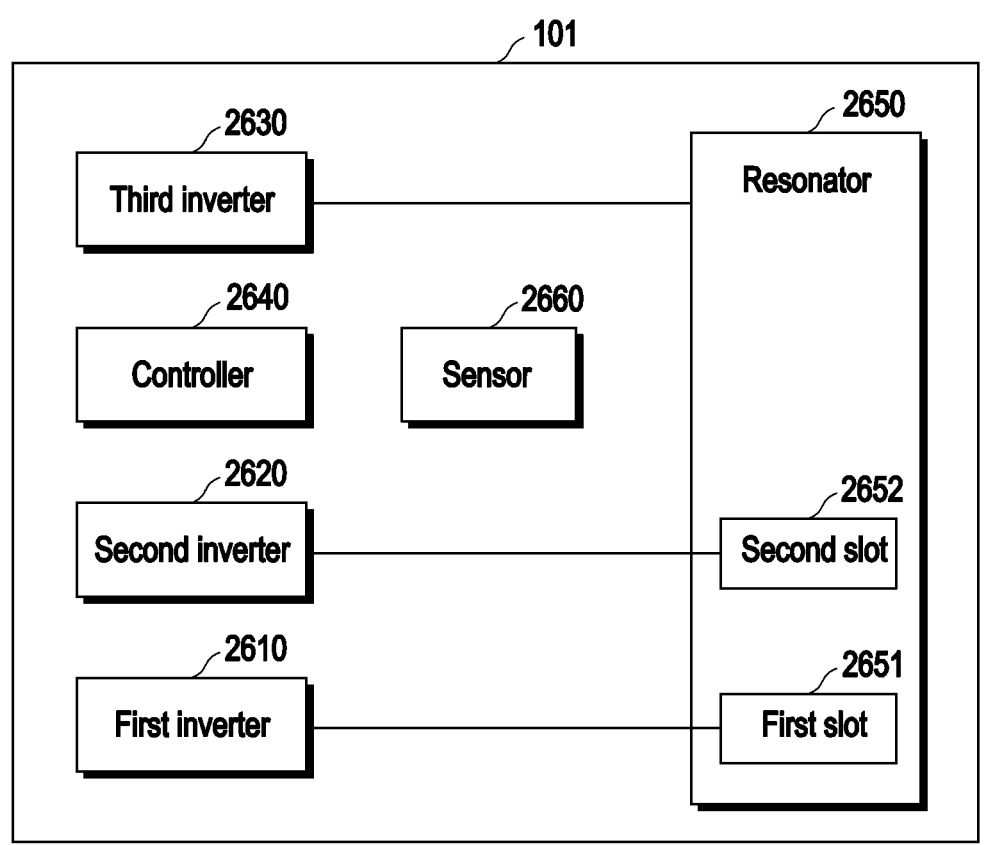
FIG. 26 is a block diagram of an electronic device according to an embodiment of the disclosure.

FIG. 26 is a block diagram of an electronic device according to an embodiment of the disclosure.

Figure 27:
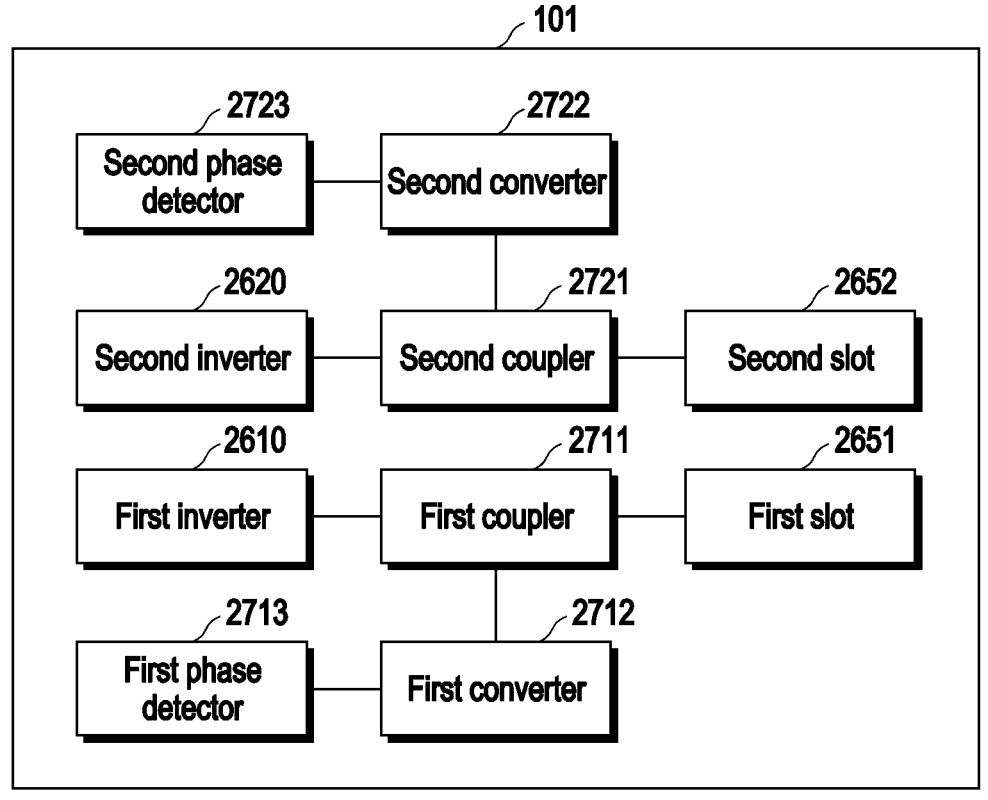
FIG. 27 is a block diagram of an electronic device according to an embodiment of the disclosure.

FIG. 27 is a block diagram of an electronic device according to an embodiment of the disclosure. FIGS. 26 and 27 will be described with reference to FIG. 25.

Referring to FIG. 26, the electronic device 101 according to various embodiments may include a controller 2640, a first inverter 2610, a second inverter 2620, a third inverter 2630, a resonator 2650, and a sensor 2660. For example, the resonator 2650 may be the first resonator 230 or the second resonator 240 in FIG. 2. For example, the resonator 2650 in FIG. 26 may be the resonator 2510 in FIG. 25. For example, the resonator 2650 in FIG. 26 may include a first slot 2651 and a second slot 2652. For example, the first slot 2651 and the second slot 2652 in FIG. 26 may be the first slot 2520 and the second slot 2530 in FIG. 25. For example, the sensor 2660 in FIG. 26 may include a first sensor, a second sensor, and a third sensor. For example, the first sensor included in the sensor 2660 may sense information related to the first slot 2651 of the resonator 2650. For example, the second sensor included in the sensor 2660 may sense information related to the second slot 2652 of the resonator 2650. For example, the third sensor included in the sensor 2660 may sense information related to an area different from an area including the first slot 2651 and the second slot 2652 of the resonator 2650. According to another example, the sensor 2660 may be configured by one sensor, and there is no limit to the configuration of the sensor 2660.

For example, referring to FIGS. 25 and 26, the first inverter 2610 may apply power to the first slot 2651 (e.g., the first slot 2520). For example, the first inverter 2610 may be connected to a first point 2521 and a second point 2522 of the resonator 2510 in FIG. 25. For example, the first point 2521 and the second point 2522 of the resonator 2510 in FIG. 25 may be opposite while the first slot 2520 in FIG. 25 (e.g., the first slot 2651 in FIG. 26) is disposed therebetween.

For example, referring to FIGS. 25 and 26, the second inverter 2620 may apply power to the second slot 2652 (e.g., the second slot 2530). For example, the second inverter 2620 may be connected to a third point 2531 and a fourth point 2532 of the resonator 2510 in FIG. 25. For example, the third point 2531 and the fourth point 2532 of the resonator 2510 in FIG. 25 may be opposite while the second slot 2530 in FIG. 25 (e.g., the second slot 2652 in FIG. 26) is disposed therebetween.

For example, referring to FIGS. 25 and 26, the third inverter 2630 may apply power to the resonator 2650 (e.g., the resonator 2510). For example, the third inverter 2630 may apply power to at least one point (e.g., the fifth point 2573 and the sixth point 2574) of the resonator 2510 different from the first point 2521, the second point 2522, the third point 2531, and the fourth point 2532 of the resonator 2510 in FIG. 25.

Referring to FIG. 27, the electronic device 101 according to various embodiments may include the first inverter 2610, a first coupler 2711, a first converter 2712, a first phase detector 2713, the first slot 2651 (e.g., the first slot 2651 included in the resonator 2650 in FIG. 26), the second inverter 2620, a second coupler 2721, a second converter 2722, a second phase detector 2723, and the second slot 2652 (e.g., the second slot 2652 included in the resonator 2650 in FIG. 26). For example, the sensor 2660 in FIG. 26 may include the first coupler 2711, the first converter 2712, the first phase detector 2713, the second coupler 2721, the second converter 2722, and the second phase detector 2723 in FIG. 27. For example, a first sensor included in the sensor 2660 in FIG. 26 may include the first coupler 2711, the first converter 2712, and the first phase detector 2713 in FIG. 27. For example, a second sensor included in the sensor 2660 in FIG. 26 may include the second coupler 2721, the second converter 2722, and the second phase detector 2723 in FIG. 27. The connection and function of each of the first coupler 2711, the first converter 2712, the first phase detector 2713, the second coupler 2721, the second converter 2722, and the second phase detector 2723 in FIG. 27, which are included in the sensor 2660 in FIG. 26, may be understood with reference to the above description of FIGS. 4A and 4B. For example, the electronic device 101 may sense information on the first slot 2651 (e.g., the first slot 2520 in FIG. 25) by using the first sensor (e.g., the first coupler 2711, the first converter 2712, and the first phase detector 2713 in FIG. 27) included in the sensor 2660 in FIG. 26. For example, the electronic device 101 may sense information on the second slot 2652 (e.g., the second slot 2530 in FIG. 25) by using the second sensor (e.g., the second coupler 2721, the second converter 2722, and the second phase detector 2723 in FIG. 27) included in the sensor 2660 in FIG. 26.

Referring to FIGS. 25, 26, and 27, according to various embodiments, the embodiment of FIG. 5, the embodiment of FIG. 13, and the embodiment of FIG. 15 may be applied to the resonator 2510. The embodiment of FIG. 5, the embodiment of FIG. 13, and the embodiment of FIG. 15 applied to the resonator 2510 having multiple slots (e.g., reference numeral 2520 and 2530) may be understood with reference to the above description of the embodiment of FIG. 5, the embodiment of FIG. 13, and the embodiment of FIG. 15.

Figure 28:
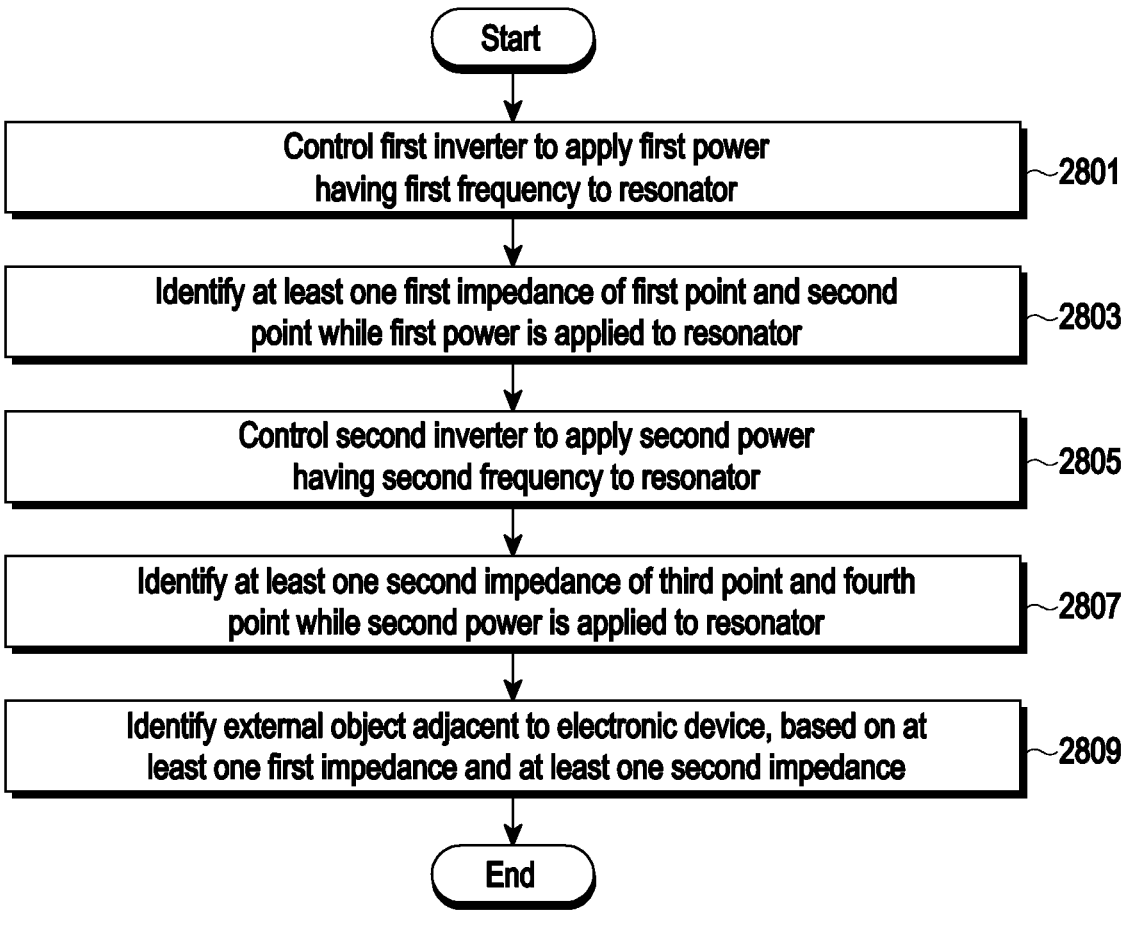
FIG. 28 is a flowchart illustrating an operation of an electronic device according to an embodiment of the disclosure.

FIG. 28 is a flowchart illustrating an operation of an electronic device according to an embodiment of the disclosure. FIG. 28 will be described with reference to FIG. 25.

Referring to FIG. 28, in operation 2801, according to various embodiments, the electronic device 101 (e.g., the controller 430 of the electronic device 101) may control the first inverter 2610 to apply first power having a first frequency to a resonator (e.g., the resonator 2510 in FIG. 25). For example, referring to FIG. 25, the first inverter 2610 may be connected to the first point 2521 and the second point 2522 of the resonator 2510. For example, the first point 2521 and the second point 2522 of the resonator 2510 may be opposite while the first slot 2520 of the resonator 2510 is disposed therebetween. For example, the first point 2521 and the second point 2522 of the resonator 2510 may be spaced a designated distance (e.g., a first distance 2552) apart from the one end 2523 of the first slot 2520. The positions of the first point 2521 and the second point 2522 correspond to examples, and there is no limit to the positions of the first point 2521 and the second point 2522. For example, the electronic device 101 may determine the first frequency of the first power applied by the first inverter 2610. For example, the frequency may be a designated value, and in this case, an operation of determining the frequency by the electronic device 101 may be omitted.

In operation 2803, according to various embodiments, the electronic device 101 may identify at least one first impedance of the first point (e.g., reference numeral 2521 in FIG.

25) and the second point (e.g., reference numeral 2522 in FIG. 25) while the first power is applied to the resonator (e.g., the resonator 2510 in FIG. 25). For example, referring to FIG. 25, the electronic device 101 may periodically or continuously identify the at least one first impedance of the first point 2521 and the second point 2522 while the first power is applied to the resonator 2510. For example, the at least one first impedance may indicate an impedance identified at one time point or multiple impedances measured time-sequentially. The electronic device 101 identifying the at least one first impedance of the first point (e.g., reference numeral 2521 in FIG. 25) and the second point (e.g., reference numeral 2522 in FIG. 25) while the first power is applied to the resonator (e.g., the resonator 2510 in FIG. 25) may imply that, while the first power is applied to the resonator (e.g., the resonator 2510 in FIG. 25), at least one first inclination of the at least one first impedance of the first point (e.g., reference numeral 2521 in FIG. 25) and the second point (e.g., reference numeral 2522 in FIG. 25) is identified.

Referring to FIG. 28, in operation 2805, according to various embodiments, the electronic device 101 (e.g., the controller 430 of the electronic device 101) may control the second inverter 2620 to apply second power having a second frequency to a resonator (e.g., the resonator 2510 in FIG. 25). For example, referring to FIG. 25, the second inverter 2620 may be connected to the third point 2531 and the fourth point 2532 of the resonator 2510. For example, the third point 2531 and the fourth point 2532 of the resonator 2510 may be opposite while the second slot 2530 of the resonator 2510 is disposed therebetween. For example, the third point 2531 and the fourth point 2532 of the resonator 2510 may be spaced a designated distance (e.g., a second distance 2562) apart from the one end 2533 of the second slot 2530. The positions of the third point 2531 and the fourth point 2532 correspond to examples, and there is no limit to the positions of the third point 2531 and the fourth point 2532. For example, the electronic device 101 may determine the second frequency of the second power applied by the second inverter 2620. For example, the frequency may be a designated value, and in this case, an operation of determining the frequency by the electronic device 101 may be omitted.

In operation 2807, according to various embodiments, the electronic device 101 may identify at least one second impedance of the third point (e.g., reference numeral 2531 in FIG. 25) and the fourth point (e.g., reference numeral 2532 in FIG. 25) while the second power is applied to the resonator (e.g., the resonator 2510 in FIG. 25). For example, referring to FIG. 25, the electronic device 101 may periodically or continuously identify the at least one second impedance of the third point 2531 and the fourth point 2532 while the second power is applied to the resonator 2510. For example, the at least one second impedance may indicate an impedance identified at one time point or multiple impedances measured time-sequentially. The electronic device 101 identifying the at least one second impedance of the third point (e.g., reference numeral 2531 in FIG. 25) and the fourth point (e.g., reference numeral 2532 in FIG. 25) while the second power is applied to the resonator (e.g., the resonator 2510 in FIG. 25) may imply that, while the second power is applied to the resonator (e.g., the resonator 2510 in FIG. 25), at least one second inclination of the at least one second impedance of the third point (e.g., reference numeral 2531 in FIG. 25) and the fourth point (e.g., reference numeral 2532 in FIG. 25) is identified.

In operation 2809, according to various embodiments, the electronic device 101 may identify an external object (e.g., reference numeral 1130 or 1140 in FIG. 11) adjacent to the electronic device 101, based on the at least one first impedance of the first point (e.g., reference numeral 2521 in FIG. 25) and the second point (e.g., reference numeral 2522 in FIG. 25) of the resonator 2510 and the at least one second impedance of the third point (e.g., reference numeral 2531 in FIG. 25) and the fourth point (e.g., reference numeral 2532 in FIG. 25). For example, the electronic device 101 may identify an external object (e.g., reference numeral 1130 or 1140 in FIG. 11) adjacent to the electronic device 101, based on the at least one first inclination (or first phase) of the at least one first impedance of the first point (e.g., reference numeral 2521 in FIG. 25) and the second point (e.g., reference numeral 2522 in FIG. 25) of the resonator 2510 and the at least one second inclination (or second phase) of the at least one second impedance of the third point (e.g., reference numeral 2531 in FIG. 25) and the fourth point (e.g., reference numeral 2532 in FIG. 25). For example, the electronic device 101 may identify an external object (e.g., reference numeral 1130 or 1140 in FIG. 11) adjacent to the electronic device 101, based on a change (e.g., a first change) in the at least one first inclination (or first phase) of the at least one first impedance of the first point (e.g., reference numeral 2521 in FIG. 25) and the second point (e.g., reference numeral 2522 in FIG. 25) of the resonator 2510 and a change (e.g., a second change) in the at least one second inclination (or second phase) of the at least one second impedance of the third point (e.g., reference numeral 2531 in FIG. 25) and the fourth point (e.g., reference numeral 2532 in FIG. 25). For example, the electronic device 101 may identify whether there is an external object (e.g., reference numeral 1130 or 1140 in FIG. 11) adjacent to the electronic device 101, and/or identification information of the external object, based on the impedance of, at one time point, the first point (e.g., reference numeral 2521 in FIG. 25) and the second point (e.g., reference numeral 2522 in FIG. 25) of the resonator 2510. For example, the electronic device 101 may identify whether there is an external object (e.g., reference numeral 1130 or 1140 in FIG. 11) adjacent to the electronic device 101, and/or identification information of the external object, based on the impedance of, at one time point, the third point (e.g., reference numeral 2531 in FIG. 25) and the fourth point (e.g., reference numeral 2532 in FIG. 25) of the resonator 2510. For example, the electronic device 101 may also identify whether there is an external object (e.g., reference numeral 1130 or 1140 in FIG. 11) adjacent to the electronic device 101, and/or identification information of the external object, based on first impedance of, at one time point (e.g., a first time point), the first point (e.g., reference numeral 2521 in FIG. 25) and the second point (e.g., reference numeral 2522 in FIG. 25) of the resonator 2510 and second impedance of, at one time point (e.g., a second time point), the third point (e.g., reference numeral 2531 in FIG. 25) and the fourth point (e.g., reference numeral 2532 in FIG. 25). The first time point and the second time point may be identical to each other or different from each other.

A person skilled in the art will understand that various embodiments disclosed in this specification may be applied cooperatively with each other in an applicable range.

An electronic device (e.g., the electronic device 101) according to various embodiments may include a resonator (e.g., reference numeral 440 in FIG. 4A, reference numeral 610 in FIG. 6, reference numeral 710 in FIG. 7, reference numeral 1610 in FIG. 16, reference numeral 1710 in FIG. 17, or reference numeral 2510 in FIG. 25) in which a first slot (e.g., reference numeral 441 in FIGS. 4A and 4B, reference numeral 620 in FIG. 6, reference numeral 720 in FIG. 7, reference numeral 1620 in FIG. 16, reference numeral 1720 in FIG. 17, reference numeral 2520 in FIG. 25, or reference numeral 2650 in FIG. 26) is formed, a first inverter (e.g., reference numeral 410 in FIGS. 4A and 4B or reference numeral 2610 in FIG. 26) connected to a first point (e.g., reference numeral 621 in FIG. 6, reference numeral 1621 in FIG. 16, or reference numeral 2521 in FIG. 25) and a second point (e.g., reference numeral 622 in FIG. 6, reference numeral 1622 in FIG. 16, or reference numeral 2522 in FIG. 25) on the first slot of the resonator and configured to provide power to the first slot so as to detect a foreign material, the first point and the second point on the first slot being located opposite to each other with the first slot therebetween, a second inverter (e.g., reference numeral 420 in FIG. 4A or reference numeral 2630 in FIG. 26) connected to a third point and a fourth point (e.g., reference numerals 653 and 654 in FIG. 6, reference numerals 1653 and 1654 in FIG. 16, or reference numerals 2573 and 2574 in FIG. 25) of the resonator different from the first point and the second point and configured to transfer power to the resonator, and a controller (e.g., reference numeral 430 in FIG. 4A or reference numeral 2640 in FIG. 26), wherein the controller is configured to control the first inverter to apply a first power having a first frequency to the first slot, identify at least one first impedance of the first point and the second point while the first power is applied to the first slot, identify, based on the at least one first impedance, an external object (e.g., reference numeral 1130 or 1140 in FIG. 11) adjacent to the electronic device, and control the second inverter to apply a second power having a second frequency different from the first frequency to the third point and the fourth point so as to wirelessly provide power to an external wireless power reception device (e.g., reference numeral 195) for a period at least partially overlapping with a period for which the first power is applied to the resonator.

According to various embodiments, the first point and the second point connected to the first inverter may be spaced a designated first distance apart from one end (e.g., reference numeral 623 in FIG. 6, reference numeral 1623 in FIG. 16, or 2523 in FIG. 25) of the first slot.

According to various embodiments, the resonator may be formed in a shape of a loop, and the first slot may be formed in a designated shape with a designated length in a loop direction (e.g., reference numeral 631 in FIG. 6, reference numeral 1631 in FIG. 16, or reference numeral 2541 in FIG. 25) of the resonator. The first slot of the designated shape may include a first sub slot (e.g., reference numeral 627 in FIG. 6) extending in a first direction, a second sub slot (e.g., reference numeral 629 in FIG. 6) extending in a second direction different from the first direction, and a third sub slot (e.g., reference numeral 628 in FIG. 6) disposed between the first sub slot and the second sub slot.

According to various embodiments, a distance between one end (e.g., reference numeral 1623 in FIG. 16) of the first slot and one end (e.g., reference numeral 1612 in FIG. 16) of the resonator, and a distance between another end (e.g., reference numeral 1624 in FIG. 16) of the first slot and another end (e.g., reference numeral 1611 in FIG. 16) of the resonator may be equal to or smaller than a designated second distance.

According to various embodiments, a distance between the first slot and an inner surface of the resonator may be greater than a distance between the first slot and an outer surface of the resonator.

According to various embodiments, the electronic device 101 may further include a first sensor (e.g., the first sensor of reference numeral 450 in FIG. 4A or reference numeral 2660 in FIG. 26) configured to identify the at least one first impedance of the first point and the second point, wherein the first sensor includes a first coupler (e.g., reference numeral 451 in FIG. 4B or reference numeral 2711 in FIG. 27) connecting the first inverter and the resonator, a first converter (e.g., reference numeral 452 in FIG. 4B or reference numeral 2712 in FIG. 27) connected to the first coupler, and a first phase detector (e.g., reference numeral 453 in FIG. 4B or reference numeral 2713 in FIG. 27) connected to the first converter. The controller may be configured to identify at least one first inclination of the at least one first impedance of the first point and the second point by using the first phase detector.

According to various embodiments, the controller may be configured to identify at least one first inclination of the at least one first impedance, identify, based on the least one first inclination being equal to or greater than a first reference value, that the external object (e.g., reference numeral 1130 in FIG. 11) is a first type of object (e.g., a conductor), and identify, based on the least one first inclination being smaller than the first reference value, that the external object (e.g., reference numeral 1140 in FIG. 11) is a second type of object (e.g., a human body).

According to various embodiments, the controller may be configured to, based on the least one first inclination being equal to or greater than the first reference value, and the least one first inclination increasing, determine that a distance between the external object that is the first type of object and the electronic device decreases, and based on the least one first inclination being smaller than the first reference value, and the least one first inclination increasing, determine that a distance between the external object that is the second type of object and the electronic device increases.

According to various embodiments, the controller may be configured to stop providing the second power in response to identification that the external object (e.g., reference numeral 1140 in FIG. 11) is a second type of object (e.g., a human body), based on the at least one first impedance identified while the first power is applied.

According to various embodiments, the electronic device 101 may further include a third inverter (e.g., reference numeral 2620 in FIG. 26) connected to a fifth point (e.g., reference numeral 2531 in FIG. 25) and a sixth point (e.g., reference numeral 2532 in FIG. 25) of the resonator and configured to provide power to the resonator. The fifth point and the sixth point of the resonator may be located opposite to each other with a second slot (e.g., reference numeral 2530 in FIG. 25 or reference numeral 2652 in FIG. 26) of the resonator therebetween. The controller may be further configured to control the third inverter to apply a third power having a third frequency to the resonator, identify at least one second impedance of the fifth point and the sixth point while the third power is applied to the resonator, and identify, based on the at least one first impedance and the at least one second impedance, the external object adjacent to the electronic device.

According to various embodiments, the electronic device 101 may further include a second sensor (e.g., the second sensor of reference numeral 2660 in FIG. 26) configured to identify the at least one second impedance of the fifth point and the sixth point, wherein the second sensor includes a second coupler (e.g., reference numeral 2721 in FIG. 27) connecting the second inverter and the resonator, a second converter (e.g., reference numeral 2722 in FIG. 27) connected to the second coupler, and a second phase detector (e.g., reference numeral 2723 in FIG. 27) connected to the second converter. The controller may be configured to identify at least one second inclination of the at least one second impedance of the fifth point and the sixth point by using the second phase detector.

According to various embodiments, a resonator (e.g., reference numeral 440 in FIG. 4A, reference numeral 610 in FIG. 6, reference numeral 710 in FIG. 7, reference numeral 1610 in FIG. 16, reference numeral 1710 in FIG. 17, or reference numeral 2510 in FIG. 25) included in an electronic device (e.g., the electronic device 101) may include a first slot (e.g., reference numeral 441 in FIGS. 4A and 4B, reference numeral 620 in FIG. 6, reference numeral 720 in FIG. 7, reference numeral 1620 in FIG. 16, reference numeral 1720 in FIG. 17, reference numeral 2520 in FIG. 25, or reference numeral 2650 in FIG. 26), wherein the resonator is formed in a shape of a loop, the first slot is formed in a designated shape with a designated length in a loop direction (e.g., reference numeral 631 in FIG. 6, reference numeral 1631 in FIG. 16, or reference numeral 2541 in FIG. 25) of the resonator, and the electronic device is configured to control a first inverter (e.g., reference numeral 410 in FIGS. 4A and 4B or reference numeral 2610 in FIG. 26) connected to a first point (e.g., reference numeral 621 in FIG. 6, reference numeral 1621 in FIG. 16, or reference numeral 2521 in FIG. 25) and a second point (e.g., reference numeral 622 in FIG. 6, reference numeral 1622 in FIG. 16, or reference numeral 2522 in FIG. 25) of the resonator to apply a first power having a first frequency to the resonator so as to detect a foreign material, the first point and the second point being located opposite to each other with the first slot therebetween, identify an external object (e.g., reference numeral 1130 or 1140 in FIG. 11) adjacent to the electronic device, based on at least one first impedance of the first point and the second point identified while the first power is applied to the resonator, and control a second inverter (e.g., reference numeral 420 in FIG. 4A or reference numeral 2630 in FIG. 26), which is connected to a third point and a fourth point (e.g., reference numerals 653 and 654 in FIG. 6, reference numerals 1653 and 1654 in FIG. 16, or reference numerals 2573 and 2574 in FIG. 25) of the resonator different from the first point and the second point, to apply a second power having a second frequency different from the first frequency so as to provide power to an external wireless power reception device (e.g., reference numeral 195) for a period at least partially overlapping with a period for which the first power is applied to the resonator.

According to various embodiments, the first point and the second point connected to the first inverter may be spaced a designated first distance apart from one end (e.g., reference numeral 623 in FIG. 6, reference numeral 1623 in FIG. 16, or 2523 in FIG. 25) of the first slot.

According to various embodiments, the first slot of the designated shape may include a first sub slot (e.g., reference numeral 627 in FIG. 6) extending in a first direction, a second sub slot (e.g., reference numeral 629 in FIG. 6) extending in a second direction different from the first direction, and a third sub slot (e.g., reference numeral 628 in FIG. 6) disposed between the first sub slot and the second sub slot.

According to various embodiments, a distance between one end (e.g., reference numeral 1623 in FIG. 16) of the first slot and one end (e.g., reference numeral 1612 in FIG. 16) of the resonator, and a distance between another end (e.g., reference numeral 1624 in FIG. 16) of the first slot and another end (e.g., reference numeral 1611 in FIG. 16) of the resonator may be equal to or smaller than a designated second distance.

According to various embodiments, a distance between the first slot and an inner surface of the resonator may be greater than a distance between the first slot and an outer surface of the resonator.

According to various embodiments, the resonator may further include a second slot (e.g., reference numeral 2530 in FIG. 25 or reference numeral 2652 in FIG. 26), wherein the second slot is formed at a position different from a position of the first slot along the loop direction of the resonator, and a distance between one end (e.g., reference numeral 2512 in FIG. 25) of the resonator and the first slot (e.g., reference numeral 2520 in FIG. 25) is greater than a distance between another end (e.g., reference numeral 2511 in FIG. 25) of the resonator and the second slot (e.g., reference numeral 2530 in FIG. 25).

According to various embodiments, the electronic device may be further configured to control a third inverter (e.g., reference numeral 2620 in FIG. 26) connected to a fifth point (e.g., reference numeral 2531 in FIG. 25) and a sixth point (e.g., reference numeral 2532 in FIG. 25) of the resonator to apply a third power having a third frequency different from the first frequency of the first power to the resonator, the fifth point and the sixth point being opposite while the second slot is disposed therebetween, and identify the external object adjacent to the electronic device, based on the at least one first impedance of the first point and the second point identified while the first power is applied to the resonator, and at least one second impedance of the fifth point and the sixth point identified while the third power is applied to the resonator.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a resonator in which a first slot is formed;
a first inverter connected to a first point and a second point on the first slot of the resonator and configured to provide power to the first slot for detecting a foreign material, the first point and the second point on the first slot being located opposite to each other with the first slot therebetween;
a second inverter connected to a third point and a fourth point of the resonator different from the first point and the second point and configured to transfer power to the resonator; and
a controller configured to:
control the first inverter to apply a first power having a first frequency to the first slot,
identify at least one first impedance of the first point and the second point while the first power is applied to the first slot,
identify, based on the at least one first impedance, whether an external object is adjacent to the electronic device, and
in accordance with identifying that the external object being not adjacent to the electronic device, control the second inverter to apply a second power having a second frequency different from the first frequency to the third point and the fourth point so as to wirelessly provide power to an external wireless power reception device.

2. The electronic device of claim 1, wherein the first point and the second point connected to the first inverter are spaced a first distance apart from one end of the first slot.

3. The electronic device of claim 1,
wherein the resonator is formed in a shape of a loop, and
wherein the first slot is formed in a shape with a length in a loop direction of the resonator, the first slot formed in the shape comprising a first sub slot extending in a first direction, a second sub slot extending in a second direction different from the first direction, and a third sub slot disposed between the first sub slot and the second sub slot.

4. The electronic device of claim 1, wherein a distance between one end of the first slot and one end of the resonator, and a distance between another end of the first slot and another end of the resonator, are equal to or smaller than a second distance.

5. The electronic device of claim 1, wherein a distance between the first slot and an inner surface of the resonator is greater than a distance between the first slot and an outer surface of the resonator.

6. The electronic device of claim 1, further comprising:
a first sensor configured to identify the at least one first impedance of the first point and the second point,
wherein the first sensor comprises:
a first coupler connecting the first inverter and the resonator,
a first converter connected to the first coupler, and
a first phase detector connected to the first converter, and
wherein the controller is further configured to identify at least one first inclination of the at least one first impedance of the first point and the second point by using the first phase detector.

7. The electronic device of claim 1, wherein the controller is further configured to:
identify at least one first inclination of the at least one first impedance;
identify, based on the least one first inclination being equal to or greater than a first reference value, that the external object is a first type of object; and
identify, based on the least one first inclination being smaller than the first reference value, that the external object is a second type of object.

8. The electronic device of claim 7, wherein the controller is further configured to:
based on the least one first inclination being equal to or greater than the first reference value, and the least one first inclination increasing, determine that a distance between the external object that is the first type of object and the electronic device decreases; and
based on the least one first inclination being smaller than the first reference value, and the least one first inclination increasing, determine that a distance between the external object that is the second type of object and the electronic device increases.

9. The electronic device of claim 1, wherein the controller is further configured to:
after providing the second power to the resonator for a period at least partially overlapping with a period for which the first power is applied to the resonator, stop providing the second power in response to identification that the external object is a second type of object, based on the at least one first impedance identified while the first power is applied.

10. The electronic device of claim 1, further comprising:
a third inverter connected to a fifth point and a sixth point of the resonator and configured to provide power to the resonator,
wherein the fifth point and the sixth point of the resonator are located opposite to each other with a second slot of the resonator therebetween, and
wherein the controller is further configured to:
control the third inverter to apply a third power having a third frequency to the resonator,
identify at least one second impedance of the fifth point and the sixth point while the third power is applied to the resonator, and
identify, based on the at least one first impedance and the at least one second impedance, the external object adjacent to the electronic device.

11. The electronic device of claim 10, further comprising:
a second sensor configured to identify the at least one second impedance of the fifth point and the sixth point,
wherein the second sensor comprises:
a second coupler connecting the second inverter and the resonator,
a second converter connected to the second coupler, and
a second phase detector connected to the second converter, and
wherein the controller is further configured to identify at least one second inclination of the at least one second impedance of the fifth point and the sixth point by using the second phase detector.

12. A resonator included in an electronic device, the resonator comprising:
a first slot,
wherein the resonator is formed in a shape of a loop,
wherein the first slot is formed in a shape with a length in a loop direction of the resonator, and wherein the electronic device is configured to:

control a first inverter connected to a first point and a second point of the resonator to apply a first power having a first frequency to the resonator for detecting a foreign material, the first point and the second point being located opposite to each other with the first slot therebetween, identify whether an external object is adjacent to the electronic device, based on at least one first impedance of the first point and the second point identified while the first power is applied to the resonator, and in accordance with identifying that the external objec being not adjacent to the electronic device, control a second inverter, which is connected to a third point and a fourth point of the resonator different from the first point and the second point, to apply a second power having a second frequency different from the first frequency so as to provide power to an external wireless power reception device.

13. The resonator of claim 12, wherein the first point and the second point connected to the first inverter are spaced a first distance apart from one end of the first slot.

14. The resonator of claim 12, wherein the first slot of the shape comprises a first sub slot extending in a first direction, a second sub slot extending in a second direction different from the first direction, and a third sub slot disposed between the first sub slot and the second sub slot.

15. The resonator of claim 12, wherein a distance between one end of the first slot and one end of the resonator, and a distance between another end of the first slot and another end of the resonator are equal to or smaller than a second distance.

16. The resonator of claim 12, wherein a distance between the first slot and an inner surface of the resonator is greater than a distance between the first slot and an outer surface of the resonator.

17. The resonator of claim 12, further comprising:

a second slot, wherein the second slot is formed at a position different from a position of the first slot along the loop direction of the resonator, and wherein a distance between one end of the resonator and the first slot is greater than a distance between another end of the resonator and the second slot.

18. The resonator of claim 17, wherein the electronic device is further configured to:

control a third inverter connected to a fifth point and a sixth point of the resonator to apply a third power having a third frequency different from the first frequency of the first power to the resonator, the fifth point and the sixth point being located opposite to each other with the second slot therebetween; and identify the external object adjacent to the electronic device, based on the at least one first impedance of the first point and the second point identified while the first power is applied to the resonator, and at least one second impedance of the fifth point and the sixth point identified while the third power is applied to the resonator.

19. The resonator of claim 12, wherein the electronic device is further configured to identify at least one first inclination of the at least one first impedance of the first point and the second point by using a phase detector.

20. The resonator of claim 12, wherein the electronic device is further configured to:

identify at least one first inclination of the at least one first impedance, identify, based on the least one first inclination being equal to or greater than a first reference value, that the external object is a first type of object, and identify, based on the least one first inclination being smaller than the first reference value, that the external object is a second type of object.

21. The resonator of claim 20, wherein the electronic device is further configured to:

based on the least one first inclination being equal to or greater than the first reference value, and the least one first inclination increasing, determine that a distance between the external object that is the first type of object and the electronic device decreases, and based on the least one first inclination being smaller than the first reference value, and the least one first inclination increasing, determine that a distance between the external object that is the second type of object and the electronic device increases.

* * * * *